US012651960B2

(12) United States Patent
Unruh et al.

(10) Patent No.: US 12,651,960 B2
(45) Date of Patent: Jun. 9, 2026

(54) REGULATION APPARATUS FOR A CURRENT CONVERTER, CURRENT CONVERTER ARRANGEMENT AND METHOD FOR REGULATING A GRID COUPLED CURRENT CONVERTER

(71) Applicant: Fraunhofer-Gesellschaft zur Foerderung der angewandten Forschung e.V., Munich (DE)

(72) Inventors: Peter Unruh, Kassel (DE); Tobias Erckrath, Kassel (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 381 days.

(21) Appl. No.: 18/521,611

(22) Filed: Nov. 28, 2023

(65) Prior Publication Data

US 2024/0097560 A1 Mar. 21, 2024

Related U.S. Application Data

(63) Continuation of application No. PCT/EP2022/067076, filed on Jun. 22, 2022.

(30) Foreign Application Priority Data

Jun. 23, 2021 (DE) ........................ 102021206502.3

(51) Int. Cl.
*H02M 1/00* (2007.01)
*H02H 9/02* (2006.01)
(Continued)

(52) U.S. Cl.
CPC .............. *H02M 1/325* (2021.05); *H02H 9/02* (2013.01); *H02M 1/0025* (2021.05);
(Continued)

(58) Field of Classification Search
CPC ........................ H02M 1/0025; H02M 3/33561
See application file for complete search history.

(56) References Cited

U.S. PATENT DOCUMENTS

| | | | | |
|---|---|---|---|---|
| 10,587,214 | B1 * | 3/2020 | Blasko | H02M 5/293 |
| 2010/0142237 | A1 * | 6/2010 | Yuan | H02J 3/46 290/44 |

(Continued)

FOREIGN PATENT DOCUMENTS

| | | | |
|---|---|---|---|
| DE | 19949997 | B4 | 8/2005 |
| DE | 102020200673 | B3 | 7/2021 |
| EP | 2221936 | A2 | 8/2010 |

OTHER PUBLICATIONS

Bernet, Steffen, et al., "Selbstgeführte Stromrichter am Gleichspannungszwischenkreis: Funktion, Modulation und Regelung", Selbstgeführte Stromrichter am Gleichspannungszwischenkreis: Funktion, Modulation und Regelung. Springer. 2012., 79 pp. Uploaded in 4 parts.

(Continued)

*Primary Examiner* — Gary A Nash
(74) *Attorney, Agent, or Firm* — Perkins Coie LLP; Michael A. Glenn

(57) ABSTRACT

A method for regulating a grid-coupled power converter includes adjusting a control voltage for the power converter in dependence on an output voltage of the power converter. The method provides limiting a voltage deviation between the control voltage and the output voltage. In embodiments, the limitation of a control voltage phasor takes place in amplitude and angle, wherein control ranges for amplitude and/or angle are adjusted depending on the situation. In further embodiments, the limitation takes place in coordinates of coordinate axes that are orthogonal and rectilinear to each other. Further, in a method for regulating a power converter, when determining a control quantity, a potential
(Continued)

difference between a reference potential of the output voltage and a reference potential of a bridge voltage of the power converter is considered. Alternatively or additionally, contribution of a voltage oscillation in an intermediate circuit to the bridge voltage is considered.

24 Claims, 23 Drawing Sheets

(51) Int. Cl.
*H02M 1/08* (2006.01)
*H02M 1/32* (2007.01)
*H02M 3/335* (2006.01)
*H02M 7/5387* (2007.01)
*H02M 7/5395* (2006.01)

(52) U.S. Cl.
CPC ....... *H02M 7/5387* (2013.01); *H02M 7/5395* (2013.01); *H02M 1/08* (2013.01); *H02M 3/33561* (2013.01)

(56) References Cited

U.S. PATENT DOCUMENTS

2019/0294191 A1* 9/2019 Wang .................... H02M 3/157
2020/0004283 A1* 1/2020 Sorace .................... G05F 1/575

OTHER PUBLICATIONS

Bloemink, Jeffrey, et al., "Control of a Multiple Source Microgrid With Built-in Islanding Detection and Current Limiting", IEEE Transactions on Power Delivery, vol. 27, No. 4, Oct. 2012, pp. 2122-2132, pp. 2122-2132.
Çelik, Doğan, et al., "Voltage support control strategy of grid-connected inverter system under unbalanced grid faults to meet fault ride through requirements", IET Generation, Transmission &Distribution, IET, UK, (Jul. 6, 2020), vol. 14, No. 16, doi:10.1049/IET-GTD.2019.1206, ISSN 1751-8687, pp. 3198-3210, XP006104845, pp. 3198-3210.
Gkountaras, Aris, et al., "Evaluation of current limiting methods for grid forming inverters in medium voltage microgrids", 2015 IEEE Energy Conversion Congress and Exposition (ECCE), 2015, pp. 1223-1230, pp. 1223-1230.
Najafzadeh, Kaveh, et al., "New Inverter Fault Current Limiting Method by Considering Microgrid Control Strategy", AMR, 463-464, pp. 1647-1653, 2012, doi: 110.4028/www.scientific.net/AMR.463-464.164 7, pp. 1647-1653.
Ortjohann, Egon, et al., "Grid-Forming Three-Phase Inverters for Unbalanced Loads in Hybrid Power Systems", Conference record of the 2006 IEEE 4th World Conference on Photovoltaic Energy Conversion: May 7-12, 2006, [Waikoloa, Hawaii][incorporating 32th IEEE Photovoltaic (PV) Specialist Conference and 16th Asia/Pacific (International) Photovoltaic (PV) Science and Engineering Conference, Waikoloa, HI, 2006, pp. 2396-2399, pp. 2396-2399.
Tharayil, Marina, et al., "A generalized PID error governing scheme for SMART/SBLI control", ACC: Proceedings of the 2002 American Control Conference: May 8-10, 2002, Hilton Anchorage and Egan Convention Center, Anchorage, Alaska, USA, Anchorage, AK, USA, 2002, pp. 346-351, pp. 346-351.
Unruh, Peter, et al., "Overview on Grid-Forming Inverter Control Methods", Energies, vol. 13, No. 110, p. 2589, 2020, doi: 110.3390/en131102589, 4 pp.

* cited by examiner 1001                                                          1000

Determining a control voltage (Us) for the current converter in dependence on an output voltage of the current converter (80)

Limiting an amplitude (42) of a control voltage indicator (32) describing the control voltage to an amplitude control range (44) around an amplitude (62) of a reference voltage indicator (60) based on the output voltage          1010

Limiting an angle (52) of the control voltage indicator (32) to an angle control range (54) around an angle (64) of the reference voltage indicator (60)          1020

Situation-dependent adjusting of the amplitude control range (44) and the angle control range (54)          1030

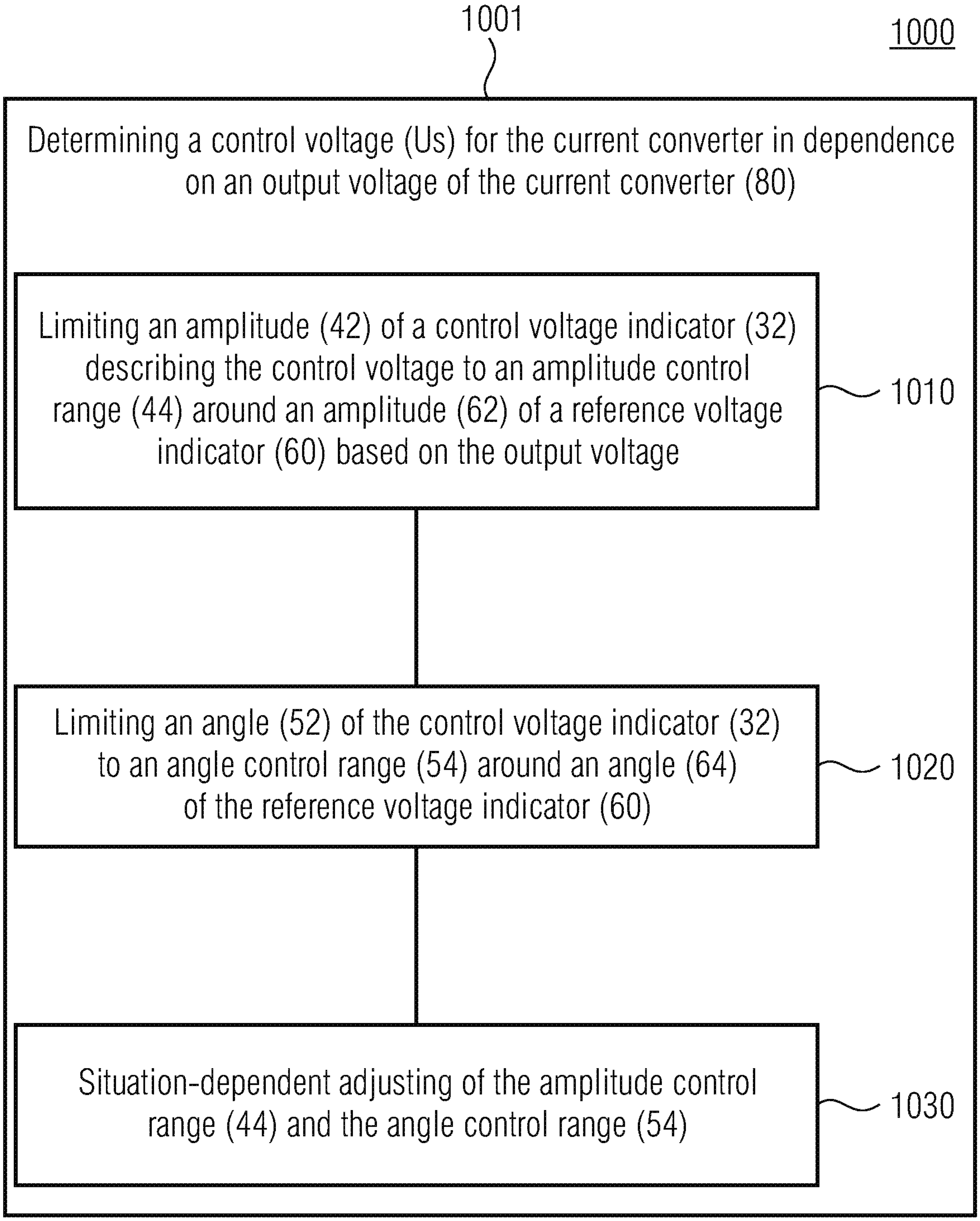

Providing a bridge voltage (Ui) indicated by
the control quantity at a circuit node (88) coupled
to a terminal point (82) of the current converter via
an inner impedance (86)of the current converter,
wherein providing takes place based on the control
quantity and an intermediate circuit voltage (89)
of an intermediate circuit of the current converter.

3001

Determining a control quantity for the current converter by considering a contribution (71) of at least one voltage
oscillation in the intermediate circuit to the bridge voltage
and/or by considering a potential difference (72) between
a reference potential (M) of the bridge voltage and
reference potential (N) of the output voltage.

3002

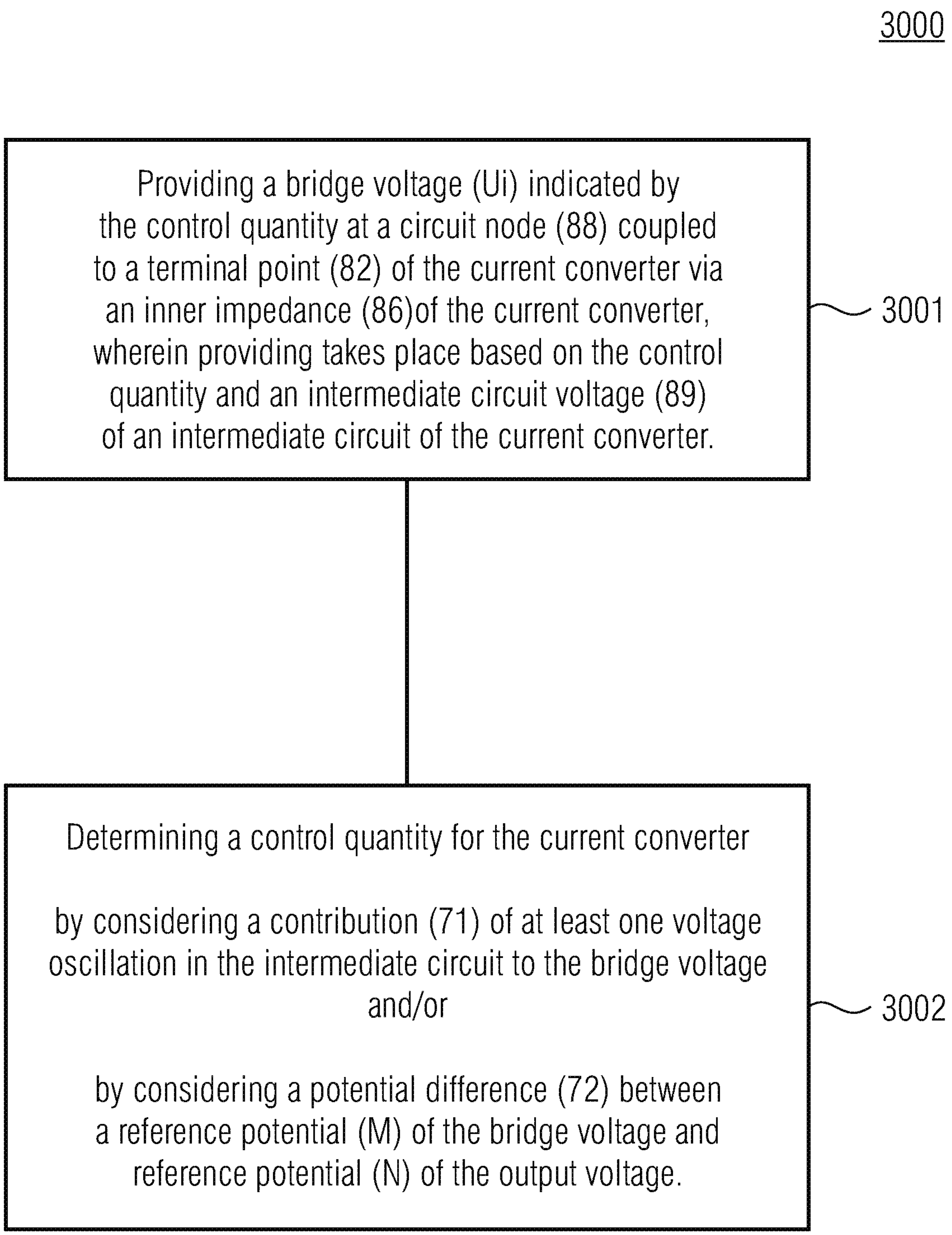

Fig. 23

REGULATION APPARATUS FOR A CURRENT CONVERTER, CURRENT CONVERTER ARRANGEMENT AND METHOD FOR REGULATING A GRID COUPLED CURRENT CONVERTER

CROSS-REFERENCE TO RELATED APPLICATIONS

This application is a continuation of copending International Application No. PCT/EP2022/067076, filed Jun. 22, 2022, which is incorporated herein by reference in its entirety, and additionally claims priority from German Application No. 102021206502.3, filed Jun. 23, 2021, which is also incorporated herein by reference in its entirety.

Embodiments of the present invention relate to a regulation apparatus for a grid-connected power converter, for example a grid-forming power converter. Further embodiments relate to a method for regulating a grid-connected power converter. Embodiments of the present invention relate to a method for current limitation in grid-forming power converters.

BACKGROUND OF THE INVENTION

Power converters are used for feeding electrical energy into energy grids. Here, power fed into the energy grid by the power converter is normally regulated with respect to quantities predetermined for the energy grid, such as frequency and voltage.

Grid-forming power converters are characterized in that the same provide an independent voltage phasor. This includes, on the one hand, that the grid-forming power converter does not depend on a grid-side voltage source for its own operation. Further, the provided voltage phasor has an inertia capability. This means the same does not follow grid-side variations at any speed but maintains its rotation position at first and synchronizes itself with the external voltage source according to an inertia constant. In that way, the grid-forming power converter provides instantaneous reserves to the grid when needed. This operating principle can be found in the well-known synchronous machine, in which the induced magnet wheel voltage is connected directly to the inertial rotor. In a similar way, in power converters, an inertial voltage phasor (with respect to angle and amplitude) can be impressed by control technology. Different methods are known for this [3]. If, however, the inertia capability is too strong, the voltage phasors move too far away from each other in certain situations (for example, in case of a frequency event in the grid), such that a high current is driven via a coupling impedance. In power converters, this can quickly result in inadmissibly high currents.

Different methods are known to prevent the problem of overcurrents in grid-forming power converters. Some of them have been specifically developed and analyzed for a specific scenario (e.g., Fault-Ride-Through (FRT)).

One approach is to switch to current regulation, i.e., to bring the power converter into the current-regulated operation as soon as a current limit is exceeded. This means the power converter is regulated to a fixed current set value (see, e.g., [4]).

Another approach increases the impedance in a virtual manner to limit the flowing current to an acceptable degree, like in the not pre-published patent application with the application number DE 1102020200673.3. If too high voltage differences occur, the current can be limited by the virtually impressed impedance. Here, it is possible to emulate the additional impedance constantly or only when an event occurs. In constant usage, the current response (for example in case of a short circuit) depends on the operating point prior to the event. Additionally, the same cannot be selected to be too large as the same can limit the normal operation. This can again have the effect that the current is not sufficiently limited in the case of deep drops. This is aggravated by the fact that this approach cannot easily limit voltage differences relating to the voltage angle in the stationary state since the grid-forming regulation has integrated the angle in advance in order to approach the respective operating point.

Further examples for current limitation methods are described in [1] and [2], which can also be implemented in embodiments of the present invention.

SUMMARY

An embodiment may have a regulation apparatus for a power converter, wherein the regulation apparatus is configured to determine a control voltage for the power converter in dependence on an output voltage of the power converter, wherein the regulation apparatus is configured to limit an amplitude of a control voltage phasor describing the control voltage to an amplitude control range around an amplitude of a reference voltage phasor based on the output voltage, limit an angle of the control voltage phasor to an angle control range around an angle of the reference voltage phasor and adjust the amplitude control range and the angle control range depending on the situation.

Another embodiment may have a regulation apparatus for a power converter, wherein the regulation apparatus is configured to determine a control voltage for the power converter in dependence on an output voltage of the power converter, wherein the regulation apparatus is configured to limit a first coordinate of a control voltage phasor describing the control voltage to a first control range around a first coordinate of a reference voltage phasor based on the output voltage, limit a second coordinate of the control voltage phasor to a second control range around a second coordinate of the reference voltage phasor, wherein a first coordinate axis to which the first coordinates are related and a second coordinate axis to which the second coordinates are related are orthogonal and rectilinear to each other.

Another embodiment may have a regulation apparatus for a power converter, wherein the regulation apparatus is configured to determine a control quantity for the power converter, wherein the power converter includes an intermediate circuit, wherein the power converter is configured to provide a bridge voltage indicated by the control quantity based on the control quantity and an intermediate circuit voltage of the intermediate circuit at a circuit node coupled to a terminal point of the power converter via an internal impedance of the power converter, wherein the regulation apparatus is configured to, for the reference voltage phasor, consider a contribution of a least one voltage oscillation in the intermediate circuit to the bridge voltage and/or consider a potential difference between a reference potential of the bridge voltage and a reference potential of the output voltage.

According to another embodiment, a power converter arrangement may have: the inventive regulation apparatus, a power converter including a circuit node, wherein the power converter is configured to provide a voltage indicated by the control voltage at the circuit node, wherein the circuit node can be coupled to an energy grid via an internal impedance of the power converter.

According to another embodiment, a method for regulating a power converter may have the step of: determining a control voltage for the power converter in dependence on an output voltage of the power converter, determining the control voltage may have the steps of: limiting an amplitude of a control voltage phasor describing the control voltage to an amplitude control range around an amplitude of a reference voltage phasor based on the output voltage, limiting an angle of the control voltage phasor to an angle control range around an angle of the reference voltage phasor and adjusting the amplitude control range and the angle control range depending on the situation.

According to another embodiment, a method for regulating a power converter may have the step of: determining a control voltage for the power converter in dependence on an output voltage of the power converter, determining the control voltage may have the steps of: limiting a first coordinate of a control voltage phasor describing the control voltage to a first control range around a first coordinate of a reference voltage phasor based on the output voltage, limiting a second coordinate of the control voltage phasor to a second control range around a second coordinate of the reference voltage phasor, wherein a first coordinate axis to which the first coordinates are related and a second coordinate axis to which the second coordinates are related are orthogonal and rectilinear to each other.

According to another embodiment, a method for regulating a power converter may have the steps of: determining a control quantity for the power converter, providing a bridge voltage indicated by the control quantity at a circuit node coupled to a terminal point of the power converter via an internal impedance of the power converter, wherein providing takes place based on the control quantity and an intermediate circuit voltage of an intermediate circuit of the power converter, wherein the method may have, for determining the control quantity, considering a contribution of at least one voltage oscillation in the intermediate circuit to the bridge voltage and/or considering a potential difference between a reference potential of the bridge voltage and a reference potential of the output voltage.

Embodiments of the present invention are based on the idea of limiting the current fed into a grid by a power converter by limiting a control voltage phasor of a control voltage for regulating the power converter to a range around a reference voltage phasor describing an output voltage of the power converter (e.g., a voltage at terminal point of the power converter to the grid). The inventors have found that the amount of the fed-in current is determined by a deviation between the reference voltage phasor and the control voltage phasor. By limiting the deviation between the control voltage phasor for the power converter and the reference voltage phasor, the fed-in current can be reliably limited. For example, by limiting the deviation to a maximum deviation, the output current can be limited to a maximum current strength, wherein the maximum deviation can be based on the maximum current strength and an internal impedance of the power converter. The limitation of the control range can take place by limiting respective control ranges for coordinates of the control voltage phasor. For example, the control range can be limited via a limitation for an amplitude and an angle (i.e., phase angle) of the control voltage phasor, i.e., the same can be determined in polar coordinates. Alternatively, the control range can be limited via a respective limitation of two coordinates of a rectangular coordinate system.

Within the control range around the reference voltage phasor, to which the control voltage phasor is limited, the inventive concept can allow guiding the control voltage phasor by means of regulator dynamics, for example grid-forming regulator dynamics. Even in the limiting case, the control voltage phasor can still be regulated within the limited range, such that the regulation can still react to a new situation in the sense of the regulator dynamic, e.g., in a grid-compatible manner. Thus, even in the limiting case, the concept allows regulating the power converter in a voltage-controlled manner and to still feed current into the grid. Grid-forming characteristics of the regulation can therefore also be maintained in the limiting case such as in voltage or frequency failures in the grid and can be presented in a targeted manner up to a limiting value.

In contrast to the above-described approach of switching to current regulation in the case of overcurrent, in the inventive regulation, the inherently grid-compatible operating principle is not lost. At the same time, the inventive regulation provides an effective protection against overcurrent. In the regulation principle disclosed herein, in contrary to switching to current regulation, the regulation does not have to be interrupted even in case of failure. Thus, in particular in the case of a frequency event, the problem of when and in what way the current regulation is to be left again does not arise.

Embodiments of the present invention provide a regulation apparatus for a power converter, e.g., a grid-forming power converter. The regulation apparatus is configured to determine a control voltage for the power converter in dependence on an output voltage of the power converter. Further, the regulation apparatus is configured to limit an amplitude of a control voltage phasor describing the control voltage to an amplitude control range around an amplitude of a reference voltage phasor describing the output voltage. For example, the regulation apparatus receives a set control voltage phasor determined according to regulation criteria, e.g., by a control quantity regulation, wherein the set control voltage phasor represents, for example, a voltage phasor desired with respect to the regulation of the output voltage of the power converter to one or several set values (e.g., for one or several of amplitude, frequency, phase angle) and determines the control voltage phasor based on the set control voltage phasor by limiting amplitude and angle. As far as not described to the contrary, the control voltage phasor indicates the limited control voltage phasor whose amplitude and angle are limited to the respective control ranges. Further, the regulation apparatus is configured to limit an angle of the control voltage phasor to an angle control range around an angle of the reference voltage phasor. The regulation apparatus is configured to adjust the amplitude control range and/or the angle control range depending on the situation, i.e., to adjust, for example, a respective quantity of the amplitude control range and/or the angle control range depending on the situation and/or to adjust a respective position of the amplitude control range and/or the angle control range relative to the reference voltage phasor depending on the situation. For example, the regulation apparatus can determine or obtain the amplitude and the angle of the reference voltage phasor based on a measurement quantity describing the output voltage.

By limiting the amplitude of the control voltage phasor to the amplitude control range and limiting the angle of the control voltage phasor to the angle control range, reliable limitation of the deviation of the control voltage phasor from the reference voltage phasor is obtained.

Further, the component-by-component limitation of the control voltage phasor allows prioritization of one of the components of amplitude and angle. When a limiting value is given for the current of the power converter, the freedom of movement in amplitude can be weighted against the freedom of movement in angle. Thus, adaptation to the application case or a current regulation situation is enabled.

For example, situation-dependent adjustment of the amplitude control range and the angle control range can be performed in dependence on an operating state of the power converter or the grid coupled to the power converter. Thereby, in different situations, a different component or coordinate, i.e., according to this embodiment, amplitude or angle can be prioritized. Thus, it is possible to prefer the regulation of the angle or the regulation of the amplitude, depending on the operating situation. In examples, the active component of the output current can be adjusted via the angle of the control voltage phasor, while in particular the reactive component can be adjusted via the amplitude. Therefore, the situation-dependent adjustment of the amplitude control range and the angle control range allows prioritizing the reactive power or the active power in the regulation in different situations in a different manner and/or to a different degree.

For example, the regulation apparatus can limit the control voltage phasor such that a deviation of the control voltage phasor from the reference voltage phasor does not exceed a maximum deviation, wherein the deviation can consider an amplitude deviation, i.e., a deviation of the amplitudes of the two voltage phasors and an angle deviation, i.e., a deviation of the angles of the two voltage phasors. For example, the regulating apparatus can adjust the amplitude control range and the angle control range such that, with full utilization of the respective control ranges, for example in a control voltage phasor which is both at the limit of the amplitude control range as well as the limit of the angle control range, the maximum deviation is not exceeded. In these examples, the regulation apparatus can adjust depending on the situation in what proportion the maximum deviation is divided to the respective control ranges of the coordinates amplitude and angle in order to prioritize one of the coordinates.

Alternatively or additionally, the regulation apparatus can adjust the amplitude control range and/or the angle control range depending on the situation, such that one of the control ranges for one of the coordinates is adjusted in dependence on an actual deviation, i.e., actually used deviation in the other coordinate. For this, for example, the limited control voltage phasor of the current clock or a previous clock (e.g., by assuming a slow change of the control voltage phasor) can be used. Thus, one of the coordinates can be prioritized and the control range for the other coordinate can be selected to be particularly large by considering the actually existing deviation, such that the maximum allowable deviation of the control voltage phasor from the reference voltage phasor can be utilized particularly well. For example, the inventors have found that, at a small angle deviation, the fed-in current is within the limits even in a greater amplitude control range.

According to embodiments, the regulation apparatus is configured to determine an upper and a lower limit of the amplitude control range based on a first deviation limiting value and the amplitude of the reference voltage phasor and to determine an upper and a lower limit of the angle control range based on a second deviation limiting value and the angle of the reference voltage phasor. For example, the first deviation limiting value can represent a limiting value for a deviation of the control voltage phasor from the reference voltage phasor in a first direction and the second deviation limiting value can represent a limiting value for a deviation of the control voltage phasor from the reference voltage phasor in a second direction. The first and the second direction can be directions in a coordinate system in which the control voltage phasor is described, wherein these directions do not necessarily have to correspond to the directions of the coordinate axes. For example, the first and second directions can be orthogonal to each other. In examples, the first direction can be a direction parallel to the reference voltage phasor and the second direction can be a direction orthogonal to the reference voltage phasor. The first direction can also be described as vertical direction and the second direction can be described as horizontal direction. Further, it should be noted that the upper and the lower limit of the respective control ranges do not have to be necessarily arranged symmetrically around the respective coordinate of the reference voltage phasor, in particular in the case of the amplitude control range. Thus, the amplitude control range and the angle control range can describe a range of any shape, in particular also a rectangle, even when the control voltage phasor is in polar coordinates (i.e., amplitude and angle). According to these embodiments, the regulation apparatus is configured to adjust the first deviation limiting value and the second deviation limiting value in dependence on each other, for example, the first and second deviation limiting values are determined in a correlated manner, e.g., based on a common input quantity, or one of the first and second deviation limiting values is determined based on the other one in order to limit a deviation of the control voltage phasor from the reference voltage phasor, for example to limit the same to a maximum deviation. Because the first and second deviation limiting values are determined in dependence on each other, it can be obtained that the deviation of the control voltage phasor from the reference voltage phasor does not exceed a maximum deviation by considering both coordinates and hence the output current does not exceed a maximum current strength.

In other words, these embodiments are based on the finding that considering their actually adjusted control voltage phasor for determining the amplitude control range and/or the angle control range allows selecting the amplitude control range or the angle control range to be as large as possible with respect to a given limiting current. For example, in the case of a small deviation of the control voltage phasor from the reference voltage phasor, in the one coordinate, the limiting value for the other coordinate can be selected to be higher and the current limit can still be maintained. This means in the case that in one component the deviation between control voltage phasor and reference voltage phasor is smaller than allowable according to the associated limiting value, the limiting value for the deviation of the other component can be adjusted such that according to the actual deviation of the control voltage phasor from the reference voltage phasor in the one component, the current limitation is also ensured for the other component, even in the limiting case.

According to embodiments, the regulation apparatus is configured to adjust, at least in a first operating situation, for example normal operation, one or several operating situations of the power converter, the angle control range to a predetermined angle control range, e.g., to a predetermined angle control range around the current reference voltage phasor. For example, the regulation apparatus uses a predetermined value for the second deviation limiting value to determine an upper and a lower limit of the angle control range with respect to the reference voltage phasor. Further, the regulation apparatus is configured to determine the amplitude control range in dependence on an angle deviation of the control voltage phasor (e.g., the limited control voltage phasor) from the reference voltage phasor. Here, the regulation apparatus can use, for example, the angle of the control voltage phasor limited to the angle control range determined for the current clock, or the angle of the limited control voltage phasor of a previous clock. Because the angle control range is predetermined, a minimum size of the angle control range is ensured, i.e., the angle (or a direction transversal to the reference voltage phasor or horizontal direction) is prioritized. Depending on the actual angle deviation, the amplitude control range can then be selected such that even with complete utilization of the amplitude control range, the maximum deviation of the control voltage phasor from the reference voltage phasor is not exceeded. Determining the amplitude control range in dependence on the angle deviation therefore allows, on the one hand, reliably limiting the current to a limiting value and, on the other hand, keeping the range by which the control voltage phasor can be regulated as large as possible.

In other words, by adjusting the angle control range to the predetermined value, regulation of the angle or the horizontal voltage component in a range determined by the predetermined value is ensured, and hence the regulation of the angle or the horizontal component of the control voltage phasor is preferred. This can be advantageous in situations where the regulation of the active component of the output current is to be prioritized. Further, these embodiments show the above-described advantages of considering the actual angle deviation of the control voltage phasor from the reference voltage phasor.

According to embodiments, the regulation apparatus is configured to adjust, in a second operating situation of the power converter, for example during a voltage drop of the output voltage, the amplitude control range to a predetermined amplitude control range, e.g., to a predetermined amplitude control range around the current reference voltage phasor. For example, the regulation apparatus uses a predetermined value for the first deviation limiting value to determine an upper and a lower limit of the amplitude control range with respect to the reference voltage phasor. Further, the regulation apparatus is configured to determine the angle control range in dependence on an amplitude deviation of the control voltage phasor from the reference voltage phasor. According to the description of the previous embodiment, in a second operation situation, instead of the angle or a transversal component (transversal to the reference voltage phasor), the amplitude or a longitudinal component (along the reference voltage phasor) is prioritized. Preferring the regulation of the amplitude or longitudinal component of the control voltage phasor can be advantageous in situations where the regulation of the reactive component of the output current is to be prioritized, for example in the case of a voltage drop.

According to embodiments, the regulation apparatus is configured to determine an upper and a lower limit of the amplitude control range based on a first deviation limiting value and the amplitude of the reference voltage phasor and to determine an upper and a lower limit of the angle control range based on a second deviation limiting value and the angle of the reference voltage phasor. Here, the above description of the lower and upper limits as well as the first and second deviation limiting values can apply. According to this embodiment, the regulation apparatus is configured to adjust, at least in a first operating situation of the power converter, e.g., a normal situation, the first deviation limiting value and the second deviation limiting value to a respective first predetermined value and to adjust, in a second operating situation of the power converter, the first deviation limiting value and the second deviation limiting value to a respective second value, wherein the respective first value differs from the respective second value. For example, depending on the situation, one of the two limiting values can be fixed to a predetermined value and the respective other of the two limiting values can be determined, for example calculated, according to the limiting current strength. These embodiments offer the advantage that the limiting values can be determined depending on the situation and the prioritization degree can be adjusted and/or the prioritized coordinate can be selected, for example, depending on the operating situation.

According to embodiments, the regulation apparatus is configured to determine the angle control range (e.g., the above-mentioned upper and lower limit of the angle control range) in dependence on the amplitude of the control voltage phasor and/or in dependence on the amplitude of the reference voltage phasor. Alternatively or additionally, the regulation apparatus is configured to determine the amplitude control range (e.g., the above-mentioned lower and upper limit of the amplitude control range) in dependence on an angle deviation of the control voltage phasor from the reference voltage phasor. Considering the angle or the amplitude allows a correction of a distortion of the control range as it can occur by the usage of polar coordinates. For example, determining the respective control ranges independent of amplitude and angle of the control voltage phasor or reference voltage phasor when using polar coordinates for determining the control range, can have the effect that the control range describes a circular ring segment in a polar coordinate system. Considering the amplitude of the control voltage phasor or reference voltage phasor effectively allows, for example, a limitation of the control range in transversal direction (e.g., horizontal direction) such that a constant control range in transverse direction is obtained, independent of the amplitude. Considering the angle of the control voltage phasor or reference voltage phasor effectively allows, for example, a limitation of the control range in longitudinal direction (e.g., vertical direction) such that the control range in longitudinal direction, considered in a rectangular coordinate system, is independent of the deviation in transversal direction. When considering amplitude and angle, for example, it can be obtained that by assuming a sufficiently slow change of the control voltage phasor or reference voltage phasor, the control range effectively available for the control voltage phasor describes a rectangle. As the control voltage phasor and the reference voltage phasor can be connected for determining the respective control ranges, e.g., via the first or second deviation limiting value, either the control voltage phasor or the reference voltage phasor can be used, wherein, e.g., the phasor of a previous clock can be considered.

According to embodiments, the regulation apparatus is configured to determine an upper and a lower limit of the amplitude control range based on a first deviation limiting value and the amplitude of the reference voltage phasor. Here, the above description of the lower and upper limits as well as of the first deviation limiting value can apply. As described, determining the lower and the upper limit allows asymmetrical positioning of the limits with respect to the amplitude of the reference voltage phasor, for example in dependence on the angle of the control voltage phasor. Therefore, this embodiment is particularly advantageous in combination with determining the amplitude control range in dependence on the angle deviation.

According to embodiments, the regulation apparatus is configured to determine an upper and a lower limit of the angle control range based on the angle of the reference voltage phasor and based on a ratio between a second deviation limiting value and the amplitude of the control voltage phasor or the reference voltage phasor. Here, the above description of the lower and upper limits as well as the second deviation limiting value can apply. As described, determining the lower and the upper limit allows positioning the limits with respect to the angle of the reference voltage phasor in dependence on the amplitude of the control voltage phasor. Thus, this embodiment is particularly advantageous in combination with determining the angle control range in dependence on the amplitude. Here, the usage of the ratio between the voltage deviation limiting value and the amplitude of the control voltage phasor or the reference voltage phasor allows a good tradeoff between a very exact correction of the stated distortion and little computing effort.

According to embodiments, the regulation apparatus is configured to determine the upper and the lower limit of the angle control range by means of a trigonometrical function in dependence on the ratio between the second deviation limiting value and the amplitude of the control voltage phasor or the reference voltage phasor. The trigonometrical function allows a compensation of the above-described distortions when using polar coordinates and hence a very exact determination of the control range, in particular in the case of large amplitude deviations.

According to embodiments, the regulation apparatus is configured to limit the angle of the control voltage phasor further with respect to a change compared to the angle of the reference voltage phasor or the control voltage phasor of an earlier clock. Thereby, a drift of the frequency of the voltage from a defined tolerance range can be prevented.

According to embodiments, the regulation apparatus is configured to determine a set control voltage based on a comparison of one or several measurement quantities describing an output power of the power converter (e.g., the output voltage and the output current) with one or several set values for the measurement quantities. The regulation apparatus is configured to limit an amplitude of a set control voltage phasor of the set control voltage to the amplitude control range and to limit an angle of the set control voltage phasor to the angle control range to determine the control voltage phasor. Further, the regulation apparatus is configured to determine the amplitude of the set control voltage phasor based on a difference of a measurement quantity (e.g., Q) describing a reactive power of an output power of the power converter and a set value for the reactive power. Further, the regulation apparatus is configured to determine the angle of the set control voltage phasor based on a difference of a measurement quantity describing an active power of an output power of the power converter and a set value for the active power and based on a difference of the amplitude of the set control voltage phasor and a set value for an amplitude of the output voltage of the power converter. Considering the difference of the amplitude of the set control voltage phasor and the set value for the amplitude for determining the angle of the set control voltage phasor can allow a good dynamic reaction in regulating the control voltage, in particular in the case of a resistive grid.

Further embodiments of the present invention provide a regulation apparatus for a power converter, e.g., a grid-forming power converter. The regulation apparatus is configured to determine a control voltage for the power converter in dependence on an output voltage of the power converter. For this, the regulation apparatus is configured to limit a first coordinate of a control voltage phasor describing the control voltage to a first control range around a first coordinate of a reference voltage phasor based on the output voltage and to limit a second coordinate of the control voltage phasor to a second control range around a second coordinate of the reference voltage phasor. The first coordinate axis to which the first coordinates relate, i.e., the first coordinate of the control voltage phasor and the first coordinate of the reference voltage phasor, and a second coordinate axis to which the second coordinates are related are orthogonal and rectilinear to each other. For example, the first and second coordinate axis are orthogonal to each other, but not curvilinear orthogonal to each other, i.e., orthogonal rectilinear. For example, the first and the second coordinate are related to two coordinate axes of a Cartesian coordinate system.

The inventors have found that the usage of a Cartesian coordinate system offers the advantage that the control ranges can be determined very easily, i.e., with little computing effort and at the same time with high accuracy, i.e., that a range determined by a maximum output current can at the same time be maintained and well utilized. In particular, the above-described distortions that can occur when using polar coordinates are prevented. For example, rectangular or circular control ranges for the control voltage phasor can be determined in a very easy manner.

As described above with respect to the previous embodiments, as long as not described to the contrary, the control voltage phasor refers to the limited control voltage phasor whose coordinates are limited to the respective control ranges. Also according to these embodiments, the regulation apparatus can obtain a set control voltage phasor and determine the control voltage phasor based on the set control voltage phasor.

For example, these embodiments can differ from the ones described above in that instead of the amplitude control range and the angle control range, the first and second control ranges, which are determined in an orthogonal coordinate system, are used for the limitation. According to these embodiments, the control voltage phasor is described in a rectangular coordinate system. Further, optionally, these embodiments can differ from the ones described above in that the first and second control ranges are not necessarily determined according to this situation, which can be, however, the case according to embodiments. Apart from these differences, the above-described embodiments can optionally also be combined with these further embodiments, wherein, for example, the first coordinate replaces the amplitude, the second coordinate replaces the angle, the first control range replaces the amplitude control range and the second control range replaces the angle control range. Thus, in examples, the first coordinate can describe a longitudinal component or vertical component and the second coordinate can describe a transversal component or horizontal component. In particular, in this sense, the regulation apparatus can determine the first control range and the second control range as described in dependence on each other and/or the described situation-dependent determination can be implemented.

According to embodiments, the regulation apparatus is configured to limit a deviation of the first coordinate of the control voltage phasor from the first coordinate of the reference voltage phasor to a first deviation limiting value. Further, the regulation apparatus is configured to limit a deviation of the second coordinate of the control voltage phasor from the second coordinate of the reference voltage phasor to a second deviation limiting value. The first and second deviation limiting values can, for example, represent limiting values for an amount of a deviation of the control voltage phasor from the reference voltage phasor. For example, the first and second deviation limiting values are based on an internal impedance of the power converter and a limiting current strength for an output current provided by the power converter (i.e., the fed-in current of the power converter). For example, based on the internal impedance and the limiting current strength, a voltage deviation limiting value can be determined, which can form the basis of an amount of a maximum deviation of the control voltage phasor from the reference voltage phasor. This can also apply to the first and second deviation limiting values according to the implementations with polar coordinates. In combination with the usage of an orthogonal coordinate system, this allows a simple implementation. In particular, simple determination of the deviation limiting values and hence the two control ranges in dependence on each other and/or a simple situation-dependent determination is enabled.

According to embodiments, the first coordinate axis is parallel to the reference voltage phasor and the second coordinate axis is orthogonal to the reference voltage phasor. Thus, the first control range can represent a limitation of the longitudinal component or horizontal component of the control voltage phasor and the second control range can represent a limitation of the transversal component or vertical component of the control voltage phasor. A deviation of the control voltage phasor from the reference voltage phasor in a parallel direction can, for example, be particularly well suited for regulation of the reactive power of the power converter, and a deviation of the control voltage phasor from the reference voltage phasor in an orthogonal direction can, for example, be particularly well suited for regulating the active power. By selecting this coordinate system, the parallel and the orthogonal component can be considered separately or independent of each other and a dependency between the coordinates can be easily implemented.

According to embodiments, the first control range and the second control range describe a control voltage phasor control range limited by parallel lines to the first coordinate axis and parallel lines to the second coordinate axis.

According to embodiments, the regulation apparatus is configured to adjust the first control range and the second control range depending on the situation. As described, the situation-dependent determination of the control ranges described with respect to the above embodiments can also be implemented in the orthogonal coordinate system, with the above shown correspondences and the respective advantages.

According to embodiments, the regulation apparatus is configured to limit the first coordinate of the control voltage phasor further with respect to a change compared to the first coordinate of the reference voltage phasor or the control voltage phasor of an earlier clock. Alternatively or additionally, the regulation apparatus is configured to further limit the second coordinate of the control voltage phasor with respect to a change compared to the second coordinate of the reference voltage phasor or the control voltage phasor of an earlier clock. This embodiment has the same advantages as described above with respect to the limitation of the change of the angle.

According to embodiments, which can be implemented independent of the selection of the coordinate system, the power converter comprises an intermediate circuit and the power converter is configured to provide a bridge voltage indicated by the control voltage based on the control voltage and an intermediate circuit voltage of the intermediate circuit at a switching node coupled to a terminal point of the power converter via an internal impedance of the power converter. The regulation apparatus is configured to consider, for the reference voltage phasor, a contribution of at least a voltage oscillation in the intermediate circuit to the bridge voltage. Alternatively or additionally, the regulation apparatus is configured to consider a potential difference between reference potential of the bridge voltage and a reference potential of the output voltage. Considering one or both of these terms allows an exact limitation of the output current as described with respect to the following embodiments.

Further embodiments of the present invention provide a regulation apparatus. The regulation apparatus is configured to determine a control quantity for the power converter. The power converter comprises an intermediate circuit and is configured to provide, based on the control quantity and an intermediate circuit voltage of the intermediate circuit at a circuit node coupled to a terminal point of the power converter via an internal impedance of the control converter, a bridge voltage indicated by the control quantity. For example, the control quantity indicates a duty cycle for a pulse with modulation (PWM) of a half bridge providing the bridge voltage. The regulation apparatus is configured to consider, for the control quantity, a contribution of at least a voltage oscillation in the intermediate circuit to the bridge voltage. Alternatively or additionally, the regulation apparatus is configured to consider a potential difference between a reference potential of the bridge voltage and a reference potential of the output voltage. The reference potential of the output voltage is, for example, a neutral conductor or ground or earth.

The inventors have found that voltage oscillations can occur in the intermediate circuit, which can show in a contribution to the bridge voltage, in addition to an intended quantity of the bridge voltage that is indicated, for example, by the control voltage. This contribution can particularly be relevant for oscillations with the frequency of the fundamental oscillation of the bridge voltage or with the frequency of a multiple thereof. If this contribution is considered when determining the control quantity, for example by correcting or changing the control quantity accordingly, it can be ensured that the bridge voltage has the desired size. Thus, the accuracy of the current limitation can be increased.

Further, the inventors have found that the reference potential of the bridge voltage can differ from the reference potential of the output voltage. As the control quantity can be determined based on the output voltage, for example by the regulation apparatus, this potential difference can have the effect that an adjusted bridge voltage can differ by this potential difference from a voltage provided with a power converter regulation. For example, a power converter regulation for regulating the power converter can provide a specific ratio (e.g., in amplitude and phase angle) of the bridge voltage to the output voltage and the control quantity can be determined such that the bridge voltage is adjusted accordingly. The potential difference can have the effect that the resulting ratio between the bridge voltage and the output voltage does not correspond to the intended one. According to the invention, such an error can be prevented by considering the potential difference for the control quantity. This can also increase the accuracy of the current limitation.

According to embodiments, the voltage oscillation is a voltage oscillation between an intermediate circuit voltage supply and a reference potential of the intermediate circuit or alternatively a voltage oscillation between an intermediate circuit voltage supply and a further intermediate circuit voltage supply. The reference potential of the intermediate circuit can be, for example, an average value of the potentials of two or several intermediate circuit voltage supplies. For example, the intermediate circuit includes one or several capacitances connected in series between the intermediate circuit supplies. Thus, a voltage oscillation can occur between one of the intermediate circuit voltage supplies and the reference potential, even when the intermediate circuit voltage (for example a voltage between the intermediate circuit supplies) is constant. In examples, the reference potential of the intermediate circuit can correspond to the reference potential of the bridge voltage. In further examples, the reference potential of the bridge voltage can be actively regulated with respect to the intermediate circuit, e.g., by a half bridge provided for this purpose.

According to embodiments, a frequency of the voltage oscillation, i.e., the considered voltage oscillation, is one or several times a fundamental oscillation of the bridge voltage (or the output voltage). The inventors have found that a voltage oscillation with such a frequency can result in a relevant contribution to the bridge voltage. In examples, the regulation apparatus can consider the contributions of several voltage oscillations whose frequencies each are one or several times the fundamental oscillation.

According to embodiments, the reference potential of the bridge voltage depends on the potential of at least one intermediate circuit voltage supply. For example, the potential of the intermediate circuit voltage supplies can be floating with respect to the reference potential of the output voltage.

According to embodiments, the reference potential of the bridge voltage is determined by an average value of the potentials between which the intermediate circuit voltage is applied.

According to embodiments, the power converter is a multi-phase power converter and the power converter is configured to provide one bridge voltage each for each of a plurality of phases of the power converter at a respective circuit node coupled to a respective terminal point of the power converter via a respective internal impedance of the power converter. For example, the regulation apparatus according to these embodiments can determine one control quantity each for each of the phases, e.g., for regulating a respective half bridge providing the respective bridge voltage. Here, the regulation apparatus can consider the contribution of the voltage oscillation for each of the control quantities. Further, the regulating apparatus can consider, for each of the phases, the contribution of the potential difference between the reference potential of the intermediate circuit and the reference potential of the bridge voltages. The inventors have found that the voltage oscillations can generate a relevant contribution, in particular in the case of unbalanced regulated bridge voltages.

According to embodiments, the reference potential of the bridge voltage is based on a sum of the bridge voltages for the plurality of phases. For example, the reference potential is the sum of the bridge voltages or the average value of the bridge voltages. Alternatively, the reference potential of the bridge voltage can also be the sum of respective control voltages for the bridge voltages.

According to embodiments, the regulation apparatus is configured to determine a control voltage for the power converter in dependence on an output voltage of the power converter and to determine the control quantity based on the control voltage. For example, the control voltage can correspond to the control voltage as described with respect to the above embodiments. For example, the control voltage indicates the bridge voltage to be adjusted. According to these embodiments, the regulation apparatus is configured to consider the contribution of the voltage oscillations and/or the potential difference for determining the control voltage. For example, the regulation apparatus can correspond to one of the above described regulation apparatuses and the voltage oscillation and/or the potential difference can be considered when determining the reference voltage phasor and can hence be considered when limiting the control voltage phasor, such that the control voltage phasor can be limited in a particularly exact manner. Alternatively, the regulation apparatus can determine the control quantity based on the control voltage and additionally based on the contribution of the voltage oscillation and/or the potential difference. The latter alternative offers the advantage that the contributions are also considered in the regulation.

According to embodiments, the regulation apparatus corresponds to one of the regulation apparatuses described above that are configured to limit the control voltage phasor.

The following advantageous embodiments relate to all the above-described embodiments of the regulation apparatuses.

According to embodiments, the regulation apparatus is configured to determine a set control voltage based on a comparison of one or several quantities describing an output power of the power converter (e.g., one or several measurement quantities, e.g., out of output voltage, output current, reactive power, active power and one or several control quantities, e.g., frequency, amplitude) with one or several set values or nominal values for the quantities, and to supply the set control voltage to the limitation in order to determine the control voltage. This means the coordinates (e.g., amplitude/angle or first/second coordinate) of the set control voltage phasor are supplied to a limiting function to determine the coordinates of the control voltage phasor, such that the coordinates of the control voltage phasor are limited according to the limiting function. For example, the regulation apparatus can comprise a regulation, here also called power converter regulation, for example a grid-forming regulation and the determination of the set control voltage can take place according to the regulation of the regulation apparatus, for example according to a grid-forming regulation. In other words, the set control voltage can correspond to an unlimited control voltage that is determined according to a regulation of the power converter. Thus, within the amplitude control range and the angle control range, the amplitude and the angle of the control voltage can be regulated according to the regulation of the regulation apparatus, wherein, within the amplitude control range and the angle control range, the characteristics of the regulation can be used, for example grid-forming characteristics of a grid-forming regulation.

According to embodiments, the regulation apparatus is configured to limit a first coordinate of a set control voltage phasor of the set control voltage to a first control range and to limit a second coordinate of the set control voltage phasor to a second control range to determine the control voltage phasor. According to these embodiments, the regulation apparatus is configured to determine the first coordinate (42') (e.g., the amplitude or the first of two coordinates that are orthogonal to each other) and the second coordinate (e.g., the angle or the second one of two coordinates that are orthogonal to each other) of the set control voltage phasor by using respective integrators. According to these embodiments, the regulation apparatus is configured to lead, in the case of a deviation of a first coordinate of the control voltage phasor from the first coordinate of the set control voltage phasor, an integrator input quantity of the integrator used for determining the first coordinate of the set control voltage phasor, to zero or to reinitialize the integrator used for the determination of the first coordinate of the set control voltage phasor. According to these embodiments, the regulation apparatus is further configured to lead, in the case of a deviation of a second coordinate of the control voltage phasor from the second coordinate of the set control voltage phasor, an integrator input quantity of the integrator used for determining the second coordinate of the set control voltage phasor, to zero or to reinitialize the integrator used for the determination of the second coordinate of the set control voltage phasor. Thereby, it can be prevented that the amplitude or the angle and the rotational speed of the control set voltage phasor drift off due to a limitation of the control voltage phasor.

According to embodiments, the power converter is a multi-phase power converter. Here, the reference voltage phasor describes a plurality of output voltages that are each allocated to a phase of a plurality of phases of the power converter. For example, the reference voltage phasor is a space phasor describing the plurality of output voltages. According to these embodiments, the power converter is configured to provide a voltage indicated by the control voltage for each of the phases. Therefore, the control voltage can allow regulation of several phases. Such a regulation can in particular be advantageous for balanced grids as the same may have a low implementation effort.

According to embodiments, the power converter is a multi-phase power converter and the regulation apparatus is configured to determine, for each of a plurality of phases of the power converter, one control voltage each in dependence on an output voltage of the respective phase. According to these embodiments, the regulation apparatus is configured to determine, for each of the phases, a control voltage phasor describing the respective control voltage and to limit the respective control voltage phasors to a control range, for each of the phases separately. For example, the regulation apparatus can determine a respective control range for each of the phases based on the output voltage of the respective phase, e.g., a respective control range around the respective reference voltage phasor. Here, the respective control ranges can be determined, for example, based on respective deviation limiting values or based on common deviation limiting values for all phases. Limiting the control voltage phasors separately is in particular advantageous to perform the limitation in the case of an unbalanced event in the grid adapted to the respective phase.

According to embodiments, the power converter is a three-phase power converter. Here, the power converter is configured to provide, depending on the control voltage, one voltage each for a first, second and third phase of the three-phase power converter. According to these embodiments, the regulation apparatus is configured to obtain a positive-phase sequence system reference voltage phasor, a negative-phase sequence system reference voltage phasor and a zero-phase sequence system reference voltage phasor, which commonly describe respective output voltages of the first, second and third phase. Here, the regulation apparatus is configured to limit a positive-phase sequence system control voltage phasor (32*p*) describing a positive-phase sequence system of the control voltage to a control range around the positive-phase sequence system reference voltage phasor. Further, the regulation apparatus in these embodiments is configured to limit a negative-phase sequence system control voltage phasor (32*n*) describing a negative-phase sequence system of the control voltage to a control range around the negative-phase sequence system reference voltage phasor. Further, the regulation apparatus in these embodiments is configured to limit a zero-phase sequence system control voltage phasor describing a zero-phase sequence system of the control voltage to a control range around the zero-phase sequence system reference voltage phasor. A separate limitation of the control voltage in positive-phase sequence system, negative-phase sequence system and zero-phase sequence system serves to limit the individual phase currents even in the case of an unbalanced event in the grid. By regulating the power converter in the positive-phase sequence system, negative-phase sequence system and zero-phase sequence system, the power converter can adjust its balance contribution.

According to embodiments, the power converter is configured to provide a bridge voltage indicated by the control voltage at a circuit node coupled to a terminal point of the power converter via an internal impedance of the power converter. For example, the power converter can be configured to be coupled to a grid at the terminal point.

Further embodiments of the present invention provide a power converter arrangement comprising the regulation apparatus according to any of the preceding embodiments and the power converter, wherein the power converter comprises the circuit node. Here, the power converter is configured to provide a voltage indicated by the control voltage at the circuit node. Further, the circuit node can be coupled to an energy grid via an internal impedance of the power converter.

Further embodiments provide a method for regulating a power converter. The method includes determining a control voltage for the power converter in dependence on an output voltage of the power converter, wherein determining the control voltage comprises a step of limiting an amplitude of a control voltage phasor describing the control voltage to an amplitude control range around an amplitude of a reference voltage phasor based on the output voltage. A step of limiting an angle of the control voltage phasor to an angle control range around an angle of the reference voltage phasor. Further, the method includes situation-dependent adjusting of the amplitude control range and the angle control range.

Further embodiments provide a method for regulating a power converter. The method includes determining a control voltage for the power converter in dependence on an output voltage of the power converter, wherein determining the control voltage comprises: a step of limiting a first coordinate of a control voltage phasor describing the control voltage to a first control range around a first coordinate of a reference voltage phasor based on the output voltage. A step of limiting a second coordinate of the control voltage phasor to a second control range around a second coordinate of the reference voltage phasor. Here, a first coordinate axis to which the first coordinates are related and a second coordinate axis to which the second coordinates are related are orthogonal to each other.

Further embodiments provide a method for regulating a power converter. The method includes a step of determining a control quantity for the power converter. Further, the method includes a step of providing a bridge voltage indicated by the control quantity to a circuit node coupled to a terminal point of the power converter via an internal impedance of the power converter. Providing the bridge voltage takes place based on the control quantity and an intermediate circuit voltage and an intermediate circuit of the power converter. Further, for determining the control quantity, the method includes considering a contribution of at least a voltage oscillation in the intermediate circuit to the bridge voltage and/or considering a potential difference between a reference potential of the bridge voltage and a reference potential of the output voltage.

Further embodiments provide a computer program having a program code for performing one of the methods described herein when the program runs on a computer or signal processor.

BRIEF DESCRIPTION OF THE DRAWINGS

Embodiments of the present invention will be detailed subsequently referring to the appended drawings, in which:

FIG. 21 shows a flow diagram of a method for regulating a grid-coupled power converter, FIG. 23 shows a flow diagram of a method for regulating a grid-coupled power converter.

DETAILED DESCRIPTION OF THE INVENTION

In the following, examples of the present disclosure will be described in detail and by using the accompanying description. In the following description, many details are described for providing a thorough explanation of examples of the disclosure. However, it is obvious for a person skilled in the art that other examples can be implemented without these specific details. Features of the different described examples can be combined except when features of a respective combination exclude each other or such a combination is explicitly excluded.

It should be noted that the same or similar elements or elements having a similar functionality can be provided with the same or similar reference numbers or can be indicated in the same way, wherein a repeated description of elements provided with the same or similar reference numbers or that are indicated in the same way is typically omitted. Descriptions of elements that have the same or similar reference numbers or that are indicated in the same way are interchangeable.

Figure 1:
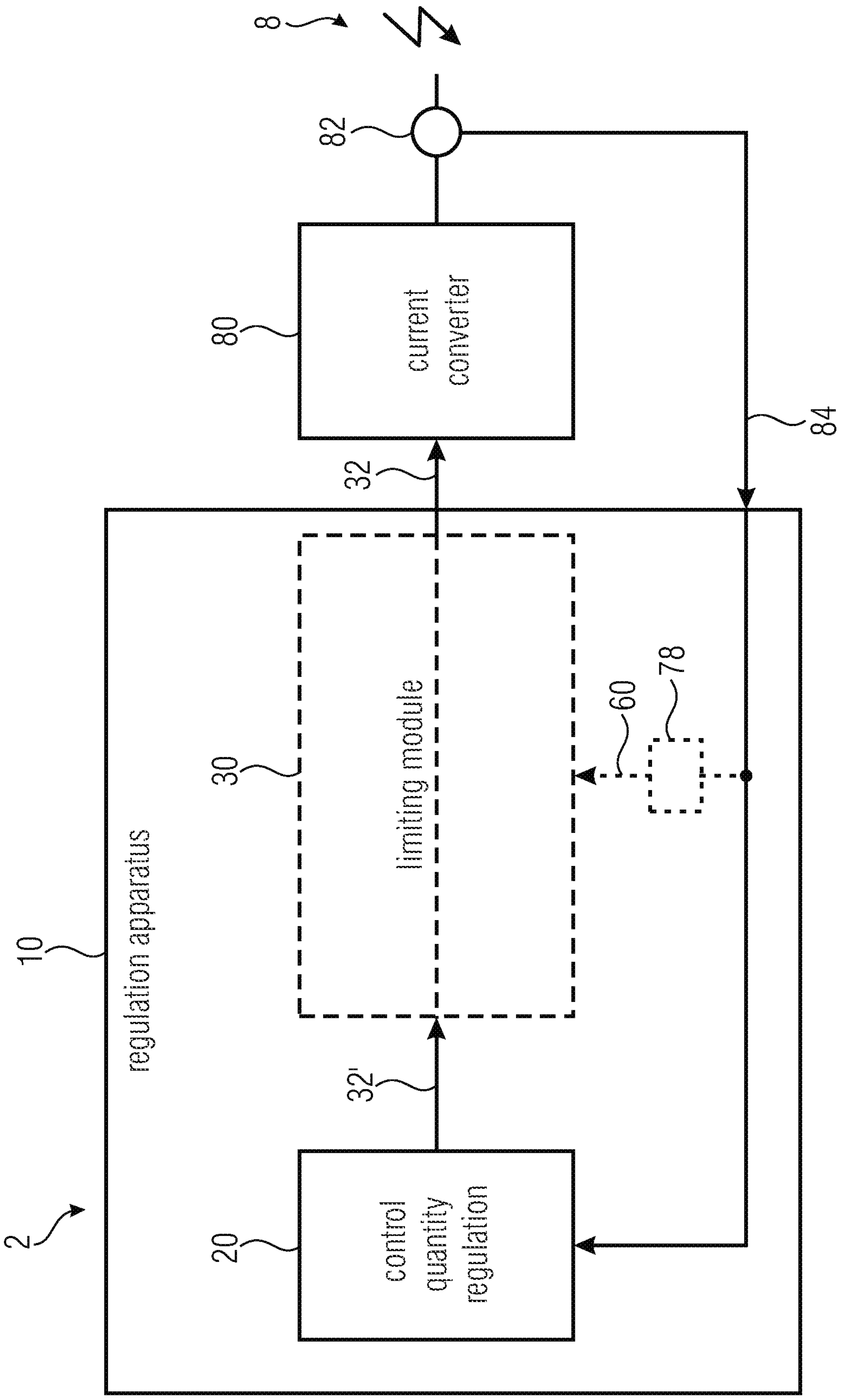
FIG. 1 illustrates an embodiment of a regulation apparatus.

The following description begins with a description of a regulation apparatus in connection with a power converter according to embodiments of the invention. The regulation apparatus described with respect to FIG. 1 represents a frame in which embodiments of the invention can optionally be implemented. However, it should be noted that other embodiments can be implemented differently than in the frame shown in FIG. 1.

It should be noted that optional elements and signals are illustrated in dotted lines as well as optional groupings of elements.

FIG. 1 illustrates a regulation apparatus 10 for a power converter 80. The regulation apparatus 10 is configured to determine a control voltage 32 for the power converter 80. The power converter 80 can be coupled to an energy grid 8 at a terminal point 82. The regulation apparatus 10 can include a control quantity regulation 20, which determines a set control voltage 32' based on one or several measurement quantities 84. The measurement quantities 84 describe, for example, an output voltage and/or an output current of the power converter 80, for example at the terminal point 82. The power converter regulation 20 is, for example, a grid-forming regulation. Alternatively, the power converter regulation 20 can be implemented separately from the regulation apparatus 10 and can provide the set control voltage 32' for the same. The set control voltage 32' can represent, for example, information on a voltage to be adjusted by the power converter 80.

The regulation apparatus 10 optionally includes a limiting module 30 that receives the set control voltage and determines a control voltage 32 that is limited to a control range around a reference voltage phasor 60. In this case, the control voltage 32 or information derived therefrom, e.g., a control quantity, is passed on to the power converter. The reference voltage phasor 60 describes the output voltage of the power converter. The reference voltage phasor 60 can be determined by a reference voltage phasor determination module 78 based on one or several of the measurement quantities 84. For example, the reference voltage phasor 60 can be determined based on a time course of a measurement quantity describing the output voltage. In examples, the reference voltage phasor is determined independent of the output current of the power converter.

The set control voltage and the control voltage can be represented based on voltage phasors that are described, in several, for example two, coordinates. The coordinates can relate, for example, to a polar coordinate system in which a voltage phasor can be described in amplitude and angle (phase angle). Alternatively, a voltage phasor can be described in a Cartesian or orthogonal coordinate system in which the coordinates can express, for example, a real and imaginary part of the voltage phasor. The set control voltage phasor 32' and the control voltage phasor 32 can be described independent of each other in one of these coordinate systems, i.e., optionally, conversion can be performed prior and/or after the limitation 30. The set control voltage phasor 32' and the control voltage phasor 32 can also exist in the same coordinate system.

The regulation apparatus 10 can be implemented separately of the power converter 80 and can provide the control voltage 32 for the power converter 80. Alternatively, the regulation apparatus 10 can also be part of the power converter 80, completely or partly. For example, the regulation apparatus can be a computer or a signal processor or can include one or several thereof, and the described modules of the regulation apparatus can be part of a software executed thereon.

Embodiments of the present invention include a power converter arrangement 2, which comprises the regulation apparatus 10 and the power converter 80. The regulation apparatus 10 can provide the control voltage 32, for example in the form of information or a signal for the power converter.

Figure 2:
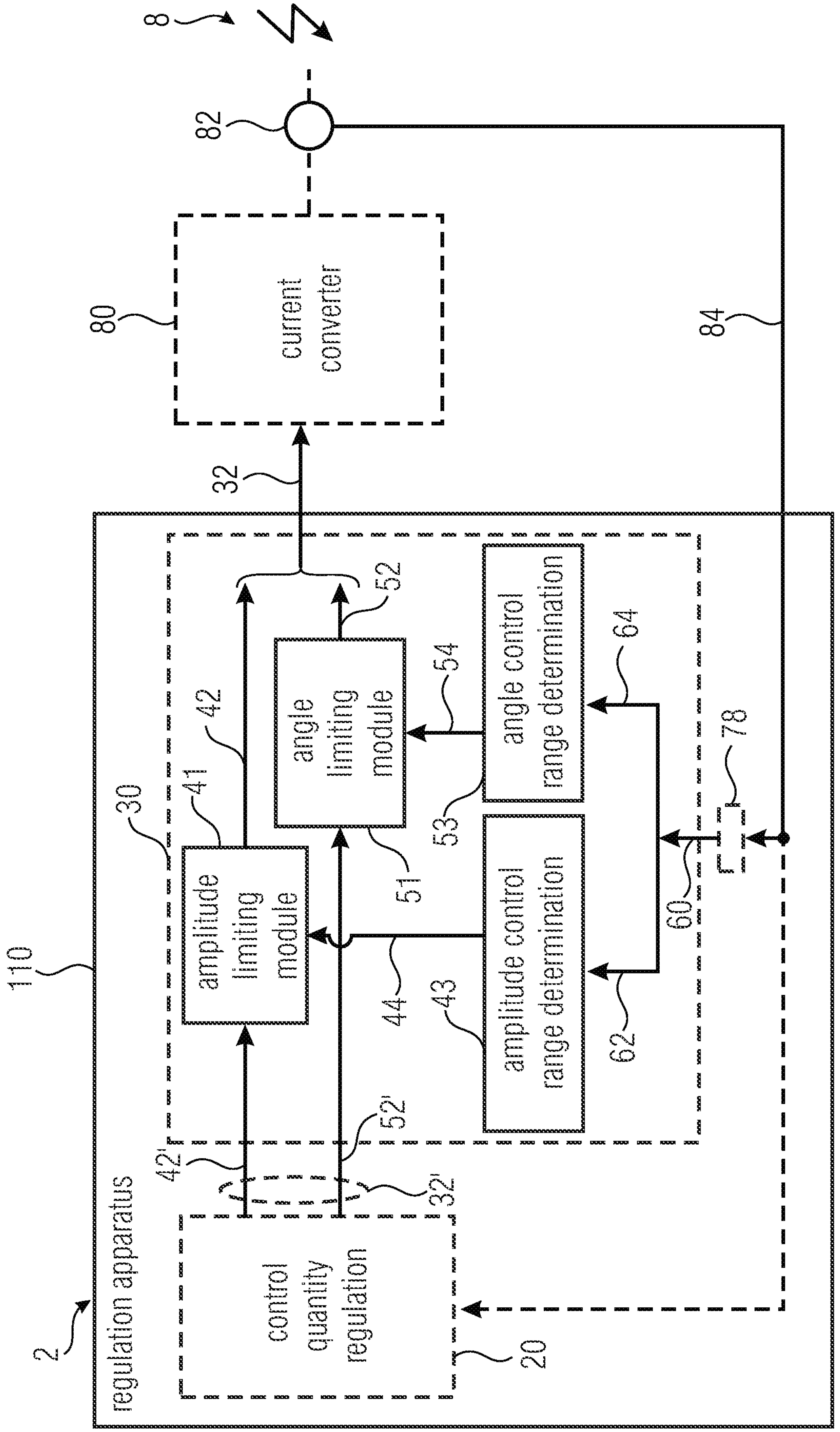
FIG. 2 illustrates an embodiment of a regulation apparatus with situation-dependent control range determination.

FIG. 2 illustrates a regulation apparatus 110 for the power converter 80 according to an embodiment. Optionally, the regulation apparatus 110 can correspond to the regulation apparatus 10 and can optionally comprise the features described with respect to FIG. 1. The regulation apparatus 110 is configured to determine a control voltage 32 for the power converter in dependence on the output voltage of the power converter 80. The regulation apparatus 110 comprises an amplitude limiting module 41 that is configured to limit an amplitude 42 of a control voltage phasor describing the control voltage 32 to an amplitude control range 44 around an amplitude 62 of a reference voltage phasor 60 describing the output voltage. For example, the reference voltage phasor 60 represents information on the output voltage. The regulation apparatus 110 comprises an amplitude control range determination module 43 that is configured to determine the amplitude control range 44. Further, the regulation apparatus 110 includes an angle limiting module 51 that is configured to limit an angle 52 of the control voltage phasor 32 to an angle control range 54 around an angle 64 of the reference voltage phasor 60. The regulation apparatus 110 comprises an angle control range determination module 53 that is configured to determine the angle control range 54. The regulation apparatus 110 is configured to determine the amplitude control range 44 and the angle control range 54 depending on the situation.

The amplitude limiting module 41 receives, as input quantity, an amplitude 42' of an unlimited control voltage phasor 32', which is also referred to as set control voltage phasor 32'. The amplitude limiting module 41 can provide, for example, the amplitude 42' as the amplitude 42 when the amplitude 42' is within the amplitude control range 44 and can otherwise limit the amplitude 42' to the amplitude control range 44 to obtain the amplitude 42. Accordingly, the angle limiting module 51 can obtain an angle 52' of the set control voltage phasor 32'. For example, the angle limiting module 51 can provide the angle 52' as the angle 52 when the angle 52' is within the angle control range 54 and can otherwise limit the angle 52' to the angle control range 54 to obtain the angle 52.

An output current fed into the grid 8 by the power converter 80 (for example a current at the terminal point 82) can depend on a deviation between the control voltage phasor and the reference voltage phasor or can be determined by the same. By limiting of the control voltage phasor 32, it can be ensured that the control voltage phasor can deviate from the reference voltage phasor 60 within the amplitude control range 44 and the angle control range 54 and a limiting current strength for the output current is still maintained.

A situation depending on which the amplitude control range 44 and the angle control range 54 can be determined can result, for example, from the operating state of the power converter 80 or from the output voltage and/or the output current of the power converter 80, for example, from a time course of the output voltage and/or the output current at the terminal point 82. For example, in the case of a voltage drop, a frequency event or another failure, determining the amplitude control range 44 and the angle control range 54 can take place differently compared to a normal situation without any failure.

For example, depending on the situation, a selection of a prioritized coordinate or component of the amplitude and the angle of the control voltage phasor 32 can be made. For example, in a first operating situation of one or several operating situations of the power converter, the angle control range 54 is set to a predetermined range. In this case, the amplitude control range 44 can be determined in dependence on the actual angle deviation of the control voltage indictor 32 from the reference voltage phasor 60. Here, the limited angle of the control voltage phasor of the current clock can be considered or, in order to prevent an algebraic loop, the angle of an earlier clock.

For example, in a second operating situation of the power converter, for example during a failure, the amplitude control range 44 can be set to a predetermined range. In this case, the angle control range 54 can be determined in dependence on the actual amplitude deviation of the voltage phasor 32 from the reference voltage phasor 60. Here, the limited amplitude of the control voltage phasor of the current clock can be considered or, in order to prevent an algebraic loop, the amplitude of an earlier clock.

In further examples, the amplitude control range 44 and the angle control range 54 can be determined in dependence on each other, i.e., in a correlated manner, e.g., such that deviation of the control voltage phasor 32 from the reference voltage phasor 60 does not exceed a maximum deviation, e.g., even not when the control voltage phasor 32 is at the limits of both control ranges. In this case, depending on the situation, the size of the two control ranges can be adjusted, for example, depending on the situation, a ratio of the sizes of the two ranges can be set.

According to embodiments, the regulation apparatus 110 is configured to determine the amplitude 62 and the angle 64 of the reference voltage phasor based on a measurement quantity describing the output voltage, for example $U_0$, which can be part of the measurement quantities 84. For this, the regulation apparatus 110 can comprise a reference voltage phasor determination module 78.

The amplitude 42' and the angle 52' of the unlimited control voltage phasor can be determined by a control quantity regulation 20. The control quantity regulation 20 can be part of the regulation apparatus 110 as exemplarily illustrated in FIG. 1. Alternatively, the control quantity regulation 20 can be implemented separately from the regulation apparatus 110 and the regulation apparatus 110 can receive the unlimited control voltage phasor from the control quantity regulation 20. The one or several measurement quantities 84 can describe a voltage $U_0$ and a current $I_0$ at the terminal point 82. The control quantity regulation 20 can determine the amplitude 42' and the angle 52' of the set control voltage phasor based on the one or several measurement quantities 84. For this, the control quantity regulation 20 can compare one or several measurement quantities with their respectively associated set values and determine the set control voltage phasor based on the comparison. For example, based on the measurement quantities 84, the control quantity regulation 20 can determine one or several of measurement quantities describing an output power of the power converter. The output power of the power converter can be, for example, a power fed into the grid 8 at the terminal point 82 by the power converter 80. Based on a current measured at the terminal point 82 and a voltage measured at the terminal point 82, the control quantity regulation 20 can determine an active power P and a reactive power Q.

According to embodiments, the control quantity regulation is configured to determine, based on a comparison of one or several measurement quantities, e.g., P, Q, describing an output power of the power converter, with one or several set values or nominal values for the measurement quantities, a set control voltage, which is described, for example, by the set control voltage phasor with amplitude 42' and angle 52'. The amplitude 42' and the angle 52' are input quantities for the amplitude limiting module 41 and the angle limiting module 51 determining the amplitude 42 and the angle 52 based thereon.

Figure 3:
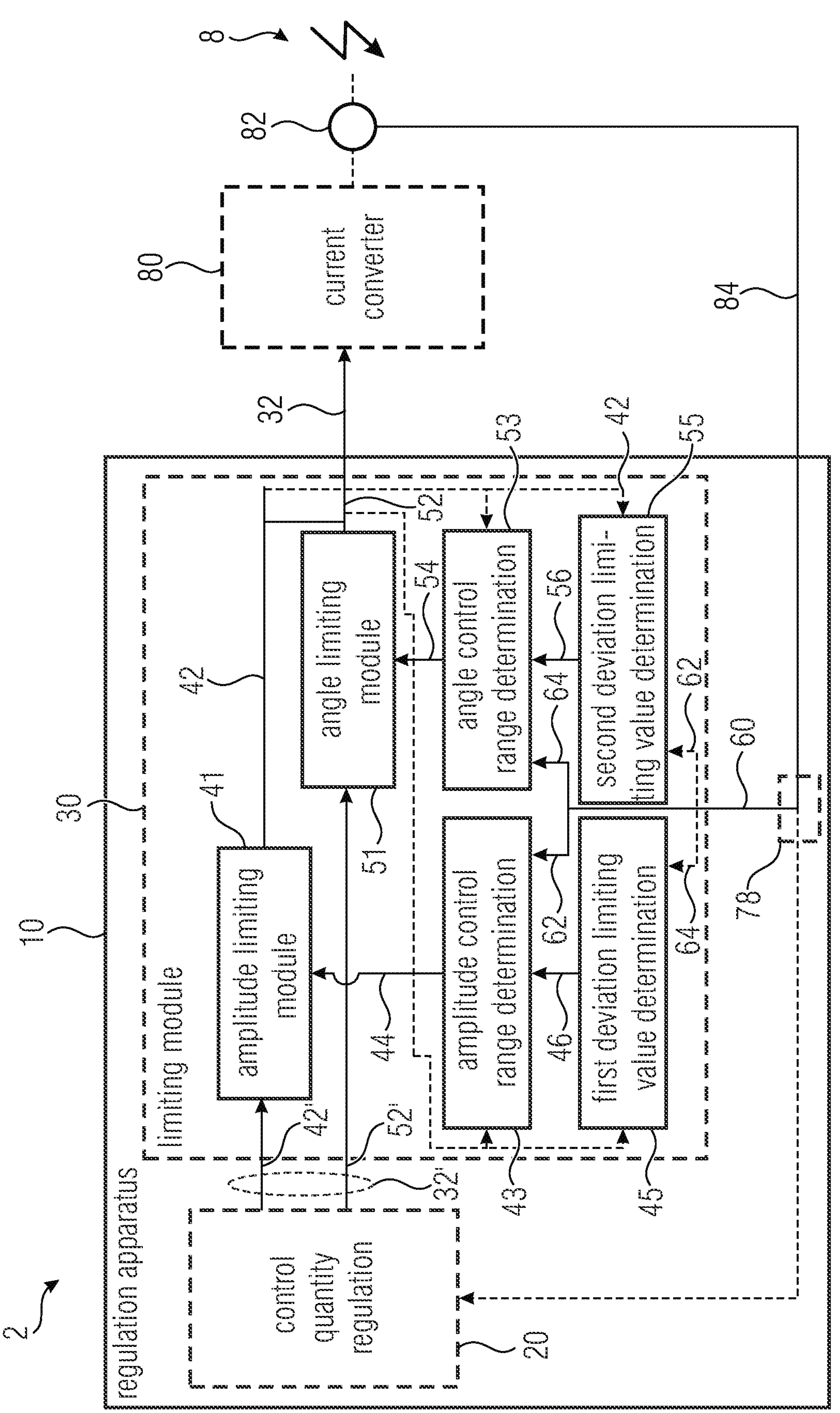
FIG. 3 illustrates an embodiment of a regulation apparatus with deviation limiting value determination.

FIG. 3 illustrates a further embodiment of the regulation apparatus 110. According to the embodiment of FIG. 3, the regulation apparatus 110 comprises a first deviation limiting value determination module 45 that is configured to determine the one first deviation limiting value 46 and to provide the same for the amplitude control range determination module 43. The regulation apparatus 110 according to FIG. 3 further includes a second deviation limiting value determination module 55 that is configured to determine a second deviation limiting value 56 and provide the same to the angle control range determination module 53.

The first and second deviation limiting values can indicate respective values for a maximum deviation in a first and a second direction from the reference voltage phasor 60 as will be described below in more detail with reference to FIG. 4B.

Figure 4A:
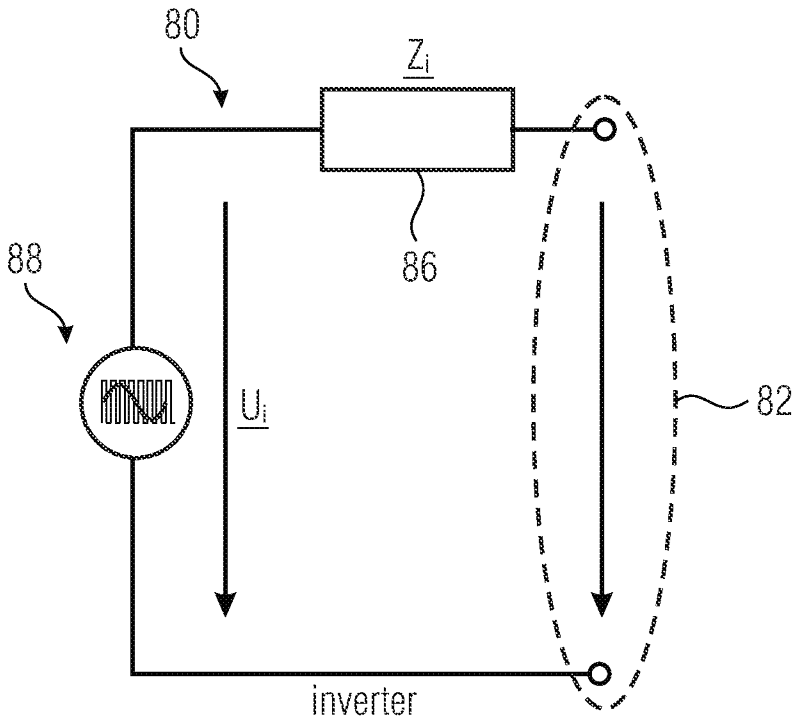
FIG. 4A shows an equivalent circuit diagram of a power converter according to an embodiment.
Figure 4B:
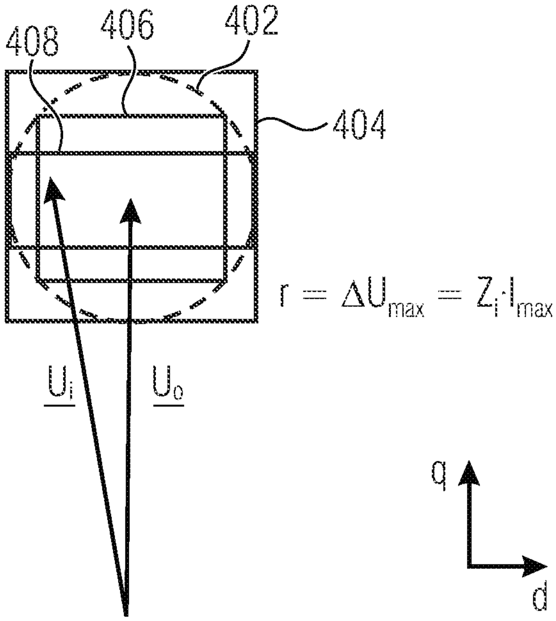
FIG. 4B illustrates examples of control ranges.

In examples where the first deviation limiting value 46 and the second deviation limiting value 56 are determined separately, as can be the case, e.g., in the case of the rectangular areas of FIG. 4B, the first deviation limiting value 46 and the second deviation limiting value 56 can be determined depending on the situation, such that weighting between the first and second deviation limiting value 56 is adjusted depending on the situation.

FIG. 4A shows an equivalent circuit diagram of an example of the power converter 80. The equivalent circuit diagram illustrates the power converter 80 as equivalent two-pole. According to FIG. 4A, the power converter 80 is configured to provide a bridge voltage $U_i$ indicated by the control voltage 32 at a circuit node 80 coupled to the terminal point 82 of the power converter 80 via an internal impedance 86 of the power converter 80.

For example, the internal impedance 86 can be a filter impedance or part of a filter impedance, for example of a sinusoidal filter. The power converter 80 provides the bridge voltage $U_i$ at the circuit node 88 based on the control voltage 32 provided by the regulation apparatus 10. As indicated in FIG. 4A, the output voltage applied to the terminal point 82 can be described by the reference voltage phasor 60. It should be noted that the terminal point 82 describes a point where the output voltage is measured. The terminal point 82 can be selected differently, as long as the internal impedance 86 describes the impedance between the circuit node 88 and the terminal point 82. For example, the capacitor voltage (e.g., as output voltage) can be measured or another voltage of the power converter or the grid connection. In this case, the internal impedance also has to be adapted accordingly. Therefore, the bridge voltage 88 provided by the power converter 80 based on the control voltage 32 is therefore connected to the output voltage measured at the terminal point 82 via the internal impedance 86.

Further, it should be noted that underlined quantities such as $U_i$, $U_0$, and $Z_i$ in FIG. 4A can be vectorial quantities that are described, for example, by complex phasors. These phasors can described a time course or a frequency dependency of the respective quantities, for example, by means of an amplitude in an (phase) angle. For example, the internal impedance Zi can be frequency dependent.

A current fed into the grid 8 by the power converter 80, i.e., an output current provided by the power converter 80 depends, according to FIG. 4A, on a difference between the bridge voltage $U_i$ and the output voltage $U_0$ as well as on the internal impedance 86. For example, a product of the output current and the internal impedance 86 can correspond to the difference between $U_i$ and $U_0$.

Accordingly, according to embodiments, the first and second deviation limiting value 46, 56 are determined based on the internal impedance 86 of the power converter and a limiting current strength $I_{max}$ for an output current provided by the power converter. For example, based on the limiting current strength and the internal impedance 86, a voltage deviation limiting value can be determined that can be used for determining the first and/or the second deviation limiting value 46, 56. The voltage deviation limiting value can be an indicator for a maximum deviation of the controlled voltage phasor $U_i$ from the output voltage phasor $U_0$, cf. FIG. 4B.

Therefore, according to the invention, the output current of the power converter 80 can be limited in that a difference between the bridge voltage $U_i$ and the output voltage $U_0$ is limited as will be described below with reference to FIG. 4B. As the bridge voltage $U_i$ can depend directly on the control voltage 32, which indicates the bridge voltage to be set by the power converter 80, a limitation of the control voltage 32 can effect a limitation of the bridge voltage. Accordingly, a limitation of the control voltage 32 can mean to limit the control voltage 32 such that the bridge voltage indicated by the control voltage 32 is limited as described.

The controlled voltage phasor $U_i$ describes the bridge voltage provided at the circuit node 88 and is indicated by the control voltage phasor 32. This means the control voltage phasor 32 can represent information (or a signal) based on which the power converter 80 provides the bridge voltage. The control voltage phasor 32 can correspond to the controlled voltage phasor $U_i$. Alternatively, the control voltage phasor 32 can differ from the controlled voltage phasor $U_i$ and can be connected to the same, for example, via one or several scaling factors and one or several offset factors or correction terms. These factors can be considered when limiting the control voltage phasor 32 (cf. correction terms 71, 72 in FIG. 5). The ratio between the control voltage phasor 32 and the controlled voltage phasor $U_i$ (i.e., for example an offset or a scaling) can again be considered when determining and/or limiting the control voltage phasor 32, by considering the ratio when determining the reference voltage indictor 60 based on the output voltage $U_0$. In other words, considering the deviation from the controlled voltage phasor $U_i$ from the output voltage phasor $U_0$ can be, in examples, equivalent to a consideration of the deviation of the control voltage phasor 32 from the reference voltage phasor 60. The considerations of the controlled voltage phasor $U_i$ and the output voltage phasor $U_0$ described with respect to FIG. 4*b* can therefore be used accordingly for limiting the control voltage phasor to the control range around the reference voltage phasor 60.

Figure 15:
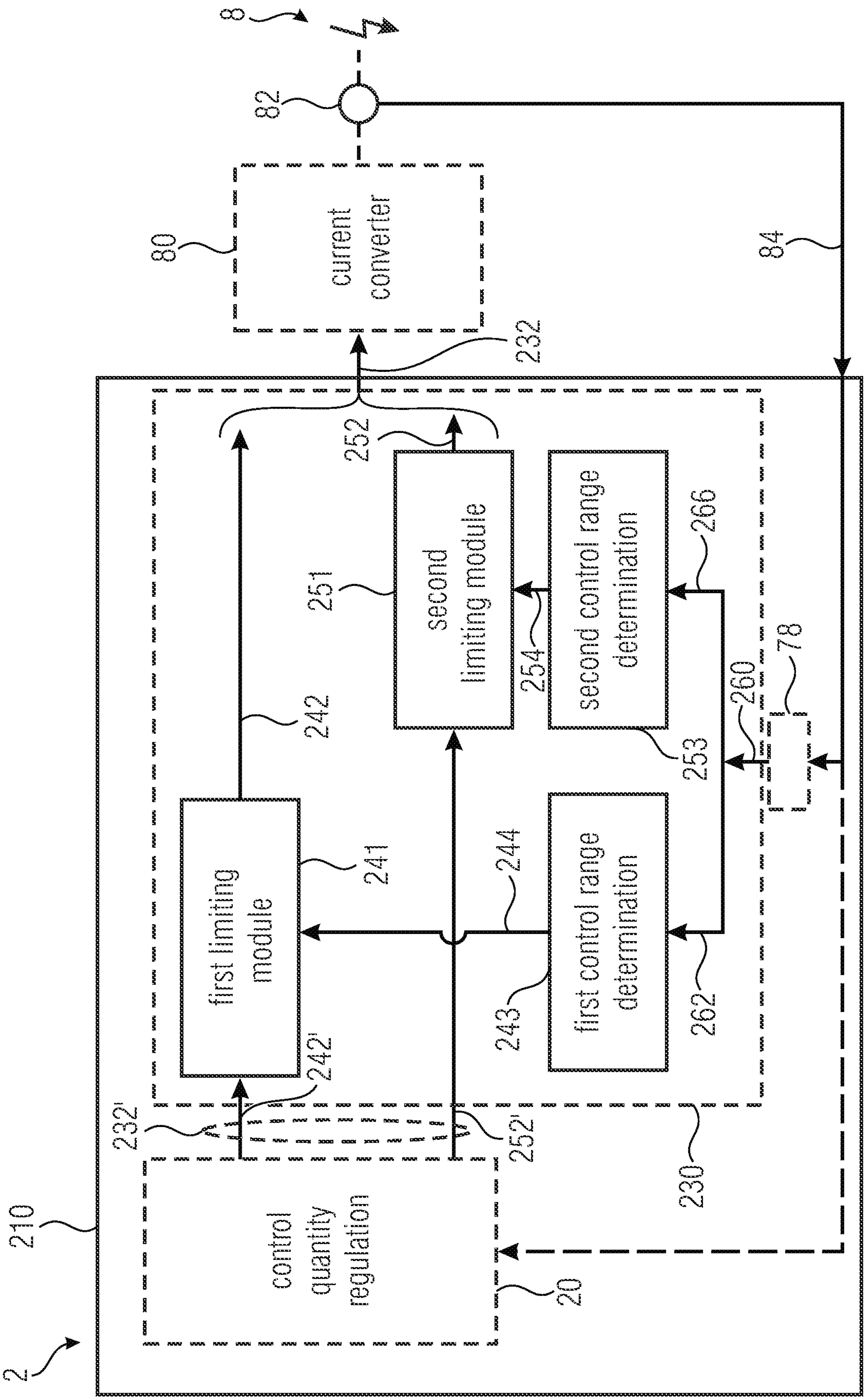
FIG. 15 illustrates an embodiment of a regulation apparatus with control range determination in an orthogonal coordinate system.

FIG. 4B shows a schematic illustration of an example of a limitation of a deviation between output voltage phasor $U_0$ (describing, e.g., the reference voltage phasor 60 or corresponding to the same) and controlled voltage phasor $U_i$ (that can be indicated by the control voltage phasor 32) as it can be performed by examples of the regulation apparatus 10 according to FIG. 1, the regulation apparatus 110 according to FIGS. 2, 3 or the regulation apparatus 210 according to FIG. 15. In FIG. 4B, the voltage phasors are shown in Cartesian coordinates, wherein the first and the second coordinate axes can represent a first and a second direction. The first and second directions can be orthogonal directions of a coordinate system. The coordinate system can be static with respect to the output voltage phasor (or the reference voltage phasor 60), for example, the same can be selected such that the reference voltage phasor points parallel to the first direction, wherein this is assumed in examples herein for a simplified illustration. However, the coordinate system can also be selected differently and does not have to be static with respect to the reference voltage phasor. The coordinate system can be, for example, a dq coordinate system as in FIG. 4B, wherein, in this non-limiting example, the first direction is a vertical direction and represents the q coordinate, and the second direction is a horizontal direction and represents the d coordinate. Accordingly, in the following, the first direction will be referred to as vertical direction and the second direction will be referred to as horizontal direction.

In FIG. 4B, a circular area 402 as well as rectangular areas 404, 406, 408 around the output voltage phasor are shown, which can represent examples for determining the amplitude control range 44 and the angle control range 54 around the reference voltage phasor 60. If the controlled voltage phasor $U_i$ is within the circle 402 around the output voltage phasor $U_0$, the output current of the power converter 80 is below a limiting current strength $I_{max}$.

Embodiments of the invention include a direct control quantity limitation of the controlled voltage phasor $U_i$ (in phase angle and amplitude) to limit the current to a maximum value. For preventing overcurrent operation, the controlled voltage phasor is maintained in a defined environment to the voltage phasor $U_0$ at the terminal point 82. The allowable environment can be derived, for example, from the equivalent internal impedance $Z_i$ (filter impedance) of the power converter 80. At a maximum allowable current, $Z_i$ can determine the maximum allowable voltage difference (the voltage deviation limiting value) between the controlled voltage phasor $U_i$ and the reference voltage phasor $U_0$ (cf. FIGS. 4A, 4B).

The voltage deviation limiting value, e.g., $\Delta U_{max}$ can here, for example be an amount of a vector difference between the output voltage phasor $U_0$ and the control voltage phasor 32 or the controlled voltage phasor $U_i$ in horizontal direction (d direction).

Limiting the control voltage phasor 32 by means of the limiting module 30 acts in that way that in cases where the controlled voltage phasor $U_i$ reaches the limit of the allowed range as illustrated in FIG. 4*b*, the control voltage phasor 32 is limited such that the controlled voltage phasor $U_i$ is maintained within the ranges shown in FIG. 4B. The control voltage phasor can still move freely within the allowed range, i.e., within the amplitude control range 44 and the angle control range 54, and can accordingly be moved according to a regulator dynamics, for example a grid-forming regulator dynamics, of the control quantity regulation 20. Thus, the control voltage phasor 32 can still react to new situations in a grid-compatible manner.

According to embodiments, the regulation apparatus limits the control voltage phasor 32 based on the first deviation limiting value 46 and the second deviation limiting value 56. The first deviation limiting value 46 can describe a limiting value for a deviation of the control voltage phasor 32 from the amplitude 62 of the reference voltage indictor 60 in the first direction and the second deviation limiting value 56 can describe a limiting value for a deviation of the control voltage phasor 32 from the reference voltage phasor 60 in the second direction.

As can be seen from FIG. 4B, a given angle deviation (e.g., a deviation in the angle coordinate) at a large amplitude of the reference voltage phasor 60 can result in a greater deviation of the controlled voltage phasor $U_i$ from the reference voltage phasor $U_0$ compared to at a small amplitude of the reference voltage phasor 60. In order to not exceed the limiting current strength at a large amplitude of the reference voltage phasor 60, and to still not unnecessarily limit the angle control range 54 at a small amplitude of the reference voltage phasor 60, it can therefore be advantageous to determine the angle control range 54 in dependence on the amplitude of the control voltage phasor 32. As an alternative to the amplitude of the control voltage phasor 32, the amplitude of the reference voltage phasor 60 can also be considered.

Therefore, according to embodiments, the angle control range determination module 53 is configured to determine an upper and a lower limit of the angle control 54 based on a ratio between the second deviation limiting value 56 and the amplitude of the control voltage phasor 32 or the reference voltage phasor 60.

In examples, the angle control range determination module 53 can determine the angle control range 54 by means of a trigonometrical function in dependence on the ratio between the voltage deviation limiting value and the amplitude of the control voltage phasor 32 or the reference voltage phasor 60. By using the trigonometrical function and considering the amplitude of the control voltage phasor, it can be obtained that even when using the polar coordinates amplitude and angle for the limitation of the control voltage phasor, the control voltage phasor can be limited to a rectangular control range. For example, by means of the arcsine, the angle control range can be determined from the ratio between the second deviation limiting value 56 and the amplitude 42 of the control voltage phasor 32.

For example, the first and second deviation limiting value can be determined by considering the internal impedance 86 of the power converter 80. For example, by means of the selection or determination of the first and the second deviation limiting value, prioritization of the amplitude or vertical component of the angle or horizontal component of the control voltage phasor can be obtained. As can be seen from FIG. 4B, the deviation between the output voltage phasor $U_0$ and the controlled voltage phasor $U_i$ can be combined of an angle deviation and an amplitude deviation or a vertical and a horizontal voltage deviation.

Figure 5:
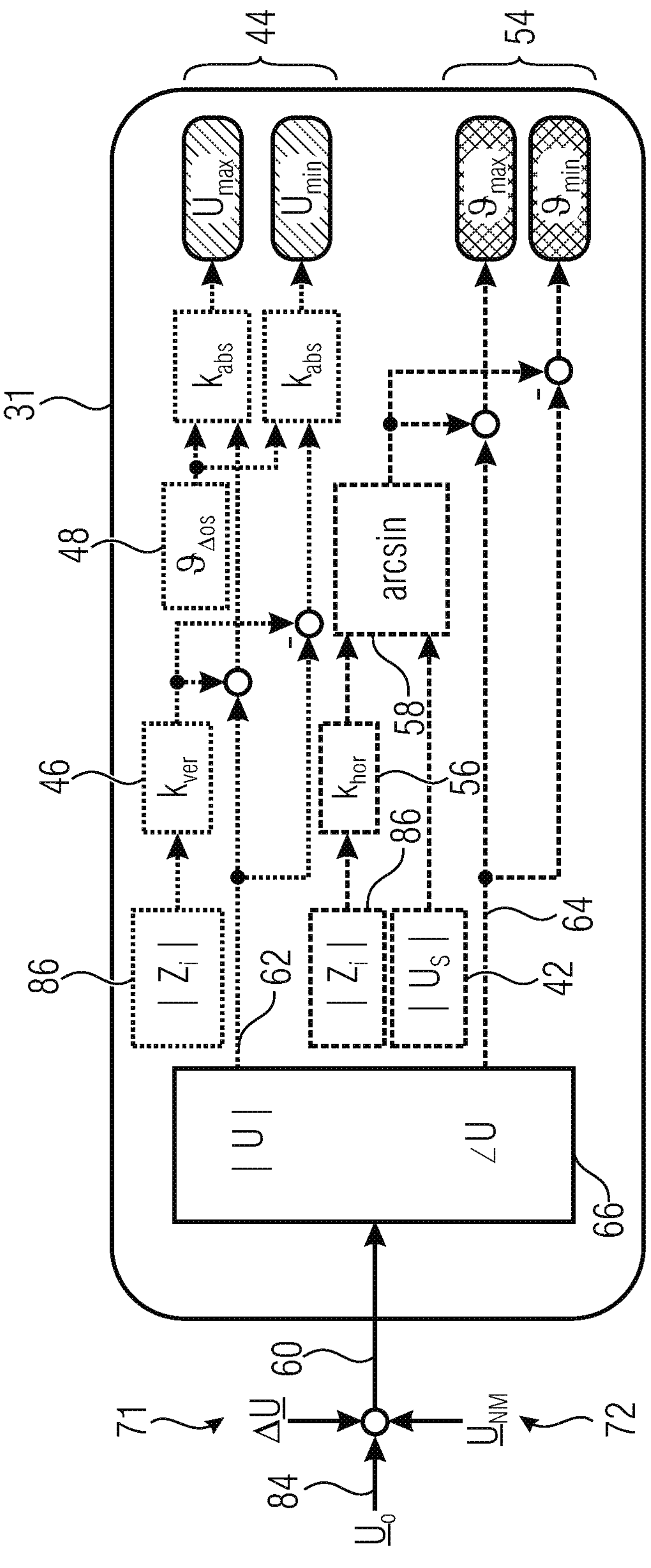
FIG. 5 illustrates an embodiment of a control range determination.

A similar consideration can also be made for the amplitude control range 44, whose upper and lower limit in relation to the amplitude value of the reference voltage phasor 60 can depend on the actual angle, for example on an actual angle deviation (cf. angle deviation 48 in FIG. 5)

between the control voltage phasor and the reference voltage phasor. Accordingly, in embodiments, the amplitude deviation determination module 43 can determine the amplitude control range 44 based on the first deviation limiting value 46 and additionally based on the angle 52 of the control voltage phasor 32.

According to embodiments, the regulation apparatus 110 is configured to determine the first deviation limiting value 46 and the second deviation limiting value 56 in dependence on each other to limit a deviation of the control voltage phasor 32 from the reference voltage phasor 60. The regulation apparatus 110 can be configured to determine the first and second deviation limiting value in dependence on each other to limit a deviation of the control voltage phasor 32 from the reference voltage phasor 60 to a maximum voltage deviation, which is described, for example, by the voltage deviation limiting value.

In examples, the first and second deviation limiting value can be identical. One example for this is shown with the square area 406 or the outer square area 404 in FIG. 4B. In other examples, such as the rectangular area 408 in FIG. 4B, the first and second deviation limiting value can be selected to be different in order to prioritize one of the components, such as the horizontal or angle component in the case of the area 408.

For example, the amplitude control range 44 and the angle control range 54 can form a rectangular area around the reference voltage phasor 60, for example an inner or an outer rectangle as shown exemplarily in FIG. 4B.

In other words, according to embodiments, allowable rectangles are derived from the circle area (cf. FIG. 4B). This has the background that the allowable corridors for the vertical voltage range and the horizontal voltage range can each be set independent of the current deviation of the respective different component, whereby the effort for determining the first deviation limiting value 46 and the second deviation limiting value can be kept low.

Examples of rectangular areas are squares or rectangles (transversal, longitudinal) applied to the inside or outside, whereby the active and reactive component can be prioritized in a different manner for different situations (also in a dynamical manner). From these rectangles, it can be derived directly in what corridor the vertical voltage component and the horizontal voltage component are to be routed.

In examples, the first or second deviation limiting value can be set to predetermined values.

For example, the first deviation limiting value determination 45 can be configured to determine the first deviation limiting value 46 in dependence on an angle deviation of the control voltage phasor 32 from the reference voltage phasor 60. In these examples, the second deviation limiting value determination module 55 can set, for example, the second deviation limiting value 56 to a predetermined value. The value of the second deviation limiting value 56 can, for example, be set to a value smaller than or equal to the voltage deviation limiting value. In these embodiments, the first deviation limiting value 46 is determined in dependence on the angle deviation, i.e., the actual angle deviation. This means in these examples, the second deviation limiting value 56 can be set to a value that is a large as possible by considering the voltage deviation limiting value, which corresponds to a prioritization of the angle, and the first deviation limiting value 46 can be selected in dependence on the current angle deviation. In situations where the angle deviation is small, the angle amplitude controller range 44 can be large, while in situations where the actual angle deviation is large, the amplitude control range 44 is selected to be small, such that the limiting current strength is not exceeded.

Alternatively, the second deviation limiting value determination module 55 can be configured to determine the second deviation limiting value 46 in dependence on an amplitude deviation of the control voltage phasor 32 from the reference voltage phasor 60. In these examples, the amplitude deviation limitation determination module 45 can be configured to set the first deviation limiting value 46 to a value, i.e., a predetermined value. The predetermined value can be selected, for example, such that at identical angles of the control voltage phasor and the reference voltage phasor and at an amplitude deviation corresponding to the first deviation limiting value 46, the limiting current strength is not exceeded. In this alternative, prioritization of the amplitude (or the first direction) takes place, while the angle control range 54 is determined in dependence on the actual amplitude deviation (or deviation in the first direction).

In the above examples, where the first deviation limiting value 46 or the second limiting deviation limiting value 56 are determined in dependence on the angle deviation or the amplitude deviation, the first deviation limiting value or the second deviation limiting value can be determined such that the limiting current strength is not exceeded when utilizing the specific limiting value.

By determining the first deviation limiting value 46 in dependence on the angle deviation or determining the second deviation limiting value 56 in dependence on the amplitude of the amplitude deviation, with respect to FIG. 4B, the full circle determined by the voltage limiting value can be utilized without exceeding the voltage deviation limiting value when fully utilizing the first deviation limiting value 46 and the second deviation limiting value 56.

In other words, the circular allowed environmental range having the radius r, which determines the maximum voltage difference (resulting from the set maximum current and an internal impedance of the power converter plant), in one variation, specifications for the voltage angle and amplitude can be divided as follows. First, it has to be stated that the vertical component (d axis) and the horizontal component (q axis) depend on each other by the mathematical circle description ($r^2=d^2+q^2$) when the circle area is to be utilized fully but not exceeded. This means the more the vertical component is limited the more free space/reserve is available for the allowed difference in horizontal direction and vice versa. Therefore, prioritization can be determined in advance. As, for example, the fed-in active power is frequently prioritized and the same is determined in an inductive internal impedance by the angle difference (vertical component or d component), the deviation in vertical direction (d axis) can be the complete radius r, in examples, i.e., the second deviation limiting value 56 can be set to the radius of the circle. In a further step, the allowed deviation of the horizontal components depends on the actual deviation of the actual vertical component. Here, the d or q components describe the allowed deviation in horizontal or vertical direction in Cartesian coordinates:

$$q_{tolerance} = \sqrt{r^2 - d_{actual}^2} \quad \text{Eq. 1}$$

The limitation and control ranges can subsequently be transferred to polar coordinates (angle, amplitude).

Depending on how the prioritization is selected and the internal impedance is combined of ohmic-inductive components, an adaptation can be performed by scaling one component and the one component is derived from the other actual component according to the circle description.

Generally, it has to be stated that the limiting method of the regulation apparatus 110 as described with respect to FIGS. 1 to 4 can be suitable for all power converter plants where a voltage, e.g., $U_i$, is controlled behind an internal impedance. This applies in particular for so-called grid-forming or voltage-impressed regulated power converters. The variation of a grid-forming regulation 20 as described with respect to FIG. 7 can serve as implementation example, but the limitation method is not limited to that.

The control quantity limitation can be based, for example, among others on the internal impedance of the power converter $Z_i$. The output filter (sinusoidal filter) of the power converter 80 forms normally the dominant portion of the internal impedance 86 of the power converter 80. The nominal values of the output filter impedance can typically be inferred from the respective data sheets or can be determined with measurement technology, wherein additional apparatuses can be used to determine temporal changes of the impedance. For determining the internal impedance as accurately as possible, the impedances of further components such as the power semiconductors can be used.

According to embodiments, in order to counteract the frequency dependency of the inductive portion jωL of the power converter internal impedance 86, a respective scaling $\mathrm{Im}\{\underline{Z}_i\}\cdot f_n/f_0$ can be implemented. Here, the grid frequency is taken, for example, from a PLL (Phase-Lock-Loop) or results from the controlled voltage phasor 32.

This extension allows the usage of the method also in grids having a high frequency deviation from a nominal grid frequency. In conventional grid structures, this influence can be neglected due to the typically narrow frequency bands.

In the following, with respect to FIG. 5, an example for a basic structure for calculating the control quantity limitations will be presented. Based thereon, the same is transferred into the context of the power converter regulation in different variations.

FIG. 5 illustrates an example of a control range determination 31 as it can be implemented in examples of the regulation apparatus 110 of FIG. 2. The control range determination can represent the modules 43, 45, 53, 55 of FIG. 2 and FIG. 3. According to the example of FIG. 5, the amplitude control range 44 is provided in the form of an upper limiting value $U_{max}$ and a lower limiting value $U_{min}$ for the amplitude 42 of the voltage phasor 32. Analogously, the angle control range 54 is provided in the form of an upper limiting value $\vartheta_{max}$ and a lower limiting value $\vartheta_{min}$ for the angle 52 of the control voltage phasor 32. According to the example of FIG. 5, the regulation apparatus comprises a module 66 that is configured to determine the amplitude 62 and the angle 64 of the reference voltage phasor 60 based on the reference voltage phasor 60. According to the example shown in FIG. 5, the control range determination 31 is configured to determine the first deviation limiting value 46 based on the internal impedance 86 and to determine the lower and the upper limit of the amplitude control range 44 based on the first deviation limiting value 46 and an angle deviation 48 between the reference voltage phasor 60 and the control voltage phasor $U_s$. Further, the control range determination 31 according to FIG. 5 is configured to determine the second deviation limiting value 56 based on the internal impedance 86 and to determine the lower and the upper limit of the angle control range by using a trigonometrical function 58 based on the second deviation limiting value 56 as well as the amplitude 42 of the control voltage phasor 32.

For example, the voltage phasors as well as the internal impedance can be considered in a per unit system. The limiting module 31 according to FIG. 5 could then, for example, determine the control value limitations ($U_{max}$, $U_{min}$, $\vartheta_{min}$, $\vartheta_{max}$) based on the following equations:

$$U_{max} = \frac{(|U| + |Z_i| \cdot k_{ver})/\cos(\vartheta_{\Delta OS})}{k_{abs}} \quad \text{Eq. 2}$$

$$U_{min} = \frac{(|U| - |Z_i| \cdot k_{ver})/\cos(\vartheta_{\Delta OS})}{k_{abs}} \quad \text{Eq. 3}$$

$$\vartheta_{max} = \angle U + \arcsin(|Z_i| \cdot k_{hor} / |U_s|) \quad \text{Eq. 4}$$

$$\vartheta_{min} = \angle U - \arcsin(|Z_i| \cdot k_{hor} / |U_s|) \quad \text{Eq. 5}$$

The limits for the maximum and minimum voltage amplitude control value $U_{max}$ and $U_{min}$ are formed, for example, from the deviation of the height of the present input phasor $|\underline{U}|$ and the internal impedance $|Z_i|$ of the power converter. This describes the allowable vertical voltage deviation. The same is subsequently transferred into an allowable amplitude deviation based on a correction term $k_{abs}$, for example by adding the current angle deviation $\vartheta_{\Delta OS}$ between control and reference voltage phasor.

The angle control quantity limitations are defined, for example, by the limits $\vartheta_{max}$ and $\vartheta_{min}$. The same are formed as deviation to the current angle of the input signal $\angle\underline{U}$ by the trigonometrical function $\arcsin(|Z_i|\cdot k_{hor}/|U_s|)$ in dependence on the internal impedance $|Z_i|$ and the current control amplitude $|U_s|$. The current control amplitude can, for example, indicate the amplitude 42 of a previous clock or the current clock. Thereby, the angle control quantity limitations can be defined in dependence on the height of the control phasor. This is necessary for high deviations to the nominal voltage (for example in the FRT case).

For the example of a prioritization of the angle, the allowable deviation in horizontal direction i.e., towards the left and right from the output side voltage phasor, can be the starting point. Therefrom, the maximum angles are determined as allowable environment for the output voltage via the trigonometrical function. Based on the arcsine from the allowable deviation in horizontal direction and the amplitude of the internal voltage phasor, the angle deviation can be determined.

With the help of the amplitude limitation parameter $k_{ver}$ (e.g., the first deviation limiting value 46) for which, for example, $k_{ver} \in [0, 1]$ can apply, and the angle limitation parameter $k_{hor}$ (e.g., the second deviation limiting value 56) for which, for example $k_{hor} \in [0, 1]$ can apply, the allowable corridors (in the case of a square or rectangular control quantity limitation) can be determined. The same act analogously to a proportional scaling of the internal impedance.

In the variation of a circular specification of the allowable range, the amplitude limiting parameter $k_{ver}$ for which also, for example, $k_{ver} \in [0, 1]$ can apply, and the angle limitation parameter $k_{hor}$, for which also, for example, $k_{ver} \in [0, 1]$ can apply, can also be used to determine the allowable corridors, by prioritizing and scaling the same accordingly in a dynamic manner, as described above with the determination of the first deviation limiting value 46 in dependence on the angle deviation or the determination of the second deviation limiting value 48 in dependence on the amplitude deviation. For example, the determination can be made by $$k_{ver} = \sqrt{1 - (U_s \sin(\vartheta_{\Delta OS})/Z_i)^2} \text{ or.} \quad \text{Eq. 6}$$

$$k_{hor} = \sqrt{1 - ((U_s \cos(\vartheta_{\Delta OS}) - U_o)/Z_i)^2}$$

with $\vartheta_{\Delta OS}$ und $U_s$, the current deviations to the used output voltage (e.g., the reference voltage phasor 60). Depending on the priority, these are conditional corridors. Instead via equation 6, the conditional corridors can also be determined via the present current. In examples, the determination can be made such that all in all always the following applies:

$$r=\sqrt{\Delta U_{\text{ver}}^2+\Delta U_{\text{hor}}^2} \leq \Delta U_{max} \quad \text{Eq. 7}$$

In examples, the reference voltage phasor 60 for the determination 66 of the amplitude 62 and the angle 64 can be determined of a combination of a measurement quantity 84 describing the output voltage and one or several correction contributions 71, 72 which can each be represented by a voltage phasor. The correction terms 71, 72 can be combined, for example, with the voltage phasor describing the output voltage, i.e., added to or subtracted from the same in order to obtain the reference voltage phasor 60. Examples for the correction terms 71, 72 are described with reference to FIG. 9.

In other words, a variation for implementing the control quantity limitation 30 is based on a sum of the three complex voltage phasors: The output voltage phasor $\underline{U}_0$, the voltage phasor $\underline{U}_{NM}$ as well as the voltage phasor $\underline{\Delta U}$. After the summation, decomposition into the amplitude portion $|\underline{U}|$ and the phase angle $\angle\underline{U}$ takes place.

According to embodiments, the regulation apparatus 110 is configured to limit the angle 42 of the control voltage phasor 32 further with respect to a change compared to the angle of the reference voltage phasor 60 of an earlier clock. For example, the limiting module 30 can comprise an angle change limiting module that is configured to obtain the angle 52 of the control voltage phasor 32 as input quantity and to limit the same with respect to the change compared to the angle of the reference voltage phasor 60 of an earlier clock. Alternatively, the angle change limiting module can also be arranged in front of the angle limiting module 51. Accordingly, the angle change limiting module can obtain and limit the angle 52' of the set control voltage phasor 32' and provide the angle limited with respect to the change of the angle to the angle limiting module 52 as an input quantity. As a further alternative, the angle change limiting module can act on the reference voltage phasor 60, i.e., the angle change limiting module can be configured to limit the reference voltage phasor 60 with respect to a change compared to the angle of the reference voltage phasor of an earlier clock. In this case, the angle 64 of the reference voltage phasor 60 limited with respect to its change can be provided to the angle control range determination module 53 and optionally to the first deviation limiting value determination module 45.

Figure 6:
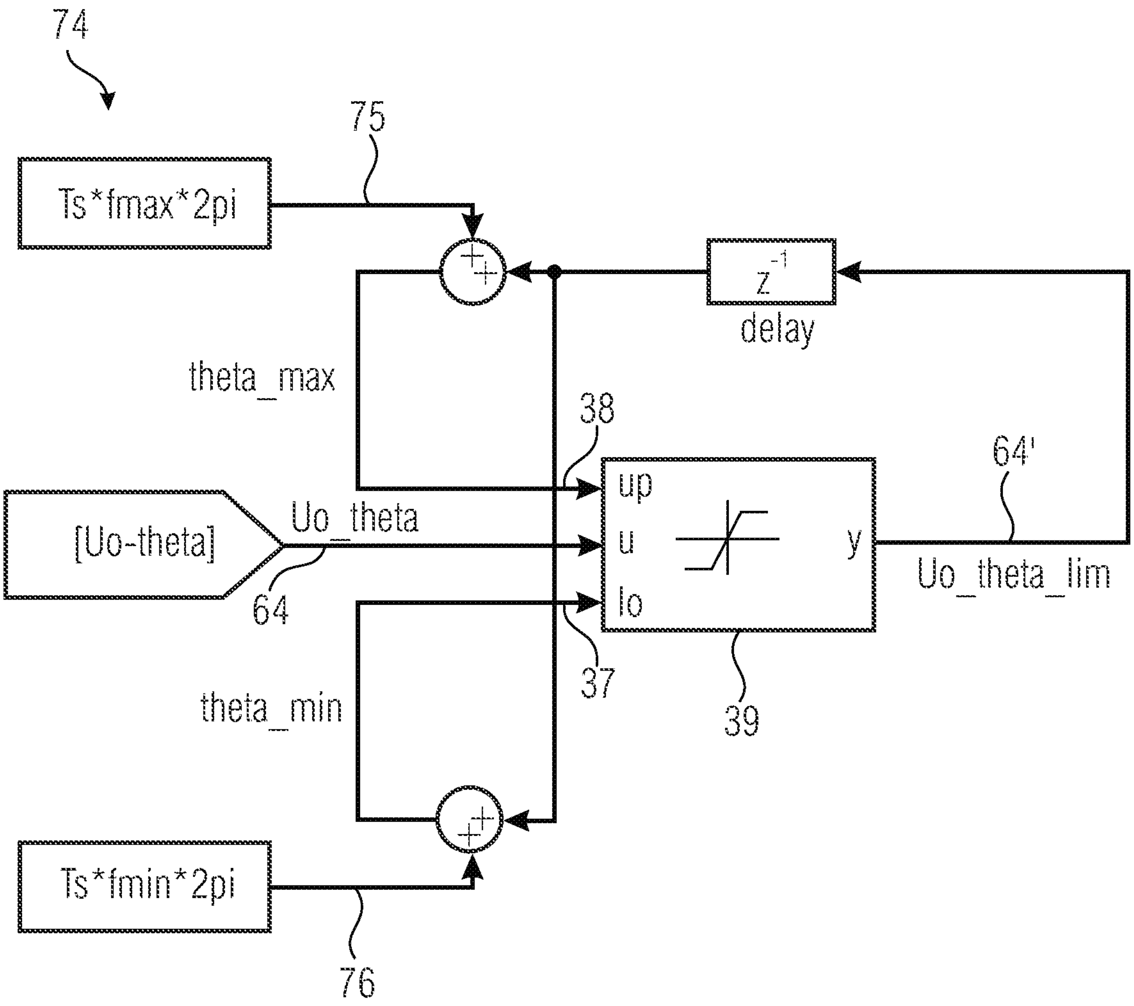
FIG. 6 illustrates an embodiment of a limitation of the angular velocity.

FIG. 6 illustrates an example of an angle change limiting module 74. The example of the angle change limiting module 74 shown in FIG. 6 is configured to limit the angle 64 of the reference voltage phasor 60 used for the limitation of the control voltage phasor 32 with respect to an angle change compared to the angle of the reference voltage phasor of an earlier clock. The angle change limiting module 74 comprises a limiter 39 that is configured to limit the angle 64 to a range between a lower angle limiting value 37 and an upper angle limiting value 38 in order to obtain a limited angle 64'. The angle change limiting module 74 is configured to determine the lower angle limiting value 37 based on the angle 64' of a previous clock as well as a first angle change limiting value 76, wherein the first angle change limiting value 76 is based on a lower limiting value for a frequency of the reference voltage phasor 60. Further, the angle change limiting module 74 is configured to determine the upper angle limiting value 38 by combining the angle 64' of a previous clock as well as a second angle change limiting value 75, wherein the second angle change limiting value 75 is based on an upper limit for the frequency of the reference voltage phasor 60.

In other words, to prevent uncoordinated drifting of the frequency, as an extension of the method, the lower and upper limit of the angle change (speed) can be implemented by which the set voltage phasor is guided at least or at most. The same can be applied, for example, to the angle change of the measured output voltage or the reference voltage phasor. In the case of a grid frequency of 50 Hz of the grid 8, the tolerance limits can, for example, be the standard 47.5 Hz and 52 Hz. This example of the limitation of the angle change speeds can be obtained by the implementation of a minimum or maximum angle speed shown in FIG. 6. For a clock cycle of Ts, the change of the angle with respect to its preceding value is limited to $\omega_{max}$ Ts or $\omega_{min}\cdot$Ts.

In the example shown in FIG. 6, instead of the angle 64, the limited angle 64' is provided to the angle control range determination module 53 and optionally to the first deviation limiting value determination module 45.

Figure 7:
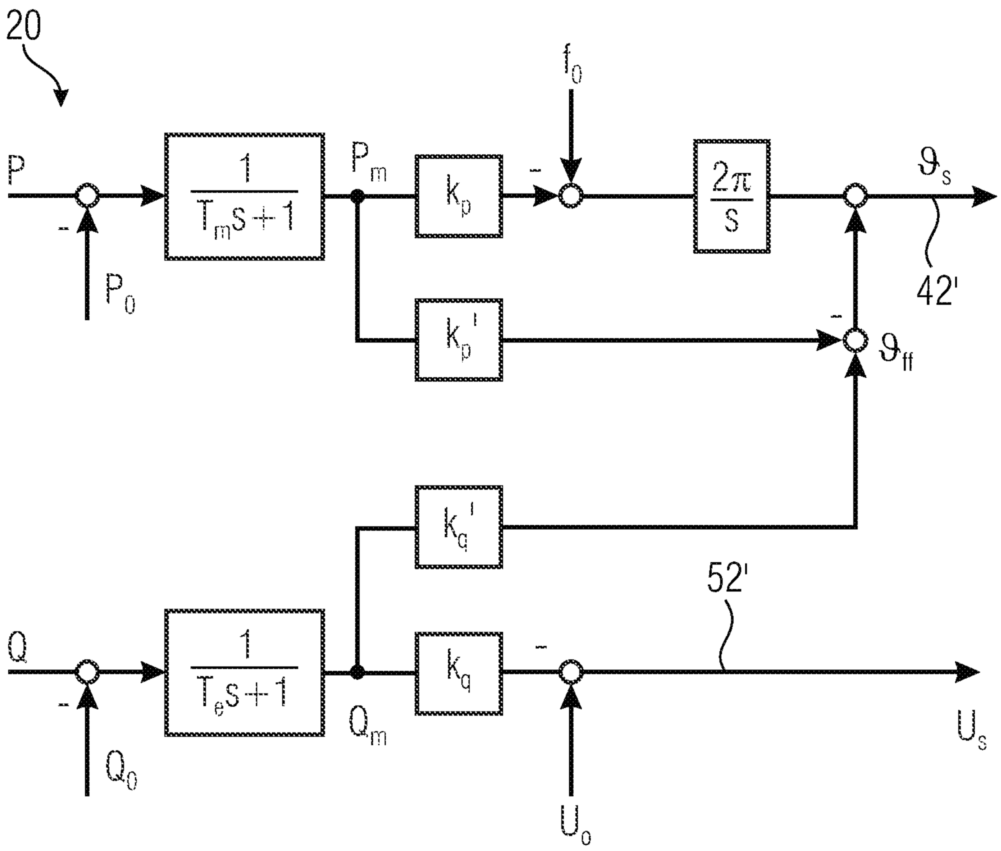
FIG. 7 illustrates an embodiment of a power converter regulation.

FIG. 7 illustrates an example of the control quantity regulation 20 as it can be implemented optionally in the regulation apparatus 110, e.g., the regulation apparatus 110 according to FIG. 1. The control quantity regulation 20 according to FIG. 7 is an example of a grid-forming regulation. By using the grid-forming regulation according to FIG. 7, the power converter 80 can inherently provide grid-compatible behaviour, such as system inertia. $k_p$ and $k_q$ represent droop parameters. $k'_p$ and $k'_q$ represent parameters for the phase feedforward control. The control quantity regulation 20 according to FIG. 7 receives the quantities P and Q as input quantities. The regulation apparatus 110 can determine the quantities P and Q based on the one or several measurement quantities 84 determined at the terminal point 82. The quantities U*, $f_0$, $P_0$, $Q_0$ represent nominal values, i.e., set values for the voltage, the frequency, the active power and the reactive power of the grid 8. The control quantity regulation 20 can be configured to provide the set control voltage phasor 32' to regulate the power converter 80 to the nominal values for the grid 8.

Figure 8:
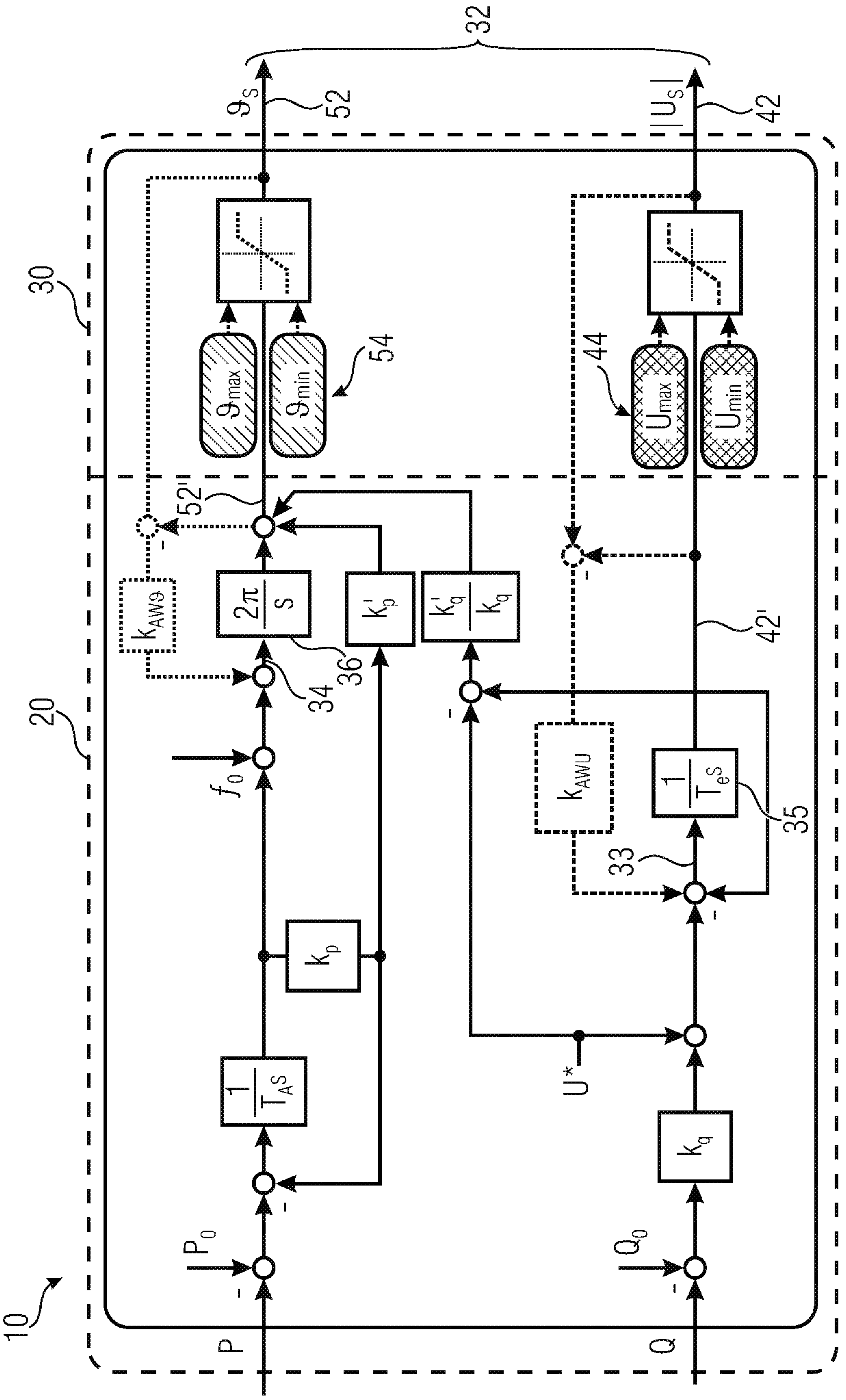
FIG. 8 illustrates an embodiment of a regulation apparatus.

FIG. 8 illustrates a further example of the regulation apparatus 110 in which the limiting module 30 can be implemented, for example according to the limiting module 30 of FIG. 5. The regulation apparatus 110 according to FIG. 8 comprises a control quantity regulation 20, which represents a modified form of the control quantity regulation 20 according to FIG. 7. The control quantity regulation 20 according to FIG. 8 can have a similar or equivalent system behaviour as the control quantity regulation 20 of FIG. 7, wherein $T_A\cdot k_p=T_m$ applies for the constant. In the control quantity regulation 20 according to FIG. 8, the PT1 components of the control quantity regulation 20 of FIG. 7 are implemented by integrators with a negative feedback loop. Additionally, the variant of the regulation method of FIG. 8 can be equipped with saturation blocks in combination with the tracking anti-windup method of [6]. Additionally, the factors $K_{AW\theta}$ and $K_{AWU}$ represent the proportionality factors of [6].

According to embodiments, the regulation apparatus 110 is configured to use the control voltage phasor 32, for example of an earlier clock, for determining the set control voltage phasor 32'. One example of such an implementation is shown in FIG. 8, wherein the amplitude 42 of the control voltage phasor 32 is used for determining the amplitude 42' of the set control voltage phasor 32', and the angle 52 of the control voltage phasor 32 is used for determining the angle 52' of the set control voltage phasor 32'.

The feedback of the control voltage phasor 32 for determining the set control voltage phasor 32' can prevent that the set control voltage phasor 32' diverges due to a difference between the set control voltage phasor 32' and the control voltage phasor 32 that can exist in the case of limiting the set control voltage phasor 32' in the limiting module 30.

According to embodiments, the regulation apparatus 110 is configured to determine the amplitude 42' and the angle 52' of the set control voltage phasor 32' by using respective integrators 35, 36. According to these embodiments, the regulation apparatus is configured to lead an integrator input quantity 33 of the integrator 35 used for determining the amplitude 42' of the set control voltage phasor 32' to zero in the case of a deviation of the amplitude 42 of the control voltage phasor 32 from the amplitude 42' of the set control voltage phasor 32', or to reinitialize the integrator 35 used for determining the amplitude 42' of the set control voltage phasor 32', for example with a suitable initial value. Further, according to these embodiments, the regulation apparatus 110 is configured to lead an integrator input quantity 34 of the integrator 36 used for determining the angle 52' of the set control voltage phasor 32 to zero in the case of a deviation of the angle 52 of the control voltage phasor 32 from the angle 52' of the set control voltage phasor 32. Alternatively, the regulation apparatus can reinitialize the integrator 36 used for determining the angle 52' of the set control voltage phasor 32 in the case of the deviation, for example with a suitable initial value.

According to embodiments, the control quantity regulation 20 is configured to determine the amplitude 42' of the set control voltage phasor based on a difference of a measurement quantity Q describing a reactive power of an output power of the power converter 80 and a set value $Q_0$ for the reactive power. Further, according to this embodiment, the control quantity regulation 20 is configured to determine the angle 52' of the set control voltage phasor 32' based on a measurement quantity P describing an active power of the output power of the power converter and a set value $P_0$ for the active power, and further based on a difference between the amplitude 42' of the set control voltage phasor and a set value U* for an amplitude of the output power of the power converter 80. One example of these embodiments is shown in FIG. 8. By considering the amplitude 42' of the set control voltage phasor and the set value U* when determining the angle 52', the dynamics of the control quantity regulation 20 can be improved. It should be noted that considering the amplitude 42' of the set control voltage phasor and the set value U when determining the angle 52' can be implemented independent of the type of feedback or the anti-windup as illustrated in FIG. 8.

According to embodiments, the power converter 80, for which the regulation apparatus 110 described with reference to FIGS. 1 to 8 determines the control voltage 32, is a multi-phase power converter. The multi-phase power converter is configured to provide a respective voltage for each of a plurality of phases. In embodiments, the power converter 80 is configured to provide the respective voltages for the plurality of phases based on the control voltage 32. In alternative embodiments, the regulation apparatus 110 is configured to provide a respective control voltage 32 for each of the phases, and the power converter 80 is configured to adjust the voltage for the respective phase based on the control voltage 32 allocated to the respective phase. In the following, an example of a multi-phase power converter as well as different embodiments of the regulation apparatus 110 for a multi-phase power converter will be described.

Figure 9:
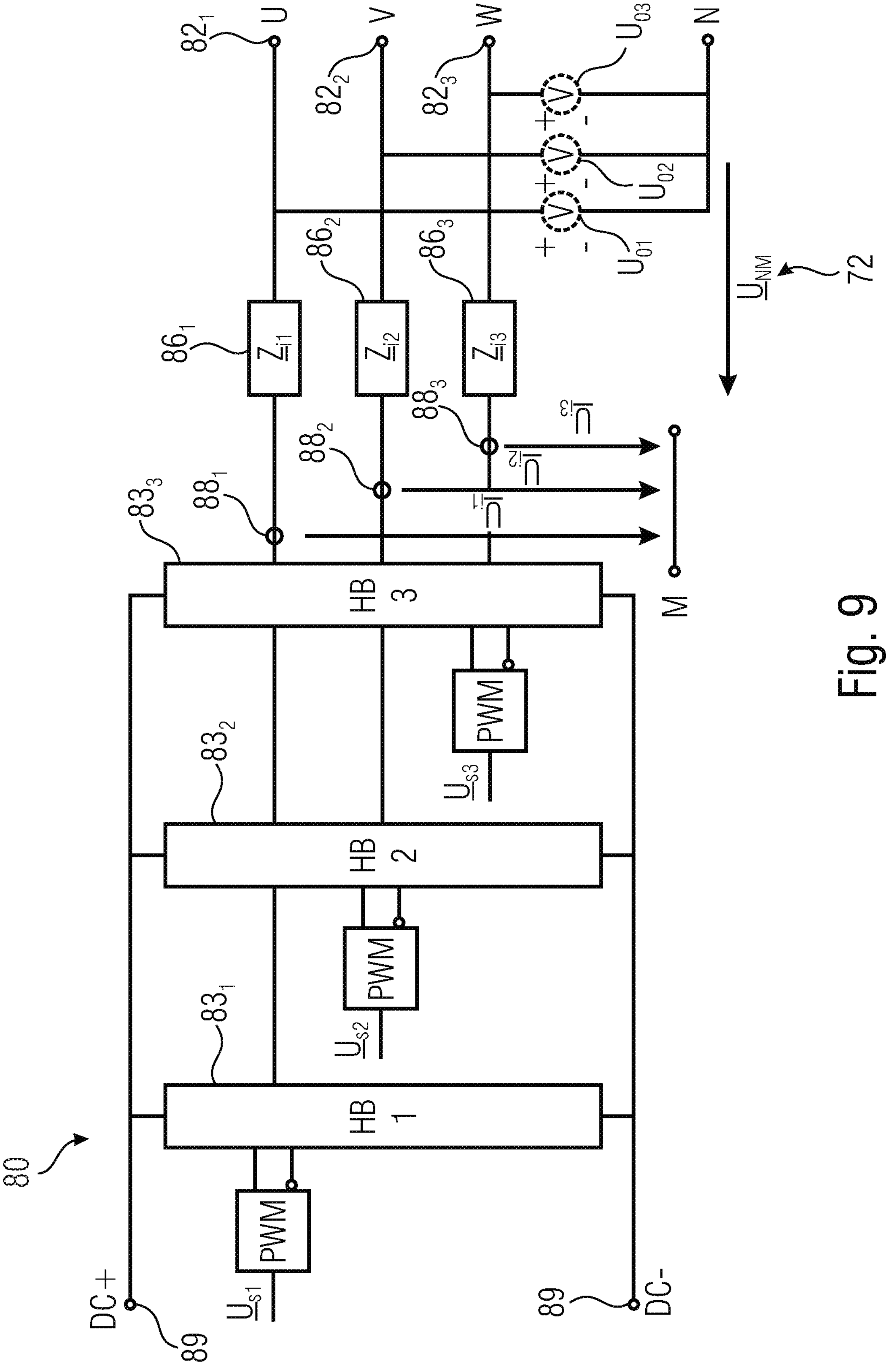
FIG. 9 shows a circuit diagram of a power converter according to an embodiment.

FIG. 9 illustrates an embodiment of the power converter 80 as multi-phase power converter. According to an embodiment of FIG. 9, the power converter 80, a three-phase power converter, is configured to provide one voltage each for a first phase U, a second phase V and a third phase W of a three-phase grid. Via a first internal impedance $\mathbf{86}_1$, a first switching node $\mathbf{88}_1$ is coupled to a first terminal point where the power converter 80 is connected to the first phase of the grid. Via a second internal impedance $\mathbf{86}_2$, a second circuit node $\mathbf{88}_2$ is connected to a second terminal point $\mathbf{82}_2$ where the power converter 80 is coupled to the second phase of the grid. Via a third internal impedance $\mathbf{86}_3$, a third circuit node $\mathbf{88}_3$ is coupled to a third terminal point $\mathbf{82}_3$ where the power converter 80 is connected to the third phase W of the grid. This means that, for each of the plurality of phases, the power converter 80 comprises a circuit node 88 allocated to the respective phase. Via a respective internal impedance 86, the circuit nodes 88 are coupled to a terminal point 82 allocated to the phase allocated to the respective terminal point 88.

Figure 18:
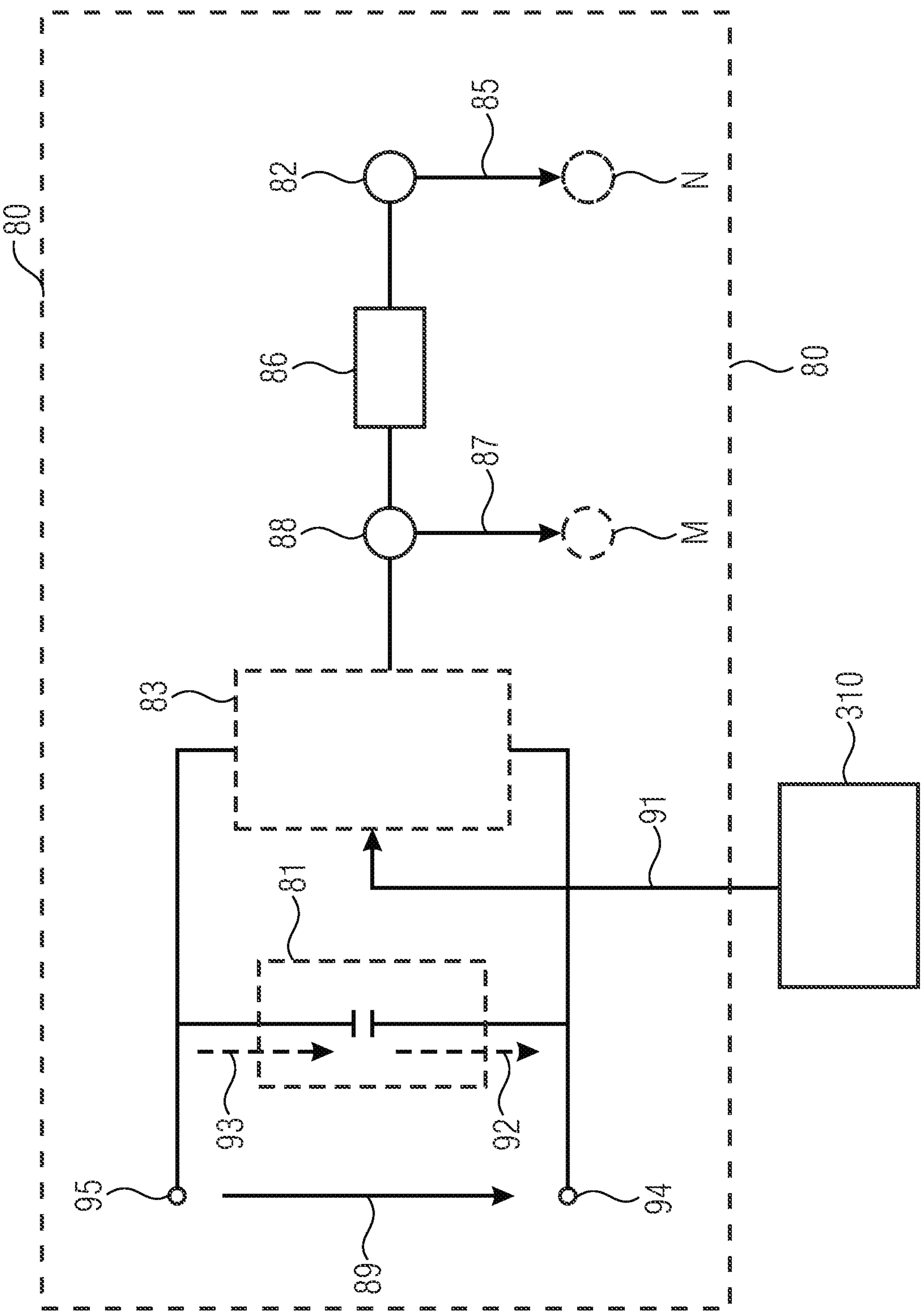
FIG. 18 illustrates a further embodiment of a regulation apparatus.

According to the example of FIG. 9, the power converter 80 comprises a half bridge for each of the phases (half bridges $\mathbf{83}_1$, $\mathbf{83}_2$, $\mathbf{83}_3$ for the first, second and third phase U, V, W), which are controlled by means of respective modulation (e.g., pulse width modulation (PWM) based on the control voltage $U_{s1}$, $U_{s2}$, $U_{s3}$ allocated to the respective phase to provide the respective indicated voltage $U_{i1}$, $U_{i2}$, $U_{i3}$ (also referred to as respective bridge voltage, cf. bridge voltage 87 in FIG. 18). For example, the half bridges 83 provide the bridge voltage based on an intermediate circuit voltage 89 applied to the half bridges, which can be applied between intermediate circuit voltage supplies. The intermediate circuit voltage can be a direct voltage. Optionally, the power converter can comprise an intermediate circuit not shown in FIG. 9, which is arranged between intermediate circuit voltage supplies.

The power converter 80 can be configured to obtain or determine the control voltages $U_{s1}$, $U_{s2}$, $U_{s3}$ for the respective phases U, V, W, based on a control voltage 32 provided by the regulation apparatus 110, or can alternatively be configured to obtain or determine the respective control voltages $U_{s1}$, $U_{s2}$, $U_{s3}$ based on several control voltages provided by the regulation apparatus 110.

The implementation of the power converter 80 shown in FIG. 9 can represent a three-phase switching bridge and can represent an example for an implementation of the equivalent circuit diagram of the power converter 80 shown in FIG. 4A. For example, in FIG. 4A, the illustrated voltage $U_i$ and the output voltage $U_0$ can each represent a geometrical space phasor which is represented by the respective set voltages $U_{i1}$, $U_{i2}$, $U_{i3}$ or the respective output voltages $U_{01}$, $U_{02}$, $U_{03}$ for the phases U, V, W.

As illustrated in FIG. 9, the reference point for the measurement of the set voltages (i.e., the indicated voltages) 88 can be different from a reference point for the measurement of the output voltages for the phases U, V, W. This potential difference can be considered in examples when determining 66 the amplitude 62 and the angle 64 for the limitation of the control voltage, such as shown in FIG. 5 but also in FIGS. 12 and 13, where the potential difference $U_{NM}$ between the reference point M for the indicated voltages and the reference point N for the output voltages can be considered in the form of a correction term 72, which can exist, for example, in the form of a voltage phasor.

In other words, the circuit diagram of FIG. 9 can represent an example for the power converter of FIG. 4A, wherein the controlled voltage $U_i$ and the output voltage $U_0$ are considered instead of an illustration by means of geometrical space phasors, the controlled bridge voltage $U_i$ and the used output voltage $U_0$ separately for each phase. Depending on the hardware topology, when implementing the method, the reference point of the measurement of the used output voltage and the reference point of the controlled voltage at the half bridges (HB 1, 2, 3) is to be considered. If these two reference points have a potential difference, the allowable environmental range is to be corrected by this voltage ($U_{NM}$). For example, the potential difference can be caused by a different neutral point shift. The control voltage $\underline{U}_s$, of which the PWM control is formed, and the result, the controlled voltage $\underline{U}_i$ at the output of the bridges (bridge output voltage) are to be distinguished. Depending on the type of modulation and voltage proportions of 50 Hz and 100 Hz in the intermediate circuit, for example, an additional contribution to the fundamental oscillation of $U_i$ can result. This deviation is referred to as $\Delta U$ and can be added when determining the limiting values, for example in the form of the correction term 71 in FIG. 5. In this context, the relevant frequency portions can be extracted from the voltage values of the divided intermediate circuit (for example by a Fourier analysis, transformation).

On the other hand, the above stated deviation between control voltage $U_s$ and the bridge voltage $U_i$ can also be considered when implementing the modulation, for example by adapting the pulse width depending on the additional oscillation in the intermediate circuit.

In embodiments, the limitation of the control voltage phasor 32, for example according to the control quantity limitation based on FIG. 5, can be implemented both for the fundamental oscillation as well as for the harmonic in a parallel structure. This can, for example, mean to perform the control quantity determination 31 separately for the fundamental oscillation and for the harmonic.

It should further be noted that implementing the power converter 80 by means of the intermediate circuit 81 is possible on a single-phase power converter or in an equivalent manner a power converter having any number of phases.

According to embodiments, the power converter 80 comprises an intermediate circuit $\mathbf{81}_1$. The intermediate circuit $\mathbf{81}_1$ is configured to provide a bridge voltage $U_{i1}$ indicated by the control voltage at the circuit node $\mathbf{88}_1$ coupled to the terminal point $\mathbf{82}_1$ of the power converter 80 via the internal impedance $\mathbf{86}_1$ of the power converter 80, based on the control voltage $U_{s1}$, for example the control voltage 32, and an intermediate circuit voltage 89.

Figure 19:
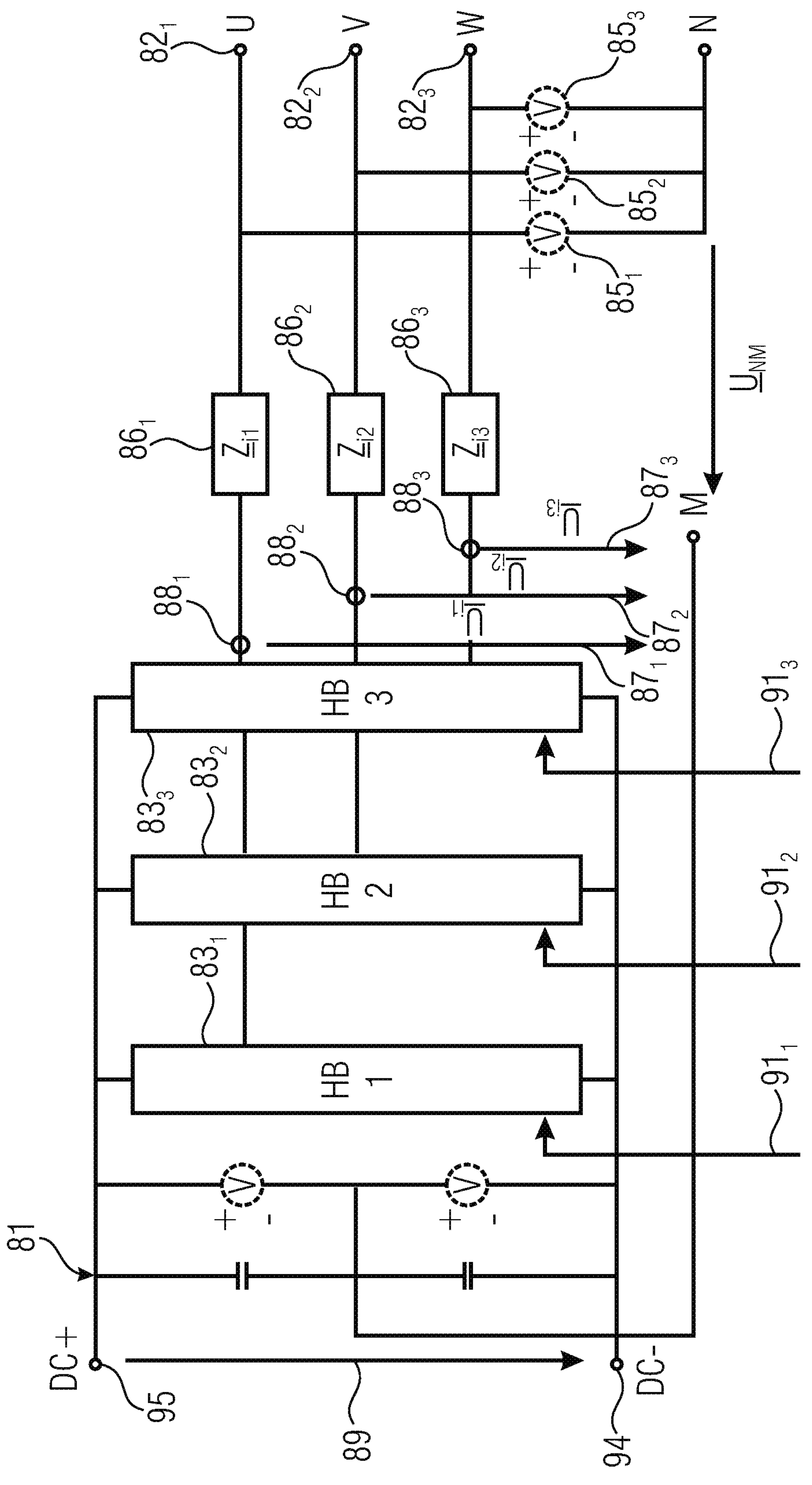
FIG. 19 shows an equivalent circuit diagram of an example of a power converter.
Figure 20:
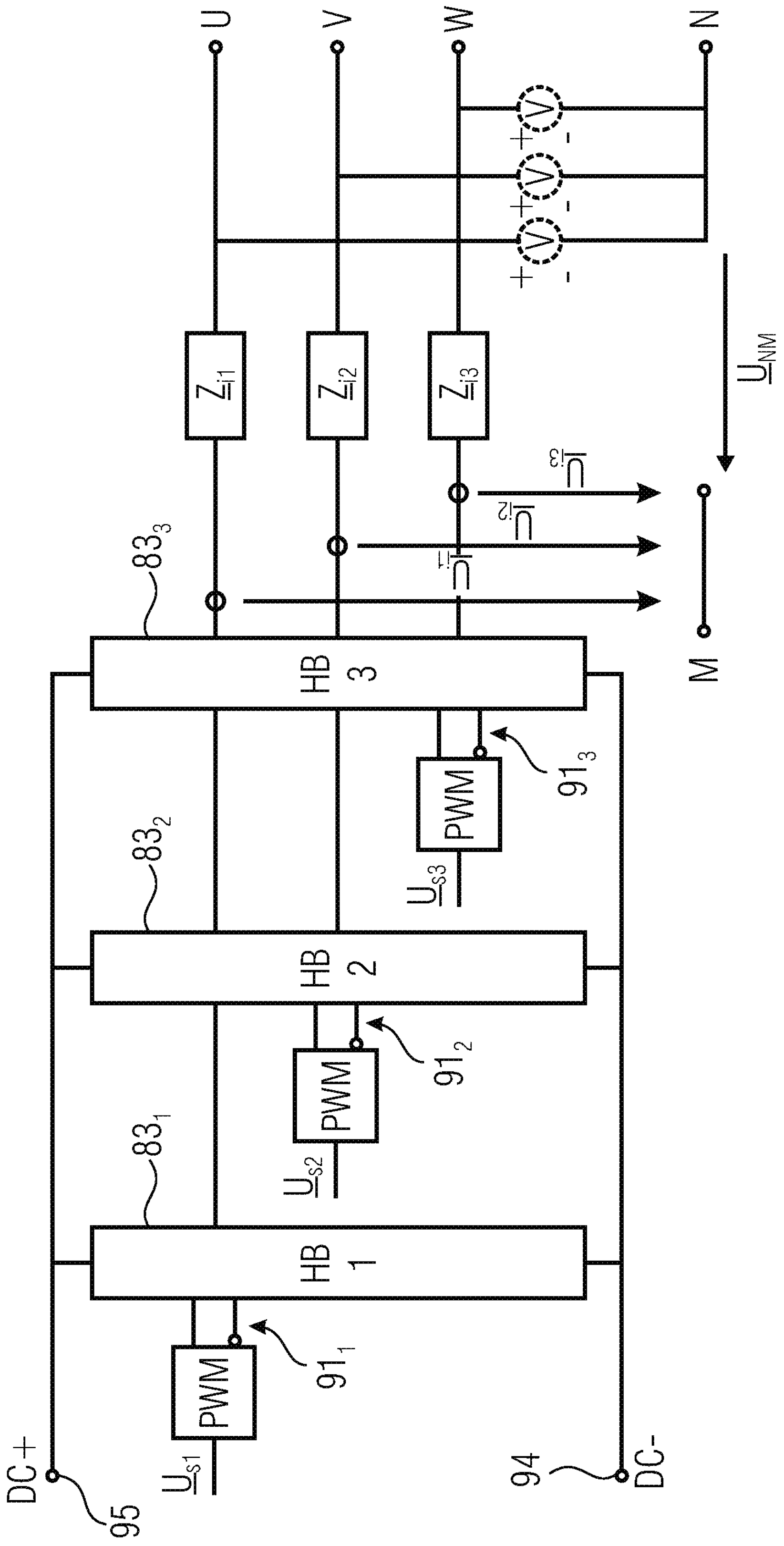
FIG. 20 shows an equivalent circuit diagram of a further example of a power converter.

Here, the regulation apparatus 80 can be configured to consider, when determining the reference voltage phasor 60, a potential difference $U_{NM}$ between a reference voltage M of the bridge voltages $U_i$ and a reference voltage N of the output voltages $U_0$, for example as described with respect to FIGS. 18 to 20.

Alternatively or additionally, the regulation apparatus 110 can be configured to consider, when determining the reference voltage phasor 60, a contribution of harmonics of a voltage fundamental oscillation in the intermediate circuit to the bridge voltage, for example as described with respect to FIGS. 18 to 20.

Figure 10:
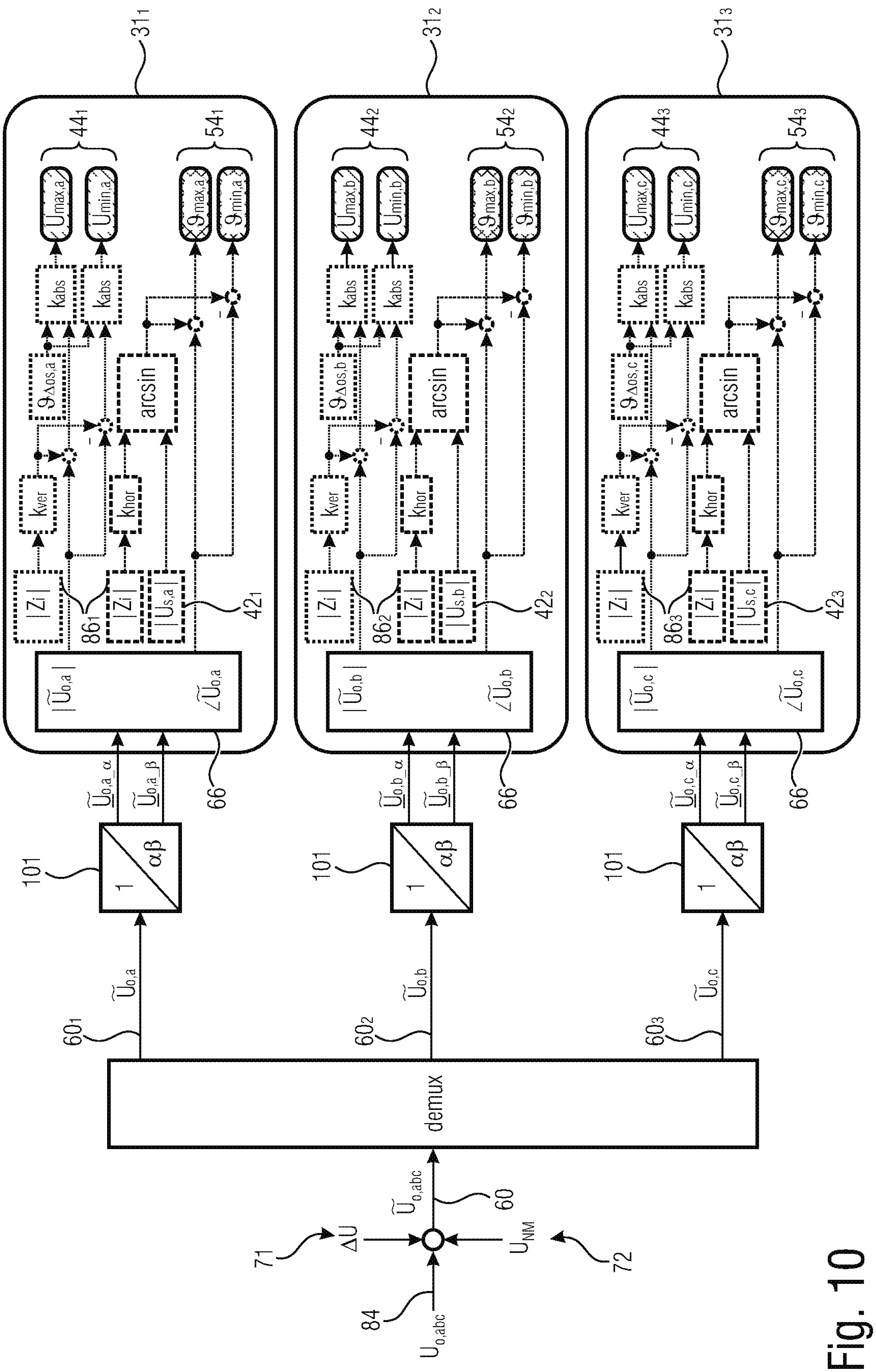
FIG. 10 shows an embodiment of a phase-separated control range determination for a multi-phase power converter.
Figure 11:
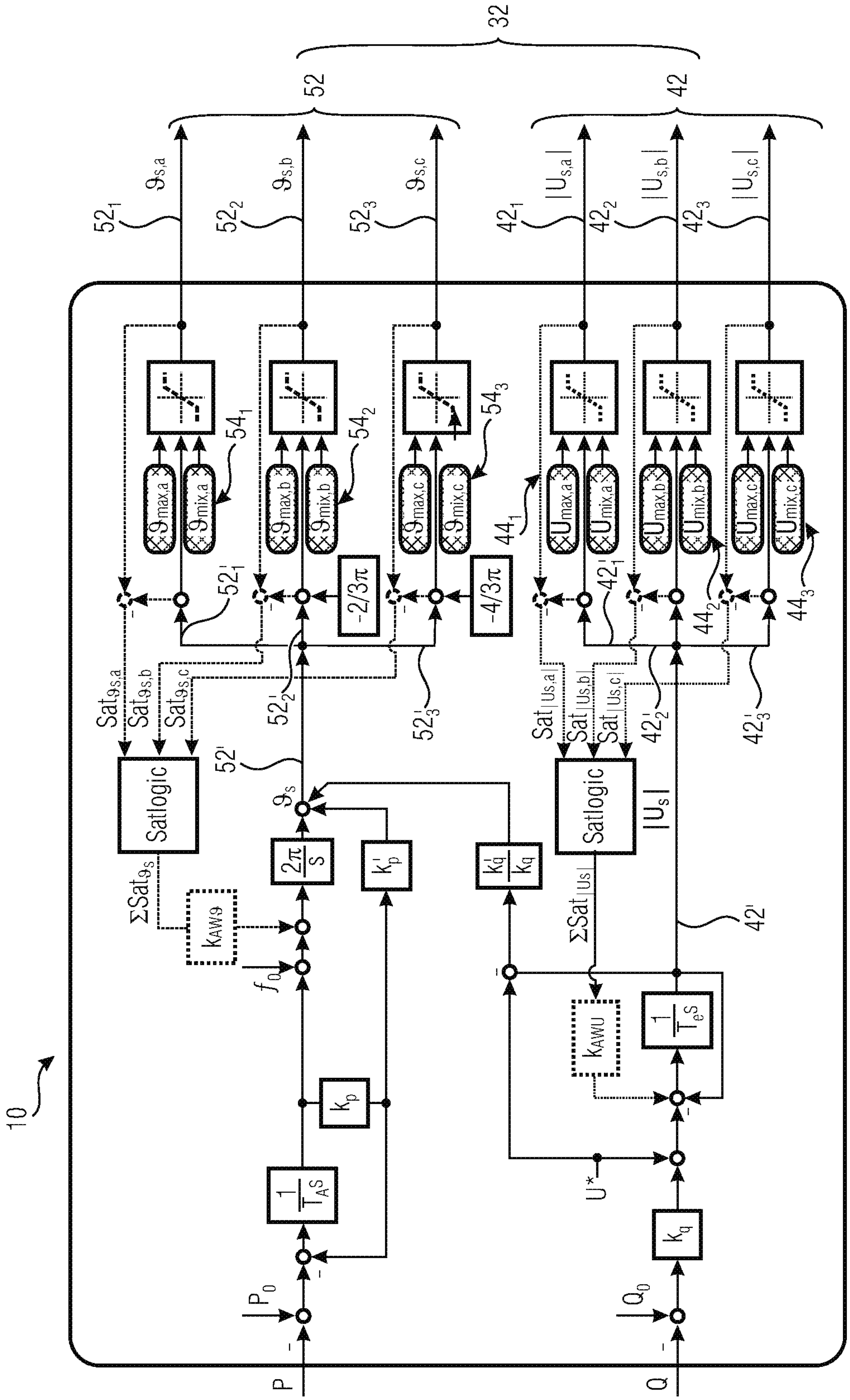
FIG. 11 illustrates an embodiment of a regulation apparatus for a multi-phase power converter.

FIG. 10 illustrates a control range determination as it can be implemented in examples of the regulation apparatus 110 for regulating a multi-phase power converter 80, in particular the regulation apparatus 110 according to FIG. 11. According to the embodiment in FIG. 10, the regulation apparatus 110 determines an amplitude control range 44 and an angle control range 54 for each of a plurality of phases of the power converter 80, for example for each of three phases U, V, W of a three-phase power converter, for example the three-phase power converter 80 of FIG. 9. According to the embodiment of FIG. 10, the regulation apparatus 110 determines, based on one or several measurement quantities 84 describing the output voltages of the plurality of phases of the power converter 80, for example a space voltage phasor $U_{0,abc}$, a respective reference voltage phasor for each of the phases of the power converter. For the example of the three-phase power converter, the regulation apparatus 110 can determine, as shown in FIG. 10, a first reference voltage phasor $\mathbf{60}_1$ for the first phase, a second reference voltage phasor $\mathbf{60}_2$ for the second phase and a third reference voltage phasor $\mathbf{60}_3$ for the third phase. Optionally, the regulation apparatus 110 can consider one or several of the correction factors 71, 72, for determining the reference voltage phasor $\mathbf{60}_1$, $\mathbf{60}_2$, $\mathbf{60}_3$, as described with reference to FIGS. 5 and 9. Here, in examples, the correction factors can be determined separately for each of the phases and can be considered in the respective control quantity determination 31 for the phases. The reference voltage phasors for the respective phases can each be subject to a coordinate transformation 1101, for example a Clarke transformation to obtain the respective reference voltage phasor in $\alpha\beta$ coordinates. Alternatively, the reference voltage phasors can also be subject to a Park transformation to obtain the reference voltage phasor in dq coordinates. According to the example of FIG. 10, the reference voltage phasors $\mathbf{60}_1$, $\mathbf{60}_2$, $\mathbf{60}_3$ are each supplied to a control quantity determination module 31 as described with respect to FIG. 5 to determine the respective amplitude control range 44 and the respective angle control range 54 for the respective phase of the power converter.

In other words, according to the example of FIG. 10, the control quantity determination is performed, in a phase separate manner, i.e., separately in the individual phases or individually for the individual phases. For the example of the three-phase power converter, this means that a first control quantity determination module $\mathbf{31}_1$ determines, based on the reference voltage phasor $\mathbf{60}_1$ for the first phase, the amplitude control range $\mathbf{44}_1$ and the amplitude control range $\mathbf{54}_1$ for a control quantity for the first phase. Accordingly, a second control quantity determination module $\mathbf{31}_2$ determines, based on the reference voltage phasor $\mathbf{60}_2$, the amplitude control range $\mathbf{44}_2$ and the angle control range $\mathbf{54}_2$ for the second phase and a third control quantity determination module $\mathbf{31}_3$, based on the reference voltage phasor $\mathbf{60}_3$, the amplitude control range $\mathbf{44}_3$ and the angle control range $\mathbf{54}_3$ for the third phase. The first control quantity determination module $\mathbf{31}_1$ can use an amplitude $\mathbf{42}_1$ of the control voltage phasor for the first phase for determining the angle control range $\mathbf{54}_1$ or alternatively, the amplitude of the reference voltage phasor $\mathbf{60}_1$. This means the control range determination modules 31 for the respective phases can use, for determining the respective angle control range 54 for the respective phase, the amplitude $\mathbf{42}_1$, $\mathbf{42}_2$, $\mathbf{42}_3$ of the control voltage phasor for the respective phase or the amplitude of the respective reference voltage phasor $60_1$, $60_2$, $60_3$ of the respective phase.

In other words, according to embodiments of the regulation apparatus 110, starting from the three-phase output voltage $U_{0,abc}$ of the power converter that has been determined by means of measurement technology, to which optionally the voltage $\underline{U}_{NM}$ and/or the voltage $\Delta\underline{U}$ can be added, first, the individual phases are separated. Subsequently, the same are decomposed into αβ coordinates. In alternative embodiments, decomposition into dq coordinates takes place. One method for decomposition into αβ coordinates is offered by the usage of SOGI (Second Order Generalized Integrator) [5]. In the method for decomposition of individual signals, it is decisive that the time constant for the quadrature process is below the time constant of the internal impedance. When the signals are provided in a Clarke-transformed illustration, calculation of the respective phase angles $\angle\tilde{U}_{o,a}$, $\angle\tilde{U}_{o,b}$, $\angle\tilde{U}_{o,c}$ and their amplitudes $|\tilde{U}_{o,k}|$ (with k=a, b, c) is performed. Additionally, the control amplitudes $|U_{s,k}|$ (with k=a, b, c) are inferred dynamically for calculating the control quantity limitation from the three-phase amplitudes of the control signals according to FIG. 11. Subsequently, the control quantity limitations $U_{min,k}$, $U_{max,k}$, $\vartheta_{min,k}$, $\vartheta_{max,k}$, with k=a, b, c will be calculated, as described with reference to FIG. 5.

FIG. 11 illustrates an embodiment of the regulation apparatus 110 according to which the regulation apparatus 110 provides one control voltage phasor each for a plurality of phases. In the example shown in FIG. 11 for a three-phase power converter, the regulation apparatus 110 is configured to provide a first control voltage phasor with amplitude $42_1$ and angle $52_1$ for the first phase, a second control voltage phasor with amplitude $42_2$ and angle $52_2$ for the second phase, and a third control voltage phasor with amplitude $42_3$ and angle $52_3$ for the third phase. The amplitudes $42_1$, $42_2$, $42_3$ and the angles $52_1$, $52_2$, $52_3$ of the control voltage phasors for the plurality of phases are each limited separately, wherein the respective amplitude control ranges $44_1$, $44_2$, $44_3$ and the angle control ranges $54_1$, $54_2$, $54_3$ can be determined separately for the individual phases, for example, as described with reference to FIG. 10.

According to the embodiment in FIG. 11, the set control voltage phasor 32' describes the set control voltage for the plurality of phases and the regulation apparatus 110 is configured to determine, for each of the phases based on an amplitude 42' of the set control voltage phasor 32' a respective amplitude $42'_1$, $42'_2$, $42'_3$ and to determine an angle $52'_1$, $52'_2$, $52'_3$ for each of the phases based on an angle 52' of the set control voltage phasor 32'. According to these embodiments, the regulation apparatus 110 limits the amplitudes and angles of the respective phases separately.

The determination of the set control voltage phasor 32' can take place by the regulation apparatus 110 according to FIG. 11 as described with respect to the regulation apparatus 110 according to FIG. 8.

In other words, FIG. 11 illustrates a modified version of the grid-forming regulation method of FIG. 7. In examples, both regulation methods can comprise an equivalent system behavior, wherein $T_A \cdot k_p = T_m$ applies for the constant. Further, the PT1 components of FIG. 7 are implemented by integrators with a negative feedback loop. Additionally, the modified variation of the regulation method of FIG. 7 is provided with saturation blocks in combination with the tracking anti-windup method of [6]. The factors $K_{AW\vartheta}$ and $K_{AWU}$ represent the proportionality factors of [6]. The blocks "Satlogic" are provided with a logic forming the sum $\Sigma Sat_{\vartheta_s}$ or $\Sigma Sat_{|I_s|}$ of the respective three input signals $\Sigma Sat_{\vartheta_k}$ respective $\Sigma Sat_{|U_k|}$ with k=a, b, c as soon as these each have a valence unequal zero. Subsequently, the inputs of the respective integrators of the respective sums $\Sigma Sat_{|U_i|}$, $\Sigma Sat_{\vartheta_i}$ are provided. The limits of the saturation blocks are dynamically determined according to FIG. 10.

For phase-separate control quantity limitation, the control signals are transformed into a three-phase phasor illustration and subsequently used for controlling the power semiconductors with the help of different modulation methods. This can be obtained from the view of the respective control values of the phase 9s by additional paths with phase shifts by −2/3π or −4/3π. The control values of the amplitudes $|U_s|$ are also transformed into a three-phase phasor illustration and subsequently represent the amount of the single-phase voltage phasors $|U_{s,a}|$, $|U_{s,b}|$, $|U_{s,c}|$. By separating the phases, an immediate control quantity limitation can be obtained based on the respective control quantities of FIG. 6. By the control quantity limitation of the control voltage amplitudes $|U_{s,a}|$, $|U_{s,b}|$, $|U_{s,c}|$ and the control angles $\vartheta_{s,a}$, $\vartheta_{s,b}$, $\vartheta_{s,c}$, the control signals always fulfil equations Eq. 8 and Eq. 9:

$$U_{min,} \leq |U_{s,k}| \leq U_{max,k} \qquad \text{Eq. 8}$$

$$\vartheta_{min,k} \leq \vartheta_{s,k} \leq \vartheta_{max,k}, \qquad \text{Eq. 9}$$

wherein k=a, b, c applies.

The implementation with phase-separate control quantity limitation described with reference to FIGS. 11 and 12 and determination of a respective control voltage phasor for each of the plurality of phases can be particularly advantageous for grids where imbalance between the phases of the grids can occur.

For example, with reference to the power converter 80 of FIG. 9, the first control voltage $U_{s1}$ can be described by the amplitude $42_1$ and the angle $52_1$, the second control voltage $U_{s2}$ can be described by the amplitude $42_2$ and the angle $52_2$, and the third control voltage $U_{s3}$ can be described by the amplitude $42_3$ and the angle $52_2$.

Figure 12:
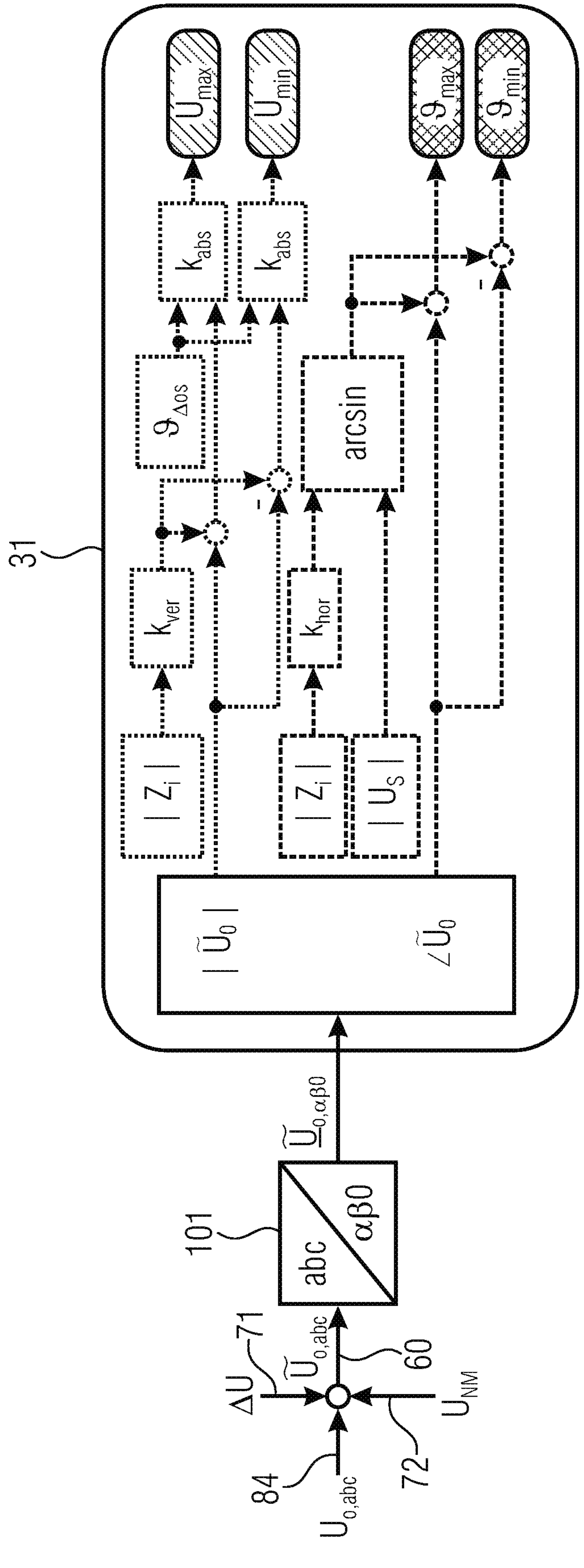
FIG. 12 illustrates an embodiment of a control range determination for balanced grids.

FIG. 12 illustrates an example of a control quantity determination for balanced three-phase grids. In the case of balanced three-phase grids, the control voltages, for example, the control voltages $U_{s1}$, $U_{s2}$, $U_{s3}$ of FIG. 9 can be described by means of a common control voltage phasor. Analogously, the output voltages of the three phases, for example, $U_{01}$, $U_{02}$, $U_{03}$ of FIG. 9 can be described by means of a common reference voltage phasor 60. Accordingly, according to embodiments, in particular, embodiments for balanced grids, the regulation apparatus 110 can obtain, the reference voltage phasor 60 based on the one or several measurement quantities 84 describing the output voltages of the three phases, for example, the three phases U, V, W of the power converter 80. Here, the regulation apparatus 110 can optionally consider the correction terms 71 and 72 as described with reference to FIGS. 5 and 9. According to the embodiment of FIG. 12, the regulation apparatus 110 can transform the control voltage phasor 60 describing the three phases of the power converter 80 by means of a transformation 1101 and supply the transformed control voltage phasor to the control range determination module 31. As described with reference to FIG. 10, the transformation 1101 can be a Park transformation or a Clarke transformation. The control range determination 31 can be implemented as described with reference to FIG. 5. This means, according to these embodiments, the regulation apparatus 110 can be configured to limit a common control voltage phasor for the three phases of the three-phase power converter 80.

Embodiments of the regulation apparatus 110 for balanced grids can be configured as shown in FIG. 8, wherein the control voltage phasor 32, or in this case, the set control voltage phasor 32' represents a control voltage phasor for the three phases of a three-phase power converter. Based on the set control voltage phasor 32 determined by the regulation apparatus 110, the power converter 80 can determine a respective control voltage for each of the three phases of the power converter. For example, the power converter 80 according to FIG. 9 can be configured to determine the first control voltage $U_{s1}$, the second control voltage $U_{s2}$ and the third control voltage $U_{s3}$ based on the control voltage 32.

In other words, FIG. 8 in combination with FIG. 12 can represent an embodiment for determining the dynamic control quantity limitation for three-phase balanced grids that can be implemented, for example, as described with reference to FIG. 5.

For balanced grids, the control quantity limitations can be realized based on the sum of: the three-phase output voltage $U_{0,abc}$ of the power converter determined by measurement technology, the voltage $\underline{U}_{NM}$ as well as the voltage $\Delta\underline{U}$ and a subsequent Clarke transformation ($\underline{\tilde{U}}_{o,\alpha\beta 0}$). The amplitude of the controlled voltage phasor $|U_s|$ is inferred dynamically according to FIG. 8. Subsequently, the calculation of the control quantity limitation ($U_{max}$, $U_{min}$, $\vartheta_{max}$, $\vartheta_{min}$) takes place as described with reference to FIG. 5. The grid-forming regulation method of FIG. 8 can be implemented like the regulation method of FIG. 11 and can comprise an equivalent or similar system behavior as the regulation method of FIG. 11, wherein here also $T_A \cdot k_p = T_m$ applies for the constant. Deviating therefrom, the regulation method includes the control quantity specification of FIG. 12, i.e. limitation is performed together for all phases and the feedback loop for the anti-windup can be adapted accordingly. For example, saturation blocks are integrated and two integrators are provided with the tracking anti-windup method [6]. The factors $K_{AW\vartheta}$ and $K_{AWU}$ additionally form the proportionality factors of [6].

By the control quantity limitation of the control voltage amplitude $|U_s|$ and the control angle $\vartheta_s$, the two control signals always fulfil the same equations Eq. 10 and Eq. 11:

$$U_{min} \leq |U_s| \leq U_{max} \qquad \text{Eq. 10}$$

$$\vartheta_{min} \leq \vartheta_s \leq \vartheta_{max} \qquad \text{Eq. 1}$$

According to embodiments, the power converter 80 is a multi-phase power converter and the reference voltage phasor 60 describes a plurality of output voltages $U_{01}$, $U_{02}$, $U_{03}$, each allocated to a phase of a plurality of phases U, V, W of the power converter 80. According to the embodiments, the power converter 80 is configured to provide a voltage $U_{i1}$, $U_{i2}$, $U_{i3}$ indicated by the control voltage 32 for each of the phases. For example, the power converter 80 provides the voltage indicated by the control voltage 32 for the phases at the terminal point $\mathbf{88}_1$, $\mathbf{88}_2$, $\mathbf{88}_3$ allocated to the respective phase, which is connected to the terminal point of the respective phase by means of the internal impedance $\mathbf{86}_1$, $\mathbf{86}_2$, $\mathbf{86}_3$.

Figure 13:
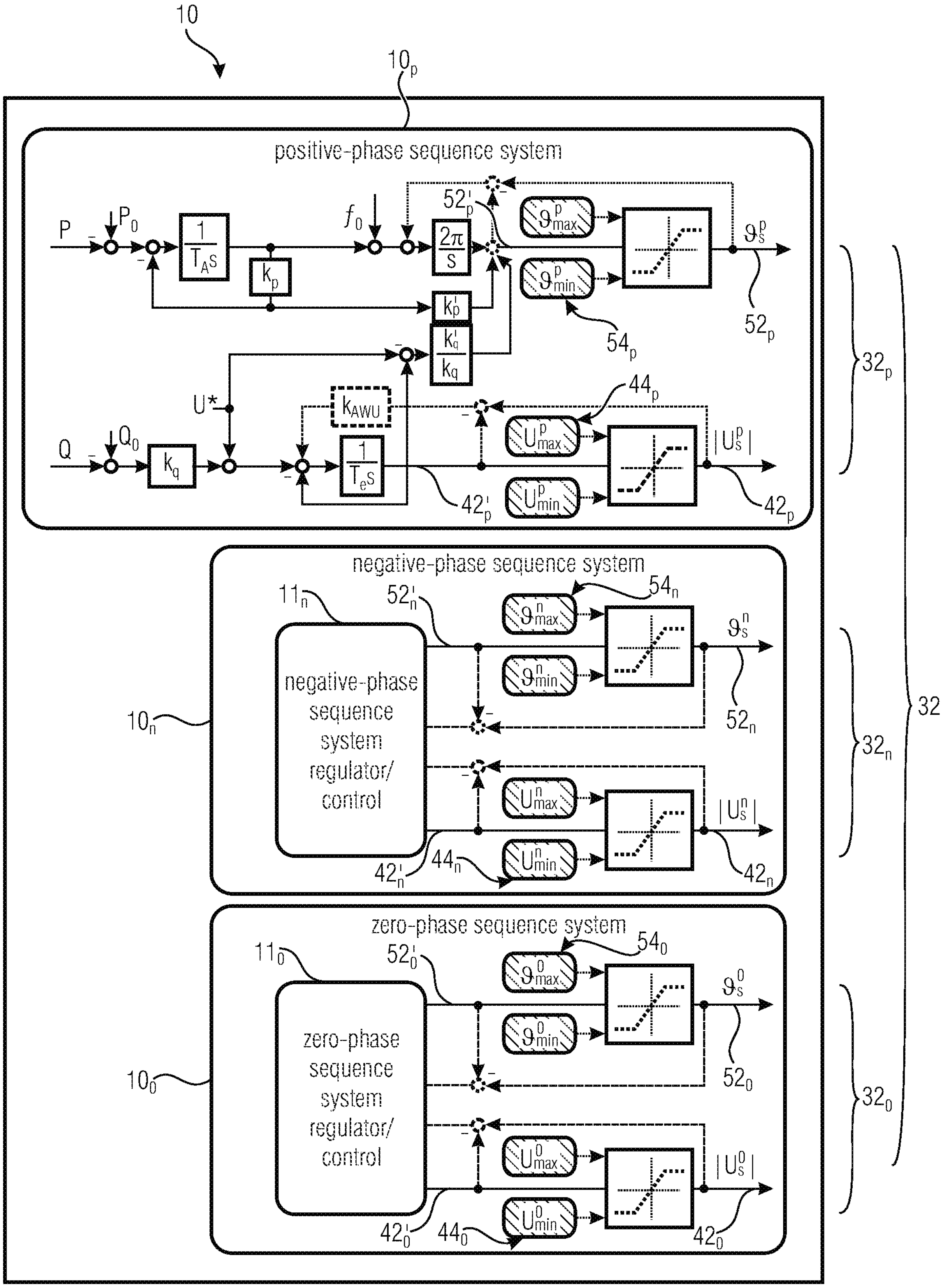
FIG. 13 illustrates an embodiment of a regulation apparatus in positive-phase sequence system, negative-phase sequence system and zero-phase sequence system.

FIG. 13 illustrates a further embodiment of the regulation apparatus 110 that is configured for a three-phase power converter, for example, for the power converter 80 according to FIG. 9. According to the example of FIG. 13, the power converter is configured to provide, in dependence on the control voltage 32, one voltage each for the first phase U, the second phase V and the third phase W of the three-phase power converter 80. According to the embodiment of FIG. 13, the regulation apparatus 110 is configured to regulate the control voltage 32 in positive-phase sequence system, negative-phase sequence system and zero-phase sequence system components. The regulation apparatus 110 according to FIG. 13 comprises a positive-phase sequence system regulation $\mathbf{110}_p$ that is configured to determine a positive-phase sequence system control voltage phasor $\mathbf{32}_p$. Further, the regulation apparatus 110 according to FIG. 13 comprises negative-phase sequence system regulation $\mathbf{110}_n$ that is configured to determine a negative-phase sequence system control voltage phasor $\mathbf{32}_n$. Optionally, the regulation apparatus 110 can comprise a zero-phase sequence system regulation $\mathbf{110}_0$ that is configured to determine a zero-phase sequence system control voltage phasor $\mathbf{32}_0$. The positive-phase sequence system control voltage phasor $\mathbf{32}_p$, the negative-phase sequence system control voltage phasor $\mathbf{32}_n$ and the zero-phase sequence system control voltage phasor $\mathbf{32}_0$ describe together the control voltage 32 based on which the power converter 80 can determine a control voltage each for each of the three phases of the power converter 80, for example, the first control voltage $U_{s1}$, the second control voltage $U_{s2}$ and the third control voltage $U_{s3}$ (cf. FIG. 9). The positive-phase sequence system regulation $\mathbf{110}_p$ is configured to determine a positive-phase sequence system set control voltage phasor based on one or several measurement quantities 84 describing the output voltages of the three phases of the power converter (cf. FIG. 1) and to limit an amplitude $\mathbf{42'}_p$ and an angle $\mathbf{52'}_p$ of the positive-phase sequence system control voltage phasor to determine an amplitude $\mathbf{42}_p$ and an angle $\mathbf{52}_p$ of the positive-phase sequence system control voltage phasor $\mathbf{32}_p$. For example, the positive-phase sequence system regulation $\mathbf{110}_p$ can be configured according to the regulation for balanced systems shown in FIG. 8, wherein in the case of the positive-phase sequence system regulation $\mathbf{110}_p$ the regulated voltage describes the positive-phase sequence system of the output voltages of the three phases. The positive-phase sequence system $\mathbf{110}_p$ can be configured to limit the amplitude $\mathbf{42'}_p$ to an amplitude control range $\mathbf{44}_p$ to obtain the amplitude $\mathbf{42}_p$. Further, the positive-phase sequence system regulation $\mathbf{110}_p$ can be configured to limit the angle $\mathbf{52'}_p$ to an angle control range $\mathbf{54}_p$ to obtain the angle $\mathbf{52}_p$.

Figure 14:
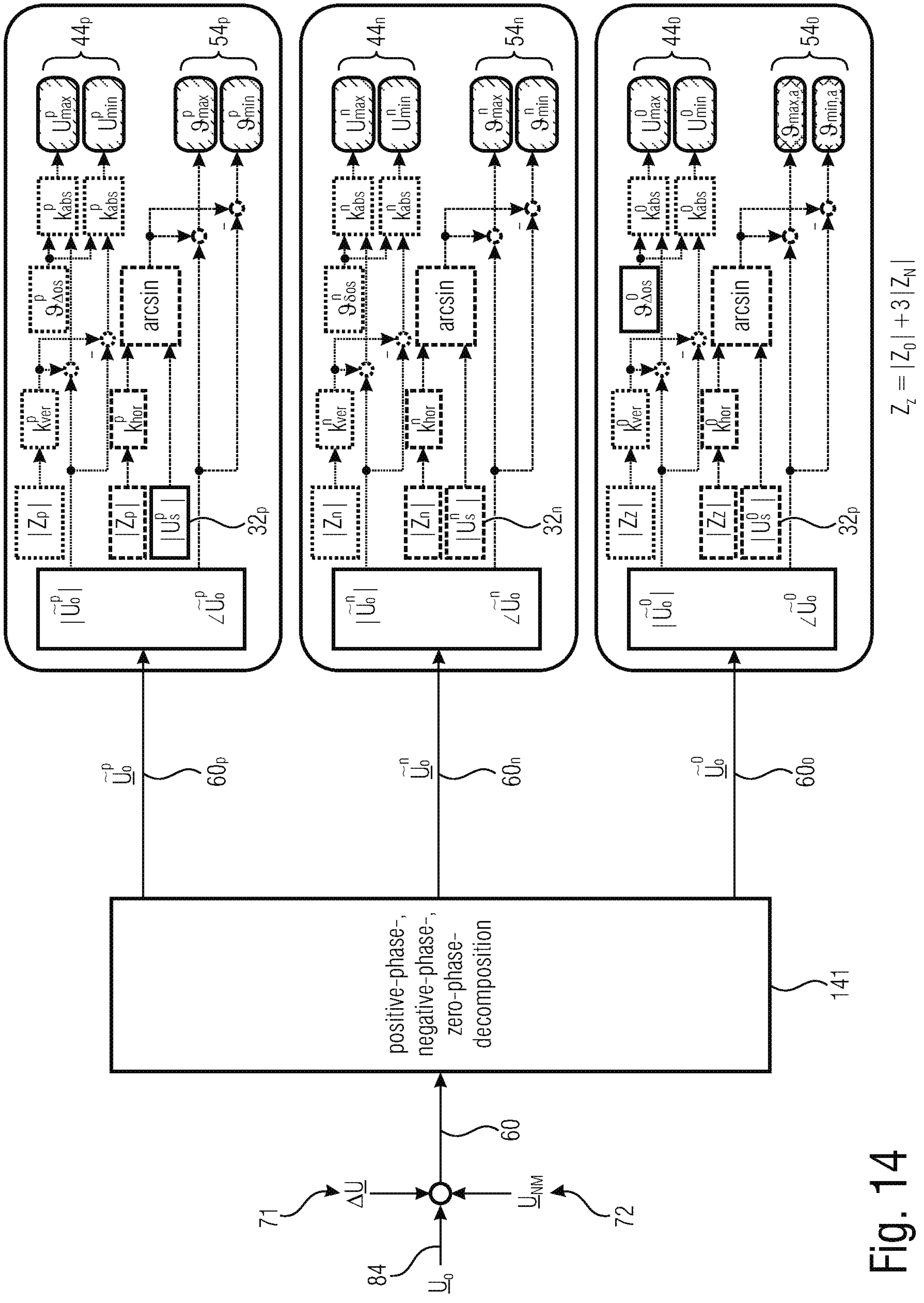
FIG. 14 illustrates an embodiment of a separate control range determination for positive-phase sequence system, negative-phase sequence system and zero-phase sequence system.

In the example of FIG. 13, the respective output voltages of the first, second and third phase of the power converter 80 can be described by means of a positive-phase sequence system reference voltage phasor $\mathbf{60}_p$, a negative-phase sequence system reference voltage phasor $\mathbf{60}_n$ and a zero-phase sequence system reference voltage phasor $\mathbf{60}_0$ (cf. FIG. 14). The positive-phase sequence system regulation $\mathbf{110}_p$ can be configured to regulate the positive-phase sequence system reference voltage phasor $\mathbf{60}_p$. In examples, the negative-phase sequence system regulation $\mathbf{110}_n$ can be configured to regulate the negative-phase sequence system reference voltage phasor $\mathbf{60}_n$ to zero and the zero-phase sequence system regulation $\mathbf{110}_0$ can be configured to regulate the zero-phase sequence system reference voltage phasor $\mathbf{60}_0$ to zero. For this, the negative-phase sequence system regulation $\mathbf{110}_n$ and the zero-phase sequence system regulation $\mathbf{110}_0$ can comprise a negative-phase sequence system control $\mathbf{110}_n$ or a zero-phase sequence system control $\mathbf{110}_0$. The negative-phase sequence system control $\mathbf{110}_n$ provides an amplitude $\mathbf{42'}_n$ and an angle $\mathbf{52'}_n$ of a negative-phase sequence system set control voltage phasor. The negative-phase sequence system regulation $\mathbf{110}_n$ is configured to limit the amplitude $\mathbf{42'}_n$ to an angle control range $\mathbf{44}_n$ to obtain an amplitude $\mathbf{42}_n$ of the negative-phase sequence system control voltage phasor $\mathbf{32}_n$. Further, the negative-phase sequence system regulation $\mathbf{110}_n$ is configured to limit an angle 52'$_n$ of the negative-phase sequence system set control voltage phasor to an angle control range 54$_n$ to determine an angle 52$_n$ of the negative-phase sequence system control voltage phasor 32$_n$. The zero-phase sequence system control 1110 is configured to determine an amplitude 42'$_0$ and an angle 52'$_0$ of a zero-phase sequence system set control voltage phasor. The zero-phase sequence system regulation 110$_0$ can be configured to limit the amplitude 42'$_0$ to an amplitude control range 42$_0$ to determine an amplitude 42$_0$ of the zero-phase sequence system control voltage phasor 32$_0$. Further, the zero-phase sequence system regulation 110$_0$ can be configured to limit the angle 52'$_0$ to an angle control range 54$_0$ to determine an angle 52$_0$ of the zero-phase sequence system control voltage phasor 32$_0$.

In other words, according to embodiments, the control quantity limitation can be configured in positive-phase, negative-phase and zero-phase sequence system. According to standard, the grid-forming regulation is configured for the positive-phase sequence system. The limitation of the positive-phase sequence system can hence take place in examples analogously to the balanced case as described with reference to FIG. 12 or FIG. 8. The negative-phase and zero-phase sequence system are controlled in these examples by the value zero to obtain ideal balancing. Depending on the imbalance of the grid, negative-sequence- or zero-sequence-currents of any amount can occur. Therefore, in examples, the regulation apparatus 110 comprises a regulation 110$_n$ of the negative-phase sequence system and the regulation 110$_0$ of the zero-phase sequence system of the control voltage that can limit or harmonize the balancing amount. In dependence on the regulation task with respect to the negative-phase or zero-phase sequence system, control limitation can be put down in a similar manner (cf. FIG. 14).

FIG. 14 illustrates an example of a control range determination in the positive-phase, negative-phase and zero-phase sequence system. According to the example of FIG. 14, the regulation apparatus 110 is configured to determine the amplitude control range 44$_p$ and the angle control range 54$_p$ for the positive-phase sequence system, the amplitude control range 44$_n$ and the angle control range 54$_n$ for the negative-phase sequence system as well as the amplitude control range 44$_0$ and the angle control range 54$_0$ for the zero-phase sequence system. In other words, the regulation apparatus 110 can determine separate control quantity limits for the positive-phase, negative-phase and zero-phase sequence system. The regulation apparatus 110 can comprise a positive-phase sequence system control range determination 31$_p$ that is configured to determine the amplitude control range 44$_p$ and the angle control range 54$_p$ based on a positive-phase sequence system reference voltage phasor 60$_p$. Accordingly, the regulation apparatus 110 can comprise a negative-phase sequence system control range determination 31$_n$ that is configured to determine the amplitude control range 44$_n$ and the angle control range 54$_n$ based on a negative-phase sequence system reference voltage phasor 60$_n$. Further, the regulation apparatus 110 can comprise a zero-phase sequence system control range determination 31$_0$ that is configured to determine the amplitude control range 44$_0$ and the and the angle control range 54$_0$ based on a zero-phase sequence system reference voltage phasor 60$_0$. According to the embodiment of FIG. 14, the regulation apparatus 110 can comprise a positive-phase, negative-phase and zero-phase decomposition 141, which can be configured to determine the positive-phase sequence system voltage phasor 60$_p$, the negative-phase sequence system reference voltage phasor 60$_n$ and the zero-phase sequence system reference voltage phasor 60$_0$ based on a reference voltage phasor 60. As described with reference to FIGS. 5 and 9, also in these embodiments, the reference voltage phasor 60 can be determined based on the one or several measurement quantities 84 as well as optionally one or several of the correction terms 71, 72.

The control range determination 31$_p$, 31$_n$, 31$_0$ can be implemented, for example, according to the control range determination 31 of FIG. 5. Here, the first and second deviation limiting values can be determined separately for the positive-phase sequence system, the negative-phase sequence system and the zero-phase sequence system.

In other words, starting from the reference voltage phasor $\underline{U}_0$ to which optionally the voltage phasor $\underline{U}_{NM}$ as well as the voltage phasor $\Delta\underline{U}$ can be added, according to the embodiment of FIG. 13, a decomposition (for example according to [7]) into a positive-phase sequence system voltage $$\underline{\tilde{U}}_o^p$$

and a negative-phase sequence system voltage $$\underline{\tilde{U}}_o^n$$

and a zero-phase sequence system voltage $$\underline{\tilde{U}}_o^0$$

for calculating the phase angles $$\angle\tilde{U}_o^p,\ \angle\tilde{U}_o^n,\ \tilde{U}_o^0$$

and amplitudes $$|\tilde{U}_o^p|,\ |\tilde{U}_o^n|,\ |\tilde{U}_o^0|$$

can take place. Analogously to embodiments of FIGS. 8 and 10, the capacitor voltage at the sinusoidal filter or the voltage at the grid coupling of the power converter can also be used. Additionally, the control voltage amplitudes for the positive-phase sequence system $$|U_s^p|,$$

the negative-phase sequence system $$|U_s^n|$$

and the zero-phase sequence system $$|U_s^0|$$

are inferred from the respective control values. Subsequently, the control quantity limitations for the positive-phase sequence system $$(U^p_{max}, U^p_{min}, \vartheta^p_{max}, \vartheta^p_{min}),$$

and the negative-phase sequence system $$(U^n_{max}, U^n_{min}, \vartheta^n_{max}, \vartheta^n_{min})$$

and optionally the zero-phase sequence system $$(U^0_{max}, U^0_{min}, \vartheta^0_{max}, \vartheta^0_{min}),$$

can be determined as described with reference to FIG. 5.

Here, the allowable corridors are also determined with the help of the respective factors $$k^{\cdots}_{ver} \in [0, 1].$$

For this, different sub variations are possible. On the one hand, the free areas for the respective systems can be distributed and predefined. In another realization, conditional free spaces can be used where a system (for example the positive-phase sequence system) is prioritized and the other ones result from the unused free spaces. In any case, it has to be kept in mind that the sum of all voltage differences does not leave the entire allowable voltage range.

FIG. 15 illustrates regulation apparatus 210 according to an embodiment. Optionally, the regulation apparatus 210 can correspond to the regulation apparatus 10 and can optionally comprise the features with reference to FIG. 1. The regulation apparatus 210 comprises a limiting module 230 that is configured to determine a control voltage 232 for a power converter 80 in dependence on the output voltage of the power converter 80. A control voltage phasor that is described by means of a first coordinate 242 and a second coordinate 252 represents the control voltage. Further, the limiting module 230 receives a reference voltage phasor 260 that is described by means of a first coordinate 262 and a second coordinate 264 and which describes the output voltage of the power converter 80. The limiting module 230 includes a first coordinate limiting module 241, configured to limit the first coordinate 242 of the control voltage phasor 232 to a first control range 244 around the first coordinate 262 of the reference voltage phasor 260. Further, the limiting module 230 includes a second coordinate limiting module 251, configured to limit the second coordinate 252 of the control voltage phasor 232 to a second control range 254 around the second coordinate 264 of the reference voltage phasor 260. The first coordinate 242 of the control voltage phasor 232 and the first coordinate 262 of the reference voltage phasor 260 are related to a first coordinate axis of a coordinate system and the second coordinate 252 of the control voltage phasor 232 and the second coordinate 264 of the reference voltage phasor 260 are related to a second coordinate axis of the coordinate system. According to the embodiment of FIG. 15, the first coordinate axis and the second coordinate axis are orthogonal and rectilinear to each other. The coordinate system is, for example, a Cartesian coordinate system.

In other words, in contrary to the above-described embodiment, where the control voltage phasor 32 is limited to a control range determined in polar coordinates, the control range for the control voltage phasor 232 is determined with respect to coordinate axes that are orthogonal to each other in form of the first control range 244 and the second control range 254. In that way, the control range can be determined in a particularly easy way. In particular, the effects described with respect to the polar coordinates that the amplitude and the angle depend on each other with respect to the first and second direction of Cartesian (or orthogonal) coordinates, e.g., dq coordinates, can be prevented. When using coordinates for the control range determination that are orthogonal to each other, the rectangular control range described with reference to FIG. 4B but also the circular control range can be obtained in an easier way.

The regulation apparatus 210 is shown in FIG. 15 in the context of a power converter arrangement 2 with a power converter 80 and a control quantity regulation 20, which can optionally be part of the regulation apparatus. The cooperation of regulation apparatus 220 with the control quantity regulation 20 and the power converter 80 can take place as described with respect to the above embodiments with respect to FIGS. 1 to 14. For example, the control quantity regulation 20 according to the embodiment of FIG. 15 can provide the set control voltage phasor 232' in orthogonal coordinates. Additionally, the regulation apparatus 210 can comprise the reference voltage phasor determination module 78 to provide the reference voltage phasor 260 in orthogonal coordinates.

Generally, the regulation apparatus 210 can optionally be supplemented by all features described with reference to the regulation apparatus 110 by using, instead of amplitude and angle, the first and second coordinates that are orthogonal to each other. For example, the functions of the control voltage phasor 32, 232 of the reference voltage phasor 60, 260 of the set control voltage phasor 32', 232' and the limiting module 30, 232 can be identical with the exception of the used coordinates, wherein it should further be noted that the regulation apparatus 210 determines the first and second control range not necessarily depending on the situation but that the same can optionally also both be predetermined. Here, the first coordinate limiting module 241 can replace the amplitude limiting module 41, the second coordinate limiting module 251 can replace the angle limiting module 51, with respect to the control voltage phasor, the first coordinate 242 can replace the amplitude 42 and the second coordinate 252 can replace the angle 52, the first control range 244 can replace the amplitude control range 44, the second control range 254 can replace the angle control range 54, a first control range determination module 243 can replace the amplitude control range determination module 43, a second control range determination module 253 can replace the angle control range determination module 53 and, with respect to the reference voltage phasor, the first coordinate 262 can replace the amplitude 62 and the second coordinate 264 can replace the angle 64.

For example, the regulation apparatus can comprise a first control range determination module 243 that determines the first control range 244 based on the first coordinate 262 of the reference voltage phasor 260. Further, the regulation apparatus can comprise a second control range determination module 253 that determines the second control range 254 based on the first coordinate 264 of the reference voltage phasor 260.

According to embodiments, the first control range determination module 243 adjusts the first control range 244 based on a first deviation limiting value (e.g., 246 in FIG. 16) to limit a deviation of the first coordinate 242 of the control voltage phasor 232 from the first coordinate 262 of the reference voltage phasor 260 to a first deviation limiting value. According to these embodiments, the second control range determination module 253 adjusts the second control range 254 based on a second deviation limiting value (e.g. 256 in FIG. 16) to limit a deviation of the second coordinate 252 of the control voltage phasor 232 from the second coordinate 264 of the reference voltage phasor 260 to a second deviation limiting value.

For example, the first and the second deviation limiting value can fulfill the function as described with respect to the regulation apparatus 110, for example with respect to FIG. 4B. For example, the first and second deviation limiting values can state maximum deviations in the first and second direction, for example, in the direction of the first and second coordinate axis. For example, the regulation apparatus can determine the first and the second deviation limiting value depending on the situation.

For example, the first control range determination module 243 can determine a lower and an upper limit of the first control range, e.g., by adding and subtracting the first deviation limiting value from the first coordinate of the reference voltage phasor. Accordingly, the second control range determination module 253 can determine a lower and upper limit of the second control range, e.g., by adding and subtracting the second deviation limiting value from the second coordinate of the reference voltage phasor.

According to embodiments, the coordinate system of the first and second coordinate 242, 252 can be static with respect to the reference voltage phasor 260. For example, the first coordinate axis is parallel to the reference voltage phasor 260 and the second coordinate axis orthogonal to the reference voltage phasor.

Figure 16:
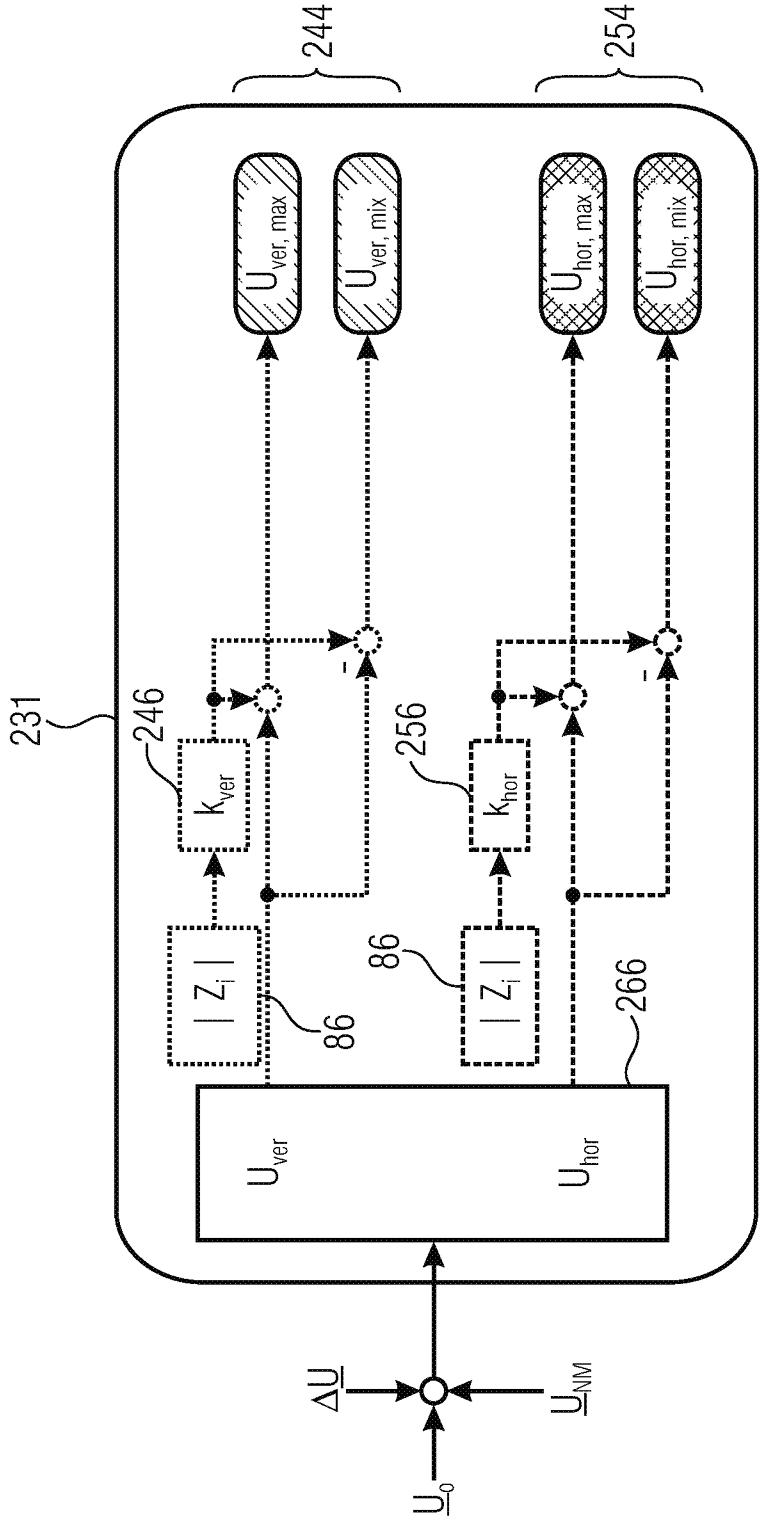
FIG. 16 illustrates an embodiment of a control range determination in an orthogonal coordinate system.

FIG. 16 illustrates an example of a limiting value determination 231 (or control range determination 231) in Cartesian coordinates, as it can be implemented in examples of the regulation apparatus 210 of FIG. 15. The control range determination 231 can represent the modules 243, 253 of FIG. 15. According to the example of FIG. 16, the first control range 244 is provided in the form of an upper limiting value $U_{ver,max}$ and a lower limiting value $U_{ver,min}$ for the first coordinate 242 of the voltage phasor 232. Analogously, the second control range 254 is provided in the form of an upper limiting value $U_{hor,max}$ and a lower limiting value $U_{hor,min}$ for the second coordinate 252 of the control voltage phasor 232. According to the example of FIG. 16, the regulation apparatus 210 comprises a module 266 that is configured to provide the first coordinate 262 and the second coordinate 264 of the reference voltage phasor 260. According to the example shown in FIG. 16, the control range determination 231 is configured to determine the first deviation limiting value 246 based on the internal impedance 86 and to determine the lower and the upper limit of the first control range 244 based on the first deviation limiting value 46. Further, the control range determination 231 according to FIG. 16 is configured to determine the second deviation limiting value 256 based on the internal impedance 86 and to determine the upper and the lower limit of the second control range based on the second deviation limiting value 56.

In other words, the method described with respect to FIGS. 2 to 14 can be implemented also in Cartesian coordinates. Then, no decomposition and consideration of the voltage phasors in amplitude and angle has to take place, but this takes place in orthogonal components for example d, q components (vertical and horizontal). Determining the limiting values or limiting ranges becomes easier as the correct conversion for amplitude and angle can be omitted.

For this, the control voltage phasor 232', 32', for example from the grid-forming regulation, can be provided in Cartesian coordinates. In the easiest case, this can be realized by conversion based on common mathematical methods or the control/regulation of the control voltage phasor is already implemented directly in Cartesian coordinates.

Figure 17:
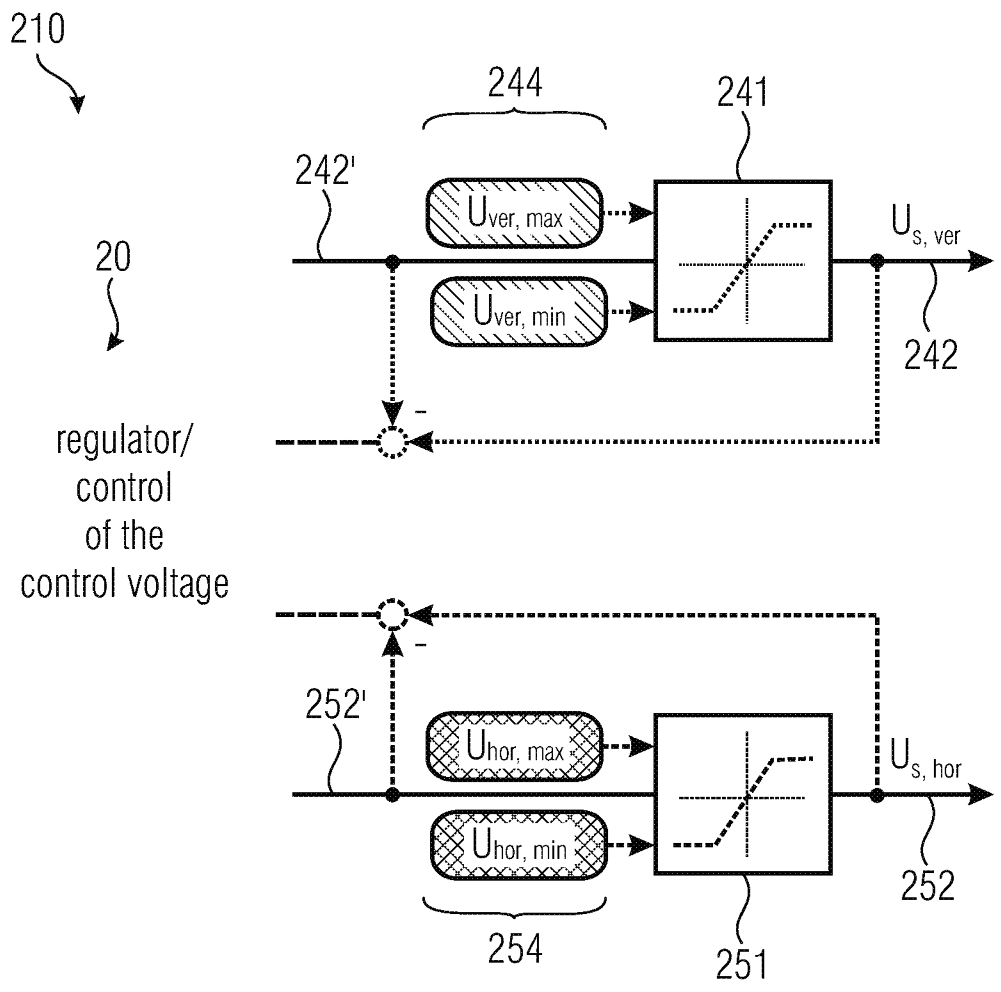
FIG. 17 illustrates a further embodiment of a regulation apparatus.

FIG. 17 illustrates an embodiment of the regulation apparatus 210. According to the example of FIG. 17, the regulation apparatus 210 is configured to limit the first coordinate 242 and the second coordinate 252 based on the first and second control ranges 244, 254 as determined by means of the control range determination 231 of FIG. 16. In other words, FIG. 17 illustrates a limitation of the control voltage in Cartesian coordinates.

The different variations of FIGS. 8 with 12, 10 with 11 and 13 with 14 can be applied analogously, also the situation-dependent adaptation of the allowable ranges (rectangles and circles) that can be adjusted by the parameters $k_{ver}$ and $k_{hor}$. The dependency of the limiting value parameters $k_{ver}$ and $k_{hor}$ on the actual deviation of the other components as needed, for example, in the circular range, is also maintained.

FIG. 18 illustrates a regulation apparatus 310 according to an embodiment. The regulation apparatus 310 is configured to provide a control quantity 91 for a power converter 80. The power converter 80 comprises an intermediate circuit 81. The intermediate circuit is connected to at least two intermediate circuit voltage supplies, 94, 95, or intermediate circuit terminals that are configured to provide an intermediate circuit voltage 89. Further, the power converter 80 comprises a circuit node 88 coupled to a terminal point 82 of the power converter via an internal impedance 86. The power converter is configured to provide a bridge voltage 87 ($U_i$) indicated by the control quantity 91 at the circuit node 88. For this, for example, the power converter can comprise one or several half bridges 83.

The regulation apparatus is configured to consider, for the control quantity 91, a contribution of at least a voltage oscillation in the intermediate circuit 81 to the bridge voltage 87. Alternatively or additionally, the regulation apparatus 310 is configured to consider a potential difference between a reference potential M of the bridge voltage 87 and a reference potential N of the output voltage 85.

For example, the control signal 91 can be a duty cycle for a pulse width modulation by which the bridge voltage 87 is controlled, such as shown in FIG. 9. For example, the regulation apparatus 310 can determine a control voltage, e.g., the control voltage 32, 232 described with respect to FIGS. 1 to 17, based on the output voltage 85 and/or one or several measurement quantities determined at the terminal point 82, for example the measurement quantities 84 described with reference to FIG. 1, and can determine the control quantity 91 based on the control voltage. The regulation apparatus 310 can consider the contribution of the voltage oscillation and/or the potential difference either when determining the control voltage or when determining the control quantity 91.

As shown in FIG. 18, the intermediate circuit 81 can optionally be configured in the form of one or several capacitor connected in series between intermediate circuit voltage supplies (cf. see also FIG. 19). The intermediate circuit voltage 89 can essentially be a direct voltage. Even when the intermediate voltage 89 is constant, partial voltages dropping serially across the intermediate circuit 89, for example a first partial voltage 92 between a first intermediate circuit voltage supply 94 and a center of the intermediate circuit and a second partial voltage 93 between a second intermediate circuit voltage supply 95 and the center of the intermediate circuit can vary in time. Here, oscillations of one or several frequencies can occur. Generally, the voltage oscillation can relate to an oscillation between a first intermediate circuit voltage supply 94 and a second intermediate circuit supply 95 or to an oscillation between one of the intermediate circuit voltage supplies 94, 95 and a reference potential of the intermediate circuit. For example, voltage oscillations with the base frequency (the provided frequency of the output voltage) can preferably occur between one of the intermediate circuit voltage supplies and the reference potential, while voltage oscillations of higher orders of the base frequency can also occur between the intermediate circuit voltage supplies. The center of the intermediate circuit can be, for example, the center between the serial intermediate circuit capacitors. Here, the reference potential can be an average value of the potentials of the intermediate circuit voltage supplies.

The bridge voltage 87 is normally an alternating voltage whose frequency, i.e., the intended frequency can be referred to as fundamental oscillation. A voltage oscillation in the intermediate circuit 81, for example one on the partial voltages 91, 92 which has the frequency of the fundamental oscillation or a harmonic thereof, can result in a contribution to the bridge voltage. This contribution is, for example, an additional contribution to the bridge voltage, i.e., the one indicated by the control signal 91, when it is assumed when determining the control signal that such oscillations are not present. For example, when determining the control voltage 91, a control voltage phasor, e.g., the control voltage phasor 32 can be put in relation to one of the partial voltages 92, 93 to consider the contribution of the voltage oscillation. Also, several voltage oscillations of different frequencies can be considered.

The output voltage 85 can be applied between the terminal point 82 and the reference potential N of the output voltage. Depending on the application case, the reference potential can be earth or a neutral conductor. The reference potential M of the bridge voltage can differ therefrom, which can have an effect on the deviation of the bridge voltage from the output voltage provided by the regulation apparatus 310. It should be noted that the reference potential M does not necessarily have to be a physical potential but can also be determined theoretically, for example by a modulation method (space vector modulation). For example, in the case of a multi-phase system, cf. FIGS. 19, 20, the reference point M can be derived, also via the sum of the line-to-line voltages of the control voltages. Alternatively, the reference point M can be determined in relation to the intermediate circuit 81, e.g., in relation to one or several of the intermediate circuit voltage supplies, for example as an average value of the potentials of the intermediate circuit voltage supplies.

Optionally, the regulation apparatus 310 can correspond to one of the regulation apparatuses, 10, 110, 210 described with reference to FIGS. 1 to 17. Thus, the regulation apparatus 310 can be configured to limit the control voltage around a reference voltage phasor describing the output voltage 85. Further, the power converter 80 of FIG. 18 can optionally correspond to the power converter 80 described with reference to FIG. 4A or 9. The contribution of the voltage oscillation can be an example of the contribution 71, which can optionally be considered in the control range determination. The potential difference between M and N can be an example of the contribution 72, which can optionally be considered in the control range determination.

According to embodiments, the power converter 80 is a three-phase power converter, for example as described with respect to FIG. 9. The regulation apparatus 310 can provide one control quantity 91 each for each of the three phases for the three-phase power converter, cf. control quantities $\mathbf{91}_1$, $\mathbf{91}_2$, $\mathbf{92}_3$ in FIG. 19, FIG. 20.

There are potentially different embodiments of a three-phase converter system. On the one hand, it can be differentiated whether the intermediate circuit is divided (by serial capacitors) and the center point is taken out or (virtually) connected to ground (cf. FIG. 19). In another topology variation, a further half bridge can be implemented, whose output is connected to the center or the N conductor. Thereby, the zero current or the potential M can be controlled specifically. If, for example currents flow on the center conductor (zero sequence) into the intermediate circuit, there will be a shift of the intermediate circuit voltage. The potential difference applied to the terminals DC+ and DC− remains unchanged. A shift cannot be measured across the entire intermediate circuit. However, measured at DC+ with respect to the center or DC− with respect to the center, there occurs an oscillation or a shift. On the (full) intermediate circuit voltage, the oscillations/shifts do not occur but exist in the intermediate circuit and can be shown, for example, by measuring the voltage at the intermediate circuit halves or can also be determined by theoretical considerations.

FIG. 19 illustrates an example of a configuration of a conductor converter system 80 with the taken-out intermediate circuit center. The taken-out intermediate circuit center can serve as reference potential M for the bridge voltage. If the taken-out intermediate circuit center is not connected to the N conductor, i.e., the potential N, the above-described potential difference can occur. The same can be determined, for example, by putting the sum of the measured line-to-line voltages $\mathbf{85}_1$, $\mathbf{85}_2$, $\mathbf{85}_3$ at the output, that are measured with respect to N (or are determined if the concatenated voltages are measured), in relation to the sum of the line-to-line voltages of the control voltages (e.g., the bridge voltages $\mathbf{87}_1$, $\mathbf{87}_2$, $\mathbf{87}_3$).

FIG. 20 shows an equivalent circuit diagram of a hardware topology of an example of the power converter 80. The reference point of the control voltage $U_i$, i.e. the bridge voltages is the center of the intermediate circuit. The same can be taken out physically, can exist virtually or can also be connected directly to the potential N. If the center is physically not localized, the potential corresponds to the virtual neutral point of the controlled three-phase voltage system ($\underline{U}_{i1}$, $\underline{U}_{i2}$, $\underline{U}_{i3}$). $U_i$ is composed, for example, of the pulsed DC voltage and therefore shares the reference point. For considering of harmonics or the one or several voltage oscillations, the DC voltage to be pulsed and its reference point is decisive. If oscillation portions (particularly 50 Hz and 100 Hz) occur, the same provide, apart from the (pulse width) modulated portion, an additional contribution to the fundamental oscillation (50 Hz). This additional portion that only occurs after treating the control voltage is to be identified and considered accordingly, otherwise there will be undesired deviations between the voltage phasors $\underline{U}_i$ and $\underline{U}_0$.

Further, depending on the implementation, the points M and N can be electrically connected or separate. In the latter case, the potential difference is also to be considered. This can be intended, for example, by modulation methods or can result by neutral point shift in unbalanced cases. This potential difference can be determined from the sum of the line-to-line voltages.

In the following, further optional features as well as functions and advantages of the regulation apparatus 10, 110, 210, 310 according to FIGS. 1 to 20 will be discussed.

For example, the power converter 80 is not limited by the innovative current limitation method of the regulation apparatus 110, 210 of FIGS. 1 to 17 for the normal operating range. The power converter can provide its grid-compatible contribution in a targeted manner and inherently up to a maximum limit and maintain the same as long as needed. However, the same can be free to react to a new situation. This method is suitable both for voltage drops and in case of frequency events (or phase angle events). The approach works both in the interconnected grid as well as in the island grid.

Short-term transient current peaks of different types can additionally be remedied by pulse blocking of the semiconductors.

Common normative requirements (voltage dependent active power reduction, active power reduction in overfrequency and underfrequency, voltage-dependent reactive power provision) can also be implemented by a suitable selection of the geometrical control quantity limitations.

In contrary to other methods that try to directly treat the inverter current or at least use the inverter current to adjust the control voltage, in the regulation method presented herein, additional regulator loops or dynamics are prevented. In other words, the innovation of the inventive method lies in maintaining the controlled voltage phasor directly in a corridor for the output voltage, separated, for example, in amplitude and phase angle. This means that the actual inverter current does not have to be measured. The inventive regulation method can be implemented on all inverter-based systems that are to control a voltage behind an internal impedance. In particular, this applies for grid-forming or voltage-impressed regulated power converters. Preferably, systems with electrical energy storage are selected, as the same can react to power changes in a flexible manner. In summary, among others, the following systems may be used: fixed battery converters, mobile battery converters (electric mobility), PV plants with supplement battery storage, wind power plants, STATCOM (Static Synchronous Compensator) with supercaps, AC grid connection of a HDVC. The method is suitable both for island grid applications as well as for usage in interconnected operation.

FIG. 21 shows a flow diagram of a method 1000 for regulating a grid-coupled power converter, for example the power converter 80. The method 1000 comprises a step 1001 of determining a control voltage 32 for the power converter depending on an output voltage of the power converter 80. Step 1001 includes the steps 1010 to 1030. Step 1010 includes limiting an amplitude 42 of a control voltage phasor 32 describing the control voltage to an amplitude control range 44 around an amplitude 62 of a reference voltage phasor 60 based on the output voltage. Step 1020 includes limiting an angle 52 of the control voltage phasor 32 to an angle control range 54 around an angle 64 of the reference voltage phasor 60. Step 1030 includes situation-dependent adjusting of the amplitude control range 44 and the angle control range 54. Step 1010 can be performed before, after or in parallel to step 1020. Step 1030 can be performed before, after or between steps 1010 and 1020.

Figure 22:
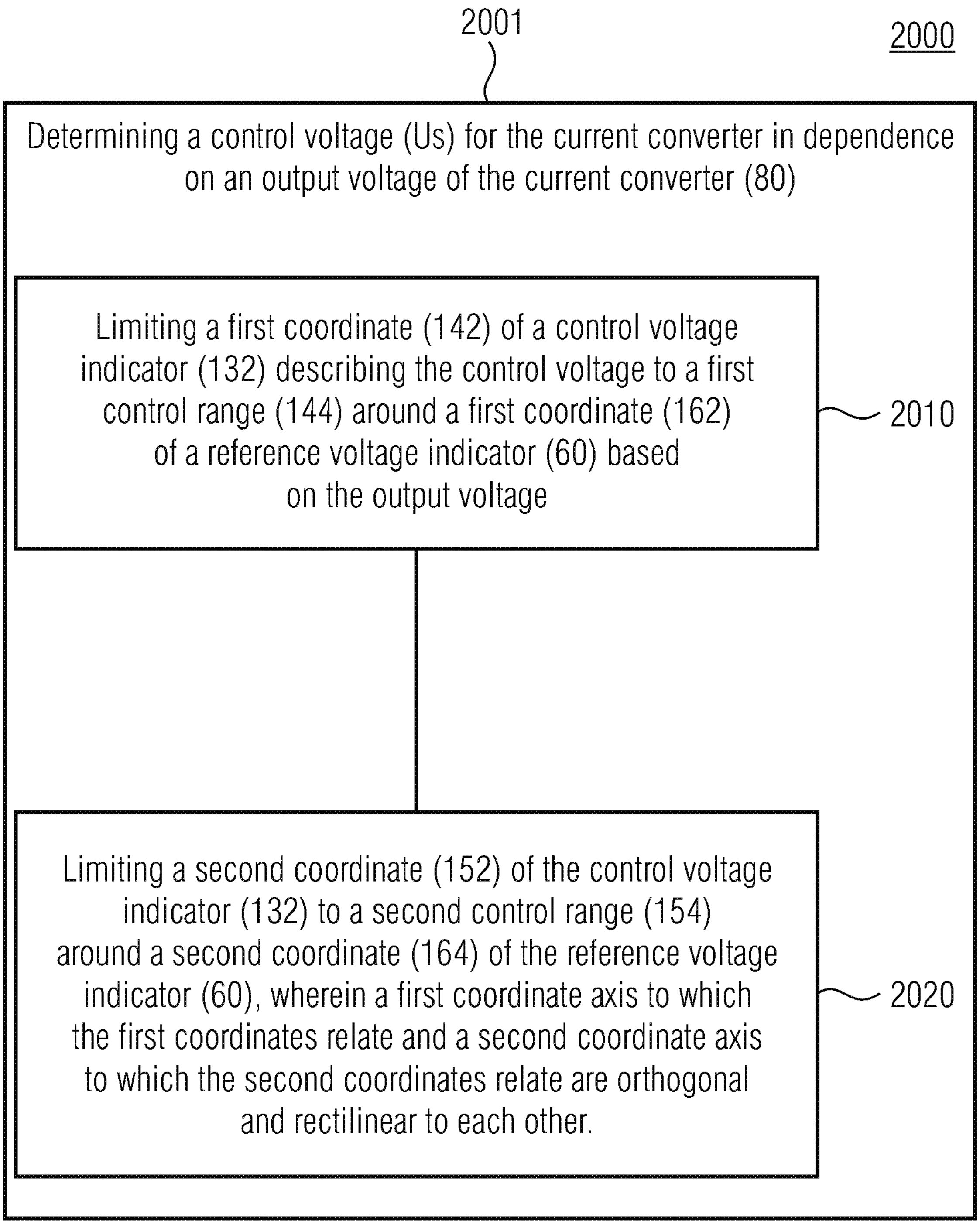
FIG. 22 shows a flow diagram of a method for regulating a grid-coupled power converter.

FIG. 22 shows a flow diagram of a method 2000 for regulating a grid-coupled power converter, for example the power converter 80. The method 1000 comprises a step 2001 of determining a control voltage 32 for the power converter in dependence on an output voltage of the power converter 80. Step 2001 includes steps 2010 and 2020. Step 2010 includes liming a first coordinate 242 of a control voltage phasor 232 describing the control voltage to a first control range 244 around a first coordinate 262 of a reference voltage phasor 60 based on the output voltage. Step 2010 includes limiting a second coordinate 252 of the control voltage phasor 232 to a second control range 254 around a second coordinate 264 of the reference voltage phasor 60. A first coordinate axis to which the first coordinates are related and a second coordinate axis to which the second coordinates are related are orthogonal to each other. Step 2010 can be performed before, after or in parallel to step 2020.

FIG. 23 shows a flow diagram of a method 3000 for regulating a grid-coupled power converter, for example the power converter 80. The method 3000 includes step 3001, which includes determining a control quantity 91 for the power converter 80. Further, the method 3000 includes the step 3002. Step 3002 includes providing a bridge voltage 87 indicated by the control quantity 91 at a circuit node 88 coupled to a terminal point 82 of the power converter via an internal impedance 86 of the power converter, wherein providing takes place based on the control quantity and an intermediate circuit voltage 89 of an intermediate circuit of the power converter. The method includes considering, for determining the control quantity, a contribution of at least a voltage oscillation in the intermediate circuit 81 to the grid voltage 87 and/or considering a potential difference between a reference potential M of the bridge voltage and the reference potential N of the output voltage 85.

List of Formulas

- HB 1, 2, 3 Half bridges of the power converter
- $Z_i$ Equivalent internal impedance of the power converter
- $U_s$ Control voltage as output of the power converter regulation
- $\underline{U}_i$ Resulting voltage at the half bridges of the grid-forming power converter
- $\underline{U}_o$ Measurable output-side voltage phasor of the power converter or the grid terminal point
- $k_p$ Slope of the active power droop
- $k_q$ Slope of the reactive power droop
- $U_0$ Nominal value of the voltage amplitude
- $f_0$ Nominal value of the frequency
- $k_p'$, $k_q'$ Parameters for the phase feedforward control
- $T_a$ Run-up time constant (measure for inertia)
- $I_{max}$ Constant current amount indicated as permissible
- r Radius of the allowed circular area around the reference voltage phasor (starting from the equivalent internal impedance of the power converter)
- $\underline{I}_o$ Output current of the power converter
- d Portion in longitudinal direction or horizontal direction
- q Portion in transversal direction or vertical direction

REFERENCES

[1] K. Najafzadeh and H. Heydari, "New Inverter Fault Current Limiting Method by Considering Microgrid Control Strategy," AMR, 463-464, pp. 1647-1653, 2012, doi: 110.4028/www.scientific.net/AMR.463-464.1647.

[2] X. Yuan, A. M. Ritter, H. Weng, and R. W. Delmerico, "System and method for control of a grid connected power generating system," EP2221936A2.

[3] P. Unruh, M. Nuschke, P. Strauß, and F. Welck, "Overview on Grid-Forming Inverter Control Methods," Energies, vol. 13, no. 110, p. 2589, 2020, doi: 110.3390/en131102589.

[4] A. Gkountaras, S. Dieckerhoff, and T. Sezi, "Evaluation of current limiting methods for grid forming inverters in medium voltage microgrids," in 2015 IEEE Energy Conversion Congress and Exposition (ECCE), 2015, pp. 1223-1230.

[5] A. E. Bruno Burger, "Vorrichtung zur Bestimmung der Wirk-und/oder Blindleistung in einem einphasigen elektrischen Wechselspannungssystem und deren Anwendung," DE19949997B4.

[6] M. Tharayil and A. Alleyne, "A generalized PID error governing scheme for SMART/SBLI control," in ACC: Proceedings of the 2002 American Control Conference: May 8-110, 2002, Hilton Anchorage and Egan Convention Center, Anchorage, Alaska, USA, Anchorage, AK, USA, 2002, pp. 346-351.

[7] E. Ortjohann, A. Arias, D. Morton, A. Mohd, N. Hamsic, and O. Omari, "Grid-Forming Three-Phase Inverters for Unbalanced Loads in Hybrid Power Systems," in Conference record of the 2006 IEEE 4th World Conference on Photovoltaic Energy Conversion: May [7-12], 2006, [Waikoloa, Hawaii]; [incorporating 32th IEEE Photovoltaic (PV) Specialist Conference and 16th Asia/Pacific (International) Photovoltaic (PV) Science and Engineering Conference, Waikoloa, HI, 2006, pp. 2396-2399.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, a ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the disclosure includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are preferably performed by any hardware apparatus. This can be a universally applicable hardware, such as a computer processor (CPU) or hardware specific for the method, such as ASIC.

In the preceding detailed description, various features have been grouped together in examples in part to streamline the disclosure. This type of disclosure should not be interpreted as intending that the claimed examples have more features than are explicitly stated in each claim. Rather, as the following claims reflect, subject matter may be found in fewer than all of the features of a single disclosed example. Consequently, the following claims are hereby incorporated into the detailed description, and each claim may stand as its own separate example. While each claim may stand as its own separate example, it should be noted that although dependent claims in the claims refer back to a specific combination with one or more other claims, other examples also include a combination of dependent claims with the subject matter of any other dependent claim or a combination of any feature with other dependent or independent claims. Such combinations are encompassed unless it is stated that a specific combination is not intended. It is further intended that a combination of features of a claim with any other independent claim is also encompassed, even if that claim is not directly dependent on the independent claim.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Regulation apparatus for a power converter, wherein the regulation apparatus is configured to determine a control voltage for the power converter in dependence on an output voltage of the power converter, wherein the regulation apparatus is configured to limit an amplitude of a control voltage phasor describing the control voltage to an amplitude control range around an amplitude of a reference voltage phasor based on the output voltage, limit an angle of the control voltage phasor to an angle control range around an angle of the reference voltage phasor and adjust the amplitude control range and the angle control range depending on the situation.

2. Regulation apparatus according to claim 1, configured to switch between a first way of adjusting the amplitude control range and the angle control range and a second way of adjusting the amplitude control range and the angle control range depending on whether the power converter is in normal operation or in a failure situation.

3. Regulation apparatus according to claim 1, configured to determine an upper and a lower limit of the amplitude control range based on a first deviation limiting value and the amplitude of the reference voltage phasor, determine an upper and a lower limit of the angle control range based on a second deviation limiting value and the angle of the reference voltage phasor and adjust the first deviation limiting value and the second deviation limiting value in dependence on each other to limit a deviation of the control voltage phasor from the reference voltage phasor.

4. Regulation apparatus according to claim 1, configured to, in at least a first operating situation of one or several operating situations of the power converter, adjust the angle control range to a predetermined angle control range and determine the amplitude control range in dependence on an angle deviation of the control voltage phasor from the reference voltage phasor.

5. Regulation apparatus according to claim 4, configured to, in a second operating situation of the power converter, adjust the amplitude control range to a predetermined amplitude control range and determine the angle control range in dependence on an amplitude deviation of the control voltage phasor from the reference voltage phasor.

6. Regulation apparatus according to claim 1, configured to determine an upper and a lower limit of the amplitude control range based on a first deviation limiting value and the amplitude of the reference voltage phasor, determine an upper and a lower limit of the angle control range based on a second deviation limiting value and the angle of the reference voltage phasor and adjust, at least in a first operating situation of the power converter, the first deviation limiting value and the second deviation limiting value to a respective first predetermined value and adjust, in a second operating situation of the power converter, the first deviation limiting value and the second deviation limiting value to a respective second value, wherein the respective first value differs from the respective second value.

7. Regulation apparatus according to claim 1, configured to determine the angle control range in dependence on the amplitude of the control voltage phasor and/or in dependence on the amplitude of the reference voltage phasor and/or determine the amplitude control range in dependence on an angle deviation of the control voltage phasor from the reference voltage phasor.

8. Regulation apparatus according to claim 1, configured to determine an upper and a lower limit of the amplitude control range based on a first deviation limiting value and the amplitude of the reference voltage phasor.

9. Regulation apparatus according to claim 1, configured to determine an upper and a lower limit of the angle control range based on the angle of the reference voltage phasor and based on a ratio between a second deviation limiting value and the amplitude of the control voltage phasor or the reference voltage phasor.

10. Regulation apparatus according to claim 1, configured to determine a set control voltage based on a comparison of one or several quantities describing an output power of the power converter with one or several set values for the quantities and supply the set control voltage to the limitation to determine the control voltage.

11. Regulation apparatus according to claim 1, wherein the regulation apparatus is configured to limit a first coordinate of a set control voltage phasor of the set control voltage to a first control range and to limit a second coordinate of the set control voltage phasor to a second control range to determine the control voltage phasor and determine the first and the second coordinate of the set control voltage phasor by using respective integrators and lead, in the case of a deviation of a first coordinate of the control voltage phasor from the first coordinate of the set control voltage phasor, an integrator input quantity of the integrator used for determining the first coordinate of the set control voltage phasor to zero, or to reinitialize the integrator used for determining the first coordinate of the set control voltage phasor and lead, in the case of a deviation of a second coordinate of the control voltage phasor from the second coordinate of the set control voltage phasor, an integrator input quantity of the integrator used for determining the second coordinate of the set control voltage phasor to zero, or to reinitialize the integrator used for determining the second coordinate of the set control voltage phasor.

12. Regulation apparatus according to claim 1, wherein the power converter is a multi-phase power converter, wherein the regulation apparatus is configured to determine, for each of a plurality of the phases of the power converter, one control voltage each, depending on an output voltage of the respective phase and wherein the regulation apparatus is configured to determine, for each of the phases, a control voltage phasor describing the respective control voltage and to limit the respective control voltage phasor to a control range for each of the phases separately.

13. Regulation apparatus according to claim 1, wherein the power converter is a three-phase power converter, wherein the power converter is configured to provide, in dependence on the control voltage, one voltage each for a first, a second and a third phase of the three-phase power converter, wherein the regulation apparatus is configured to obtain a positive-phase sequence system reference voltage phasor, a negative-phase sequence system reference voltage phasor and zero-phase sequence system reference voltage phasor, which together describe respective output voltages of the first, second and third phases, limit a positive-phase sequence system control voltage phasor describing a positive-phase sequence system of the control voltage to a control range around the positive-phase sequence system reference voltage phasor, limit a negative-phase sequence system control voltage phasor describing a negative-phase sequence system of the control voltage to a control range around the negative-phase sequence system reference voltage phasor, limit a zero-phase sequence system control voltage phasor describing a zero-phase sequence system of the control voltage to a control range around the zero-phase sequence system reference voltage phasor.

14. Power converter arrangement, comprising:

the regulation apparatus according to claim 1, a power converter comprising a circuit node, wherein the power converter is configured to provide a voltage indicated by the control voltage at the circuit node, wherein the circuit node can be coupled to an energy grid via an internal impedance of the power converter.

15. Regulation apparatus for a power converter, wherein the regulation apparatus is configured to determine a control voltage for the power converter in dependence on an output voltage of the power converter, wherein the regulation apparatus is configured to limit a first coordinate of a control voltage phasor describing the control voltage to a first control range around a first coordinate of a reference voltage phasor based on the output voltage, limit a second coordinate of the control voltage phasor to a second control range around a second coordinate of the reference voltage phasor, wherein a first coordinate axis to which the first coordinates are related and a second coordinate axis to which the second coordinates are related are orthogonal to each other and rectilinear.

16. Regulation apparatus according to claim 15, configured to limit a deviation of the first coordinate of the control voltage phasor from the first coordinate of the reference voltage phasor to a first deviation limiting value and limit a deviation of the second coordinate of the control voltage phasor from the second coordinate of the reference voltage phasor to a second deviation limiting value.

17. Regulation apparatus according to claim 15, configured to adjust the first control range and the second control range depending on the situation.

18. Regulation apparatus for a power converter, wherein the regulation apparatus is configured to determine a control quantity for the power converter, wherein the power converter comprises an intermediate circuit, wherein the power converter is configured to provide a bridge voltage indicated by the control quantity based on the control quantity and an intermediate circuit voltage of the intermediate circuit at a circuit node coupled to a terminal point of the power converter via an internal impedance of the power converter, wherein the regulation apparatus is configured to, for the control quantity, consider a contribution of a least one voltage oscillation in the intermediate circuit to the bridge voltage and/or consider a potential difference between a reference potential of the bridge voltage and a reference potential of the output voltage.

19. Regulation apparatus according to claim 18, wherein the voltage oscillation is a voltage oscillation between an intermediate circuit voltage supply and a further intermediate circuit voltage supply or between an intermediate circuit voltage supply and a reference potential of the intermediate circuit.

20. Regulation apparatus according to claim 18, wherein a frequency of the voltage oscillation is one or several times a fundamental oscillation of the bridge voltage.

21. Regulation apparatus according to claim 18, wherein the regulation apparatus is configured to determine a control voltage for the power converter in dependence on an output voltage of the power converter and determine the control quantity based on the control voltage, wherein the regulation apparatus is configured to consider the contribution of the voltage oscillation and/or the potential difference for determining the control voltage or determine the control quantity based on the control voltage and based on the contribution of the voltage oscillation and/or the potential difference.

22. Method for regulating a power converter comprising:

determining a control voltage for the power converter in dependence on an output voltage of the power converter, determining the control voltage comprising:

limiting an amplitude of a control voltage phasor describing the control voltage to an amplitude control range around an amplitude of a reference voltage phasor based on the output voltage, limiting an angle of the control voltage phasor to an angle control range around an angle of the reference voltage phasor and adjusting the amplitude control range and the angle control range depending on the situation.

23. Method for regulating a power converter, comprising:

determining a control voltage for the power converter in dependence on an output voltage of the power converter, determining the control voltage comprising:

limiting a first coordinate of a control voltage phasor describing the control voltage to a first control range around a first coordinate of a reference voltage phasor based on the output voltage, limiting a second coordinate of the control voltage phasor to a second control range around a second coordinate of the reference voltage phasor, wherein a first coordinate axis to which the first coordinates are related and a second coordinate axis to which the second coordinates are related are orthogonal and rectilinear to each other.

24. Method for regulating a power converter, comprising:

determining a control quantity for the power converter, providing a bridge voltage indicated by the control quantity at a circuit node coupled to a terminal point of the power converter via an internal impedance of the power converter, wherein providing takes place based on the control quantity and an intermediate circuit voltage of an intermediate circuit of the power converter, wherein the method comprises, for determining the control quantity considering a contribution of at least one voltage oscillation in the intermediate circuit to the bridge voltage and/or considering a potential difference between a reference potential of the bridge voltage and a reference potential of the output voltage.

* * * * *